United States Patent [19]

Matsuo et al.

[11] Patent Number: 5,983,057
[45] Date of Patent: Nov. 9, 1999

[54] COLOR IMAGING SYSTEM WITH SELECTIVELY OPENABLE OPTICAL SHUTTER

[75] Inventors: Makoto Matsuo; Minoru Utsumi; Chihaya Ogusu; Shunsuke Mukasa; Yoshiaki Kudo; Hiroyuki Obata; Takashi Aono; Hiroshi Mohri; Masato Koike; Hideaki Amano; Norikazu Saito, all of Tokyo, Japan

[73] Assignee: Dai Nippon Printing Co. Ltd, Tokyo, Japan

[21] Appl. No.: 08/462,595

[22] Filed: Jun. 5, 1995

Related U.S. Application Data

[62] Division of application No. 08/370,466, Jan. 9, 1995, abandoned, which is a continuation of application No. 08/156,939, Nov. 24, 1993, abandoned, which is a continuation of application No. 07/882,282, May 13, 1992, abandoned, which is a division of application No. 07/352,525, May 16, 1989, Pat. No. 5,161,233.

[30] Foreign Application Priority Data

| May 20, 1988 | [JP] | Japan | 63-123600 |
| May 20, 1988 | [JP] | Japan | 63-123601 |
| May 20, 1988 | [JP] | Japan | 63-123602 |
| May 26, 1988 | [JP] | Japan | 63-129309 |
| May 26, 1988 | [JP] | Japan | 63-129310 |
| May 17, 1988 | [JP] | Japan | 63-121591 |
| May 17, 1988 | [JP] | Japan | 63-121593 |
| May 17, 1988 | [JP] | Japan | 63-121594 |
| Jun. 12, 1988 | [JP] | Japan | 63-308159 |
| Sep. 13, 1988 | [JP] | Japan | 63-230475 |
| Sep. 13, 1988 | [JP] | Japan | 63-230476 |
| Sep. 29, 1988 | [JP] | Japan | 63-248579 |
| Mar. 3, 1989 | [JP] | Japan | 1-51368 |
| Mar. 3, 1989 | [JP] | Japan | 1-51369 |
| Mar. 17, 1989 | [JP] | Japan | 1-65465 |
| Mar. 17, 1989 | [JP] | Japan | 1-65469 |
| Mar. 18, 1989 | [JP] | Japan | 1-66792 |
| Mar. 18, 1989 | [JP] | Japan | 1-66797 |

[51] Int. Cl.$^6$ ............................................. G03G 15/043
[52] U.S. Cl. ......................... 399/207; 399/178; 348/207; 348/259
[58] Field of Search ................ 347/115; 348/407, 348/207, 259; 355/326 R, 327, 210, 211; 346/150.1; 399/81, 207, 178; 365/112

[56] References Cited

U.S. PATENT DOCUMENTS 2,825,814  3/1958  Walkup .

(List continued on next page.)

OTHER PUBLICATIONS

Electrophotography, R.M. Schaffert, pp. 167–177, Focal Press, 1975.

Primary Examiner—Richard Moses
Attorney, Agent, or Firm—Armstrong, Westerman, Hattori, McLeland & Naughton

[57] ABSTRACT

In the information recording an reproducing method and apparatus according to the present invention, a piece of picture image information is recorded as an analog quantity or a digital quantity an information carrying medium in a planar manner at a high density, charge potential is read for outputting electric signals to correspond to the recorded picture image information and then the outputted signals are printed out by means of various display unit or output device, with high quality and high resolution as well as ease processing of the information. The information carrying medium provides a long period of storage of information and enables stored picture image information to be repeatedly reproduced with a picture quality according to need. Particularly, it is, according to the present invention, possible to read and output local potential of an information carrying medium with predetermined scanning density at a desired time, and so pictures of high quality may be output as a silver salt photograph is taken and reproduced by optically scanning the film. Thus, the present invention may be applied to a wide field including photographing, copying and printing.

1 Claim, 61 Drawing Sheets

U.S. PATENT DOCUMENTS

| | | | |
|---|---|---|---|
| 3,211,470 | 10/1965 | Wilson | 283/18 |
| 3,254,998 | 6/1966 | Schwertz . | |
| 3,322,539 | 5/1967 | Redington . | |
| 3,640,009 | 2/1972 | Komiyama | 283/901 X |
| 3,673,594 | 6/1972 | Kazan | 346/74 MT |
| 3,819,260 | 6/1974 | Radin . | |
| 3,894,756 | 7/1975 | Ward | 283/7 |
| 3,934,256 | 1/1976 | Isonaka et al. | 355/72 X |
| 3,976,373 | 8/1976 | Kawakubo et al. | 355/72 X |
| 4,021,106 | 5/1977 | Gaynor . | |
| 4,051,283 | 9/1977 | Thomas et al. | 283/901 X |
| 4,128,954 | 12/1978 | White | 283/101 X |
| 4,171,864 | 10/1979 | Jung et al. | 283/86 X |
| 4,180,284 | 12/1979 | Ashley | 283/101 X |
| 4,207,100 | 6/1980 | Kadokura et al. | 430/48 |
| 4,215,879 | 8/1980 | Blum | 283/101 X |
| 4,239,261 | 12/1980 | Richardson | 283/901 X |
| 4,262,301 | 4/1981 | Erlichman | 358/6 |
| 4,269,473 | 5/1981 | Flothmann et al. | 283/86 X |
| 4,340,656 | 7/1982 | Seino et al. | 430/48 |
| 4,345,012 | 8/1982 | Hirsch et al. | 430/48 |
| 4,390,607 | 6/1983 | Chou et al. | 430/48 |
| 4,409,307 | 10/1983 | Lelental et al. | 430/31 |
| 4,560,426 | 12/1985 | Moraw et al. | 156/64 |
| 4,628,017 | 12/1986 | Tagoku | 430/48 |
| 4,702,497 | 10/1987 | Newberry | 283/901 X |
| 4,889,366 | 12/1989 | Fabbiani | 283/86 |
| 4,903,991 | 2/1990 | Wright | 283/901 X |
| 5,138,604 | 8/1992 | Umeda et al. | 283/86 X |
| 5,191,408 | 3/1993 | Takanashi et al. | 358/49 |

OTHER PUBLICATIONS

"A Comparison of Some Electrophotographic Processes Based on Photoconductor–Insulator Layer Combination", Photographic Science and Engineering, Peter Mark, vol. 18, No. 3, May/Jun. 1974, pp. 254–261.

FIG. 31
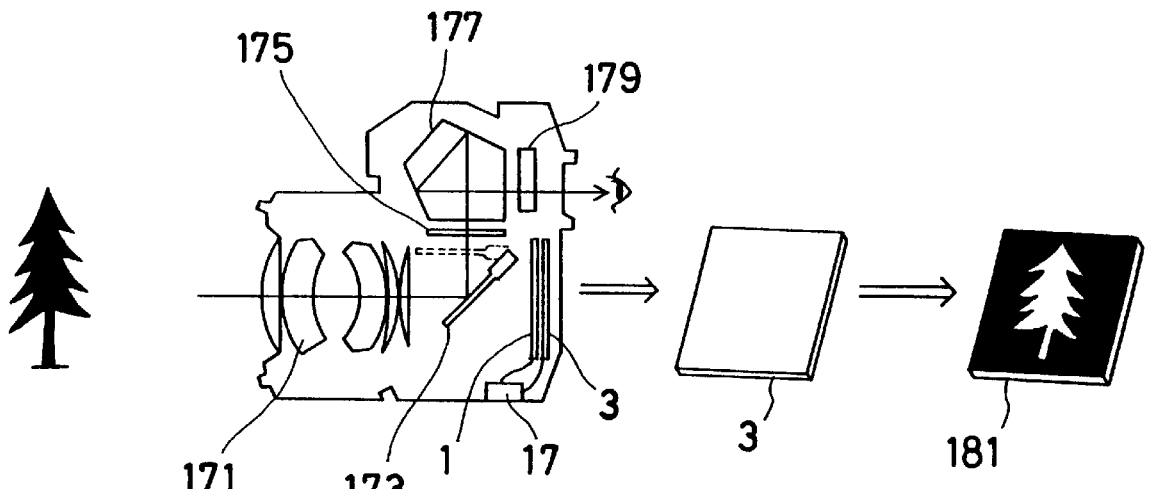
FIG. 32
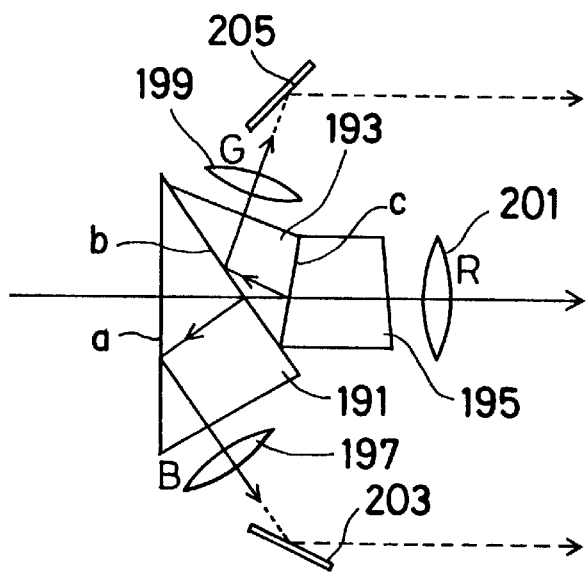
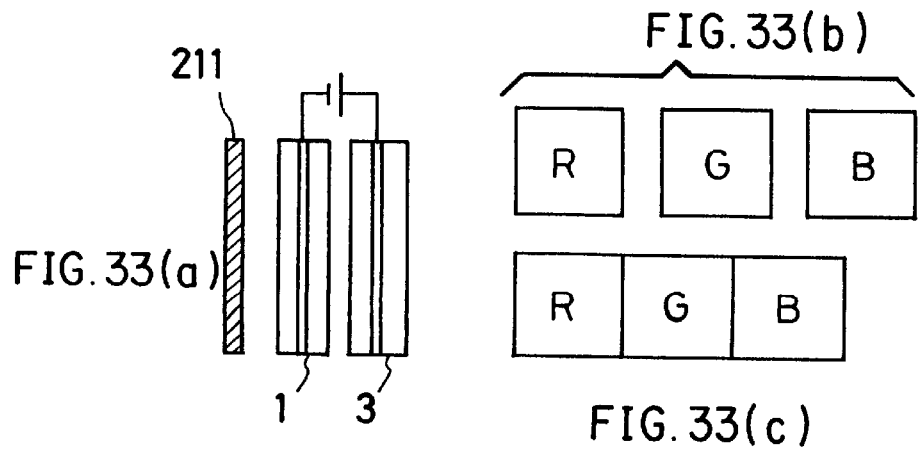
FIG. 33(a)
FIG. 33(b)
FIG. 33(c)

FIG. 34
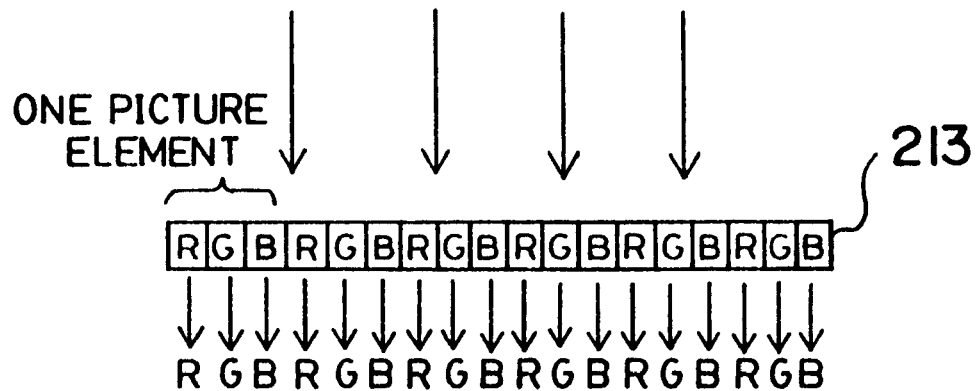
FIG. 35
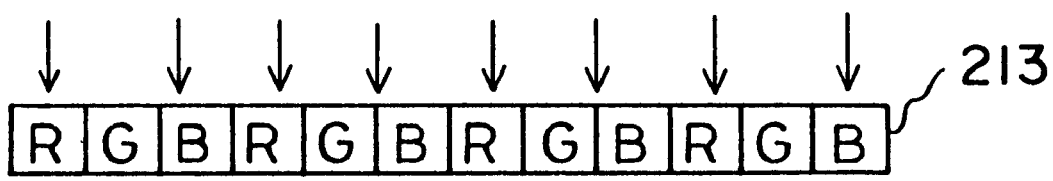
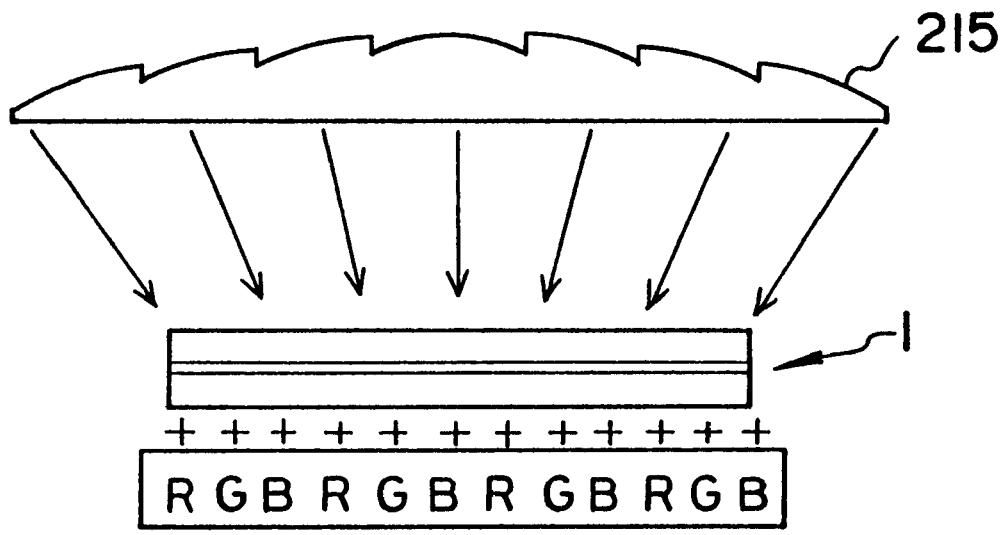

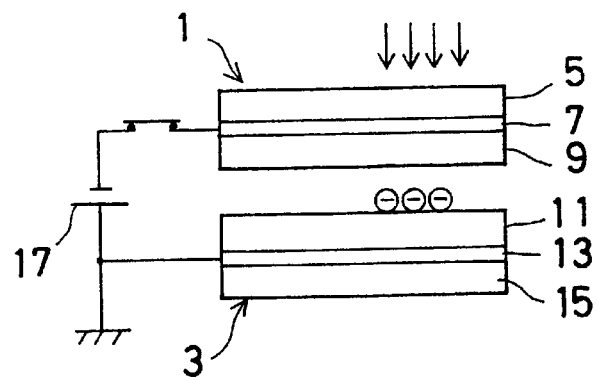
FIG. 51(a)
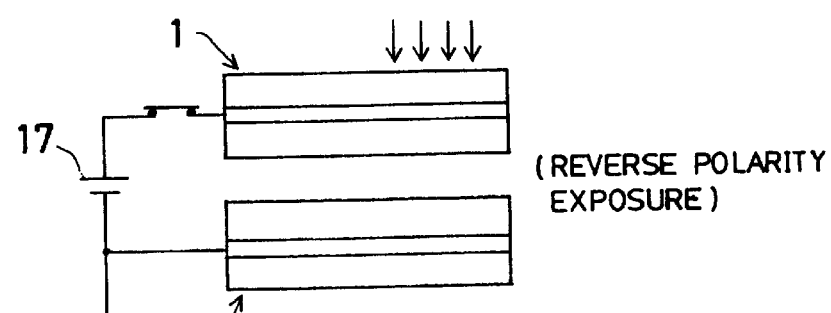
FIG. 51(b) (REVERSE POLARITY EXPOSURE)
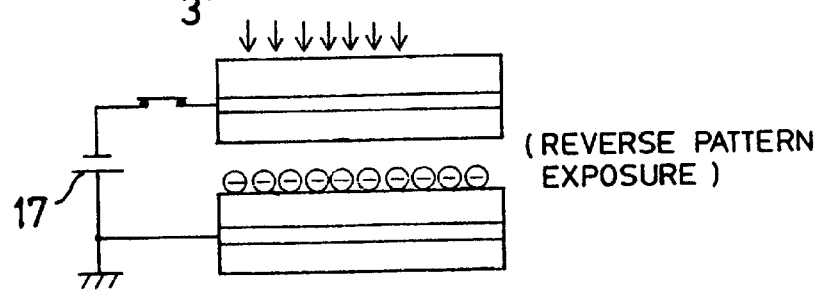
FIG. 51(c) (REVERSE PATTERN EXPOSURE)

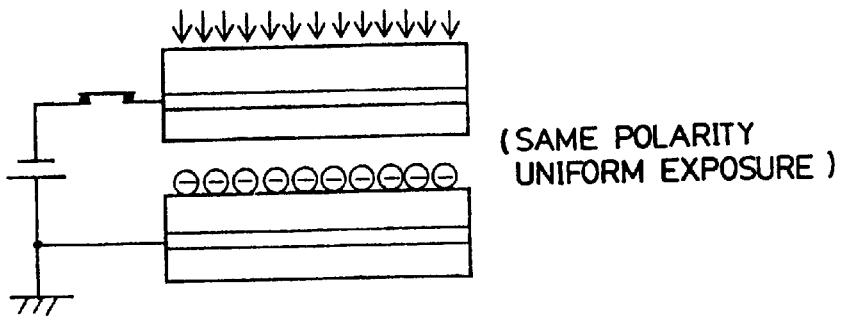
FIG.52(a) (SAME POLARITY UNIFORM EXPOSURE)
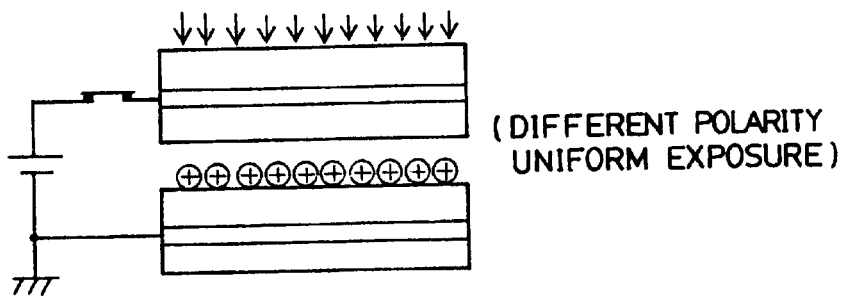
FIG.52(b) (DIFFERENT POLARITY UNIFORM EXPOSURE)
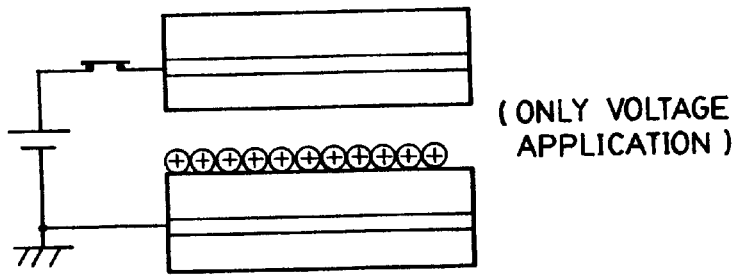
FIG.52(c) (ONLY VOLTAGE APPLICATION)

(CORONA DISCHARGE)

(INFRARED HEATING)

(RESISTANCE HEATING)

(MICROWAVE HEATING)

(THERMAL HEAD)

(ULTRAVIOLET LIGHT)

(ULTRAVIOLET LIGHT)

(POWER COLLECTOR)

(CONDUCTIVE STEAM)

FIG. 68
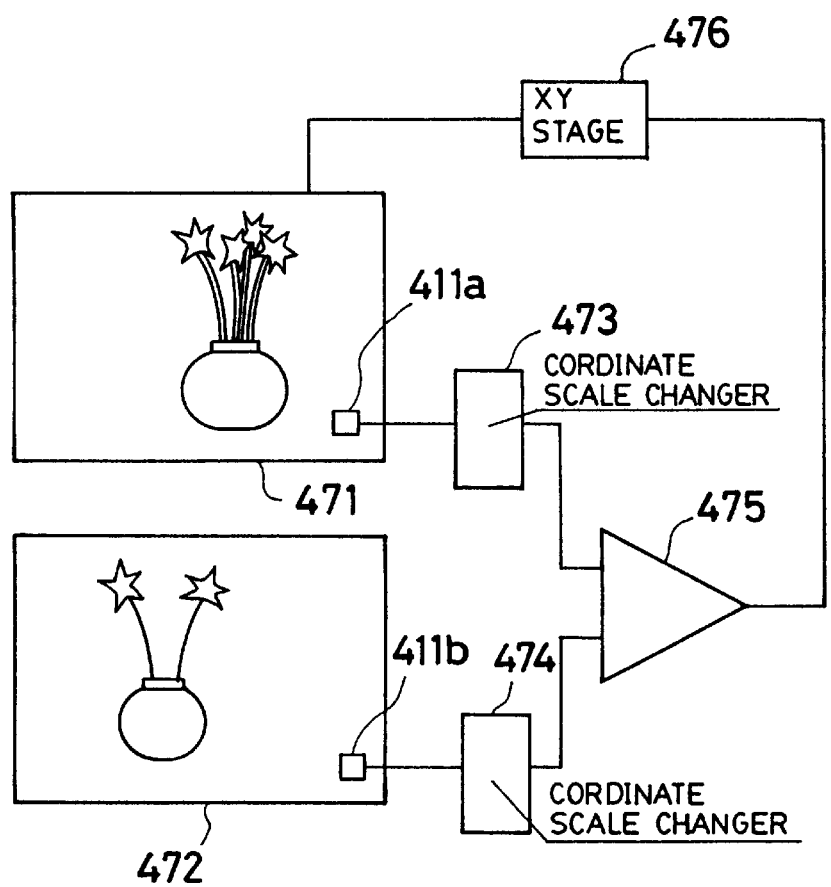
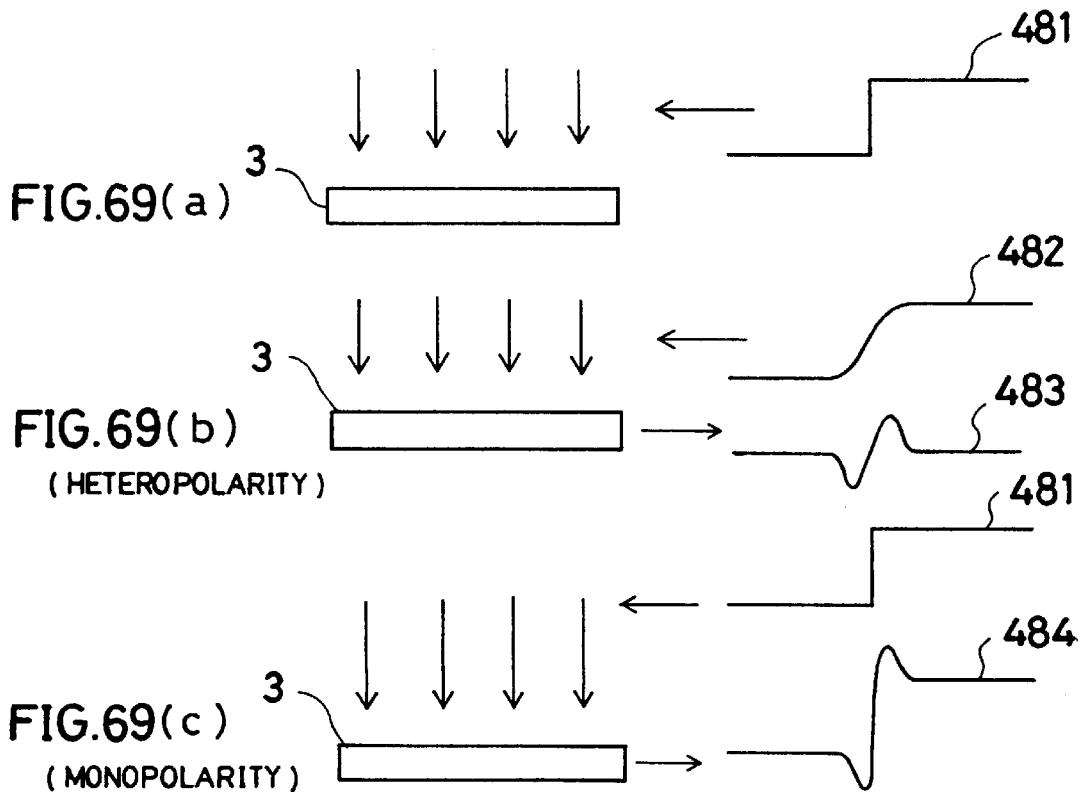
FIG. 69(a)
FIG. 69(b)
(HETEROPOLARITY)
FIG. 69(c)
(MONOPOLARITY)

WHITE

50% OF SCREEN DOTS

BLACK

FIG.77(a)

| 1  | 2  | 3  | 4 |
|----|----|----|---|
| 12 | 13 | 14 | 5 |
| 11 | 16 | 15 | 6 |
| 10 | 9  | 8  | 7 |

COLOR IMAGING SYSTEM WITH SELECTIVELY OPENABLE OPTICAL SHUTTER

This is a division of application Ser. No. 08/370,466 filed Jan. 9, 1995, now abandoned which is a continuation of application Ser. No. 08/156,939, filed Nov. 24, 1993, abandoned, which is a continuation of Ser. No. 07/882,282 filed May 13, 1992 abandoned, which is a division of application Ser. No. 07/352,525 filed May 16, 1989 now U.S. Pat. No. 5,161,233.

BACKGROUND OF THE INVENTION

The present invention relates to a method for recording and reproducing input information, an apparatus for the same and a recording medium such as a card and a label.

Heretofore, silver salt photography is known as a high sensitivity photographing technology, in which a taken image is recorded on a film or the like material through a developing process, and then reproduced by using a silver salt emulsion on a photographic paper or by therefor optically scanning the developed film to display it on a cathode ray tube (hereinafter referred to as CRT).

Also known is an electrophotography method in which a photoconductive layer which is deposited together with an electrode is fully charged by corona electric charging at a dark place, after which the photoconductive layer is exposed to intense light to thereby make exposed portions conductive. Charges of the exposed portions are leaked for removal to optically form an electrostatic latent image on the photoconductive layer, and then a toner which has electric charges opposite in polarity to (or the same as the remaining charges is adhered to the latter for development.

Although this technology is mainly used in photocopying, it cannot be generally used for photographing because of low sensitivity, and in photocopying the toner developing is carried out at once after an electrostatic latent image is formed since charge holding time is short.

In television photography, a picture image is obtained by a camera tube, which provides electric signals of the picture image by means of a photosemiconductor for outputting to a CRT or for video recording by magnetic recording or the like to output the image on a CRT as desired.

Silver salt photography is excellent for storing a taken object image, but it needs developing to form a silver salt image and further complicated optical, electrical and chemical processing for reproducing the image in a hard copy or a soft copy (CRT output).

Although electrophotography is easier and quicker in developing an electrostatic latent image than silver salt photography, the former is inferior to the latter in the storing period of a latent image, resolution of the developer and picture quality.

Television photography requires linear scanning for obtaining and recording electric picture signals provided by a camera tube. Linear scanning is carried out by an electron beam in the camera tube and by a magnetic head in video recording. Resolution of the television photography image depends on the number of scanning lines and hence it is considerably inferior to planar analog recording such as silver salt photography.

Television photography using a solid-state image device such a CCD is essentially the same in resolution as the above-described television photography.

In these technologies, there are disadvantages such that high quality and high resolution picture image recording requires complicated processing while simpler processing of picture images results in lack of storing function or degradation of picture quality. Gramophone records, cassette tapes or the like media are used for recording aural information, and video tapes, compact discs, optical discs are used for recording picture image information and aural information. Although records and cassette tapes are very convenient media for recording voice, they have too small memory capacity to record picture image information. Video tapes require linear scanning, and is quite inferior in resolution to planar analog recording such as silver salt photograph. Compact discs and optical discs therefor have essentially the same poor resolution as video tapes.

In the field of printing, the image processing system includes an original scanning therefor unit, computer and exposure recording. The original therefor is scanned and subjected to picture image processing, such as color correction and sharpness processing, and a scanner is used for recording the image on a film. When a color scanner is used, in the original scanning unit a color original is photoelectrically scanned to provide unadjusted three-color (red R, green G and blue B) separation signals, which are stored in a magnetic disc or a magnetic tape. The computer reads data stored therefor to apply various processing, such as color adjustment, tone adjustment and picture image composition, and then provide adjusted four color separation signals. In the exposure recording unit, a film is exposed to scanning exposure in synchronism with the original scanning according to the four-color separation signals, to output an adjusted four-color separation picture image.

Picture image data, read from the original, are enormous and hence they are according to the prior art scanner system, temporarily stored in a magnetic disc or a magnetic tape, and are read as desired. However, the scanner system needs much time to record picture Image data to and read them from a magnetic disk or a magnetic tape and furthermore requires a large space for storing a large number of magnetic discs or tape to store enormous image data, say tens MB of data. In addition, there is a disadvantage that data stored in a magnetic tape may be damaged during long term of storing.

In printing, positioning of an original is necessary for setting it on a reading cylinder; it is hard to set the original on the reading cylinder with an accurate rotation angle for rotating it a predetermined angle. In addition, various kinds of processing, such as color adjustment, masking and sharpness processing, are performed by computer operation, which involves a great amount of processing. This requires a large computer, resulting in an expensive large-scaled system.

Usually in the printing process, the projecting department makes as the first step thereof instructions concerning an enlargement ratio of a lantern slide original and trimming as to what portion thereof is to be printed. For example, in trimming indication a tracing paper is placed on a 35 mm film original for transferring the pattern thereof by pencil to make the indication, with a description of the enlargement ratio. The trimming indication is put on a bag containing the original by an adhesive tape and sent to a printing step together with a schedule sheet. During transportation of this therefor document, the tracing paper can separate from the original or can be spoiled.

In the conventional scanner, an original is applied to the drum and hence there are disadvantages such that finger prints may placed on the original, and such that the original may be broken in separation from the drum. For a small enlargement ratio, an original is directly applied to the drum by spraying a therefor powder to it to avoid Newton therefor rings due to partial difference in adhesiveness between the original and the drum. For a high enlargement ratio, after being dipped in paraffin, an original is applied around the drum by means of transparent polyester film for preventing image of the powder from appearing in the printed picture image. Thus, the scanner involves a problem of the original being spoiled due to spraying of the powder and dipping of the original in paraffin. In addition, these operations therefor require time consuming preparation which reduces productivity.

In the conventional photocopying machine, a photoconductive layer which is deposited together with an electrode is fully therefor charged by corona electric charging at a dark place, after which the photoconductive layer is exposed to intense light to thereby make exposed portions conductive. Charges of the exposed portions are leaked for removal to optically form an electrostatic latent image on the photoconductive layer, and then toner is applied which has an electric therefor charge opposite in polarity to (or the same as) the remaining therefor charge.

The exposure process according to the prior art copying machine requires high voltage and large electric power since electrostatic latent images are formed by exposing intense light after corona charging is fully carried out at high voltage. Although electrostatic latent images obtained can be promptly developed by a toner with ease. The toner development must be carried out at once after formation of the electrostatic latent image since the charge holding time is very short. Thus, it is not possible to perform toner developing of the latent image therefor after a considerable period of time has passed.

SUMMARY OF THE INVENTION

It is an object of the present invention to provide a method and apparatus for recording and reproducing information, which enables recorded characters, drawings, pictures, codes and binary information to be repeatedly reproduced in a quality according to need, with high resolution, ease in processing and relatively long term storing of the latent image. The method and apparatus may be used in various fields of technology.

It is another object of the present invention to provide an information recording and reproducing apparatus which records aural information.

It is still another object of the present invention to provide an information recording and reproducing method which improves sensitivity of recording.

It is another object of the present invention to provide an information carrying medium which is able to be repeatedly used by removing a latent image in it in an easy and positive manner.

It is still another object of the present invention to provide an information recording and reproducing apparatus which is capable of reducing time for recording and reading an original image, storing semipermanently the original read and performing picture composition, color correction, masking, sharpness treatment and the like processing with ease.

Another object of the present invention is to provide an information carrying medium containing information of a printing original and original processing, the medium being adapted to pass through each step of a printing process, whereby the printing original may be positively protected from being spoiled.

Still another object of the present invention is to provide an information carrying medium which reduces preparation time for scanning with a color scanner, and which prevents an original from being damaged.

Another object of the present invention is to provide a method, apparatus and recording medium which are capable of copying an original to the recording medium at a high speed with ease.

Another object of the present invention is to provide a method and apparatus which are capable of recording and reproducing information with high quality, high resolution, low voltage and low power consumption.

Still another object of the present invention is to provide a method and apparatus which provide storing of information for a long period as compared to the prior art and is capable of toner development as desired.

SUMMARY OF THE INVENTION

With these and other objects in view, the present invention includes an information carrying medium, including a photosensitive member having a photosensitive layer, and an insulation layer arranged to face the therefor photosensitive member. A piece of input information is stored in the information carrying medium for reproducing the piece of the input information in an electrical, optical or thermal manner.

One aspect of the present invention may perform the reproduction of information by reading charge potential.

According to the present invention, there may be provided electrostatic potential measuring means for reading an electrostatic potential of an information carrying medium having an electrostatic latent image recorded; control means for controlling scan driving of the information carrying medium or the electrostatic potential measuring means, whereby the electrostatic latent image is developed by scan driving the information carrying medium or the electrostatic potential measuring means.

The present invention may have a feature that there are provided a photosensitive member having a photosensitive layer and an insulation layer arranged to face the photosensitive member, the information carrying medium being adapted to store an input information.

In a preferred form of the present invention, there are provided: a photosensitive member having a photoconductive layer provided with an electrode on a front face thereof; an information carrying medium having an insulation layer provided with an electrode on a rear face thereof, the insulation layer facing the photosensitive member, and the photosensitive member and the information carrying medium being arranged along an optical axis; and a switch for applying and removing voltage across the electrodes, an electrostatic latent image, corresponding to an incident optical image, being formed on the information carrying medium by actuating the switch, and wherein the photoconductive layer is made of a low therefor resistance photoconductive material which is adapted to generate as carriers charges of the same polarity as the electrode of the photosensitive member.

In another preferred mode of the present invention, an information recording and reproducing method comprises the steps of: arranging a photosensitive member and an information carrying medium to face to each other; forming an electrostatic latent image on the information carrying medium thus arranged by exposure therefor to light under application of voltage thereby to store information; and erasing the electrostatic latent image by exposure therefor to light under application of a reverse voltage.

In still another preferred form of the present invention, an information recording and reproducing method comprises the steps of: performing exposure therefor to light under application of voltage for storing an electrostatic latent image on an information carrying medium, the medium facing a photosensitive member, and wherein a dielectric member is interposed between the photosensitive member and the information carrying medium.

In a preferred form of the present invention, there is provided an information recording and reproducing apparatus using an information carrying medium in which picture image data read from an original are stored, the stored picture image data is read for picture image processing in a computer to produce processed data each occurrence therefor a picture of image, the data with the processed picture image is stored and the stored date is read therefor to provide output to a recording medium, including the improvement in which the computer includes the information carrying medium as an therefor external memory thereof for storing the picture image data.

Another preferred form of the present invention provides an information recording and reproducing apparatus in which rays of information light from an original, placed in position, are read by means of an input scanner, having the improvement wherein an electrostatic latent image is formed on an information carrying medium by imposing rays of the information light, and wherein a piece of information of an original is read by reading potential of the electrostatic latent image formed.

Therefor still another preferred of the present invention provides an information recording and reproducing apparatus comprising read means for reading data of an electrostatic latent image in an information carrying medium in which a piece of information of a printing original is recorded as therefor an electrostatic latent image by exposure therefor to light under application of voltage; signal processing means for processing the electrostatic latent image data read; display means for displaying an image according to the electrostatic latent image data, and recording means for recording the electrostatic latent image data, signal processed, in the information carrying medium, and wherein the information carrying medium is adapted to therefor be used as an original for printing.

In a preferred form of the present invention, there is provided an information recording and reproducing apparatus comprising: electrostatic latent image reading means for reading an electrostatic latent image in an information carrying medium to provide read signals; signal processing means for signal processing the read signals, the signal processing including a color correction operation; display means for displaying a color image according to the processed read signals; setting up means for setting up a scanner; and exposure means for exposing an engraving film to rays of light, whereby the electrostatic latent image is read for color display.

In a preferred mode of the present invention, there is provided an information recording and reproducing method comprising the steps of: arranging an original in contact or non-contact with an information carrying medium to face to each other, the original having a pattern, including a conductive portion and an insulating portion, formed thereon, the information carrying medium having an insulation layer formed on an electrode substrate; and applying d.c. voltage between the conductive portion of the pattern and the electrode of the information carrying medium for forming an electrostatic latent image on the information carrying medium to correspond to the pattern of the original.

Another preferred mode of the present invention provides an information recording and reproducing method, in which an electrostatic latent image is formed on an information carrying medium by exposing a photosensitive member to rays of light while voltage is applied between the photosensitive member and the information carrying medium, the having improvement wherein the information carrying medium is in the shape of a drum, and wherein a strip of the photosensitive member is used whereby the exposure is carried out by using rays of scanning light or slitted light.

A preferred form of the present invention provides an information recording and reproducing apparatus wherein there are provided a light source for illuminating a plane of an original to obtain rays of information light, a photosensitive member on which rays of information light are imposed, an information carrying medium arranged to face the photosensitive member, and a developer for toner developing the information carrying medium, wherein an electrostatic latent image is formed in the information carrying medium by exposure to light while voltage is applied between the photosensitive member and the information carrying medium, and wherein the electrostatic latent image is toner developed.

Preferably, the information recording and reproducing apparatus of the present invention may comprise a photosensitive member, having a photoconductive layer formed with an electrode at a front face thereof, and an information carrying medium having an insulation layer provided at a rear face thereof with an electrode, and wherein: the information carrying medium is arranged to face the photosensitive member, image exposure is carried out from the side of the photosensitive member or the information carrying medium while voltage is applied across the electrodes, then the information carrying medium is separated from the photosensitive member, and the separated information carrying medium is subjected to toner development for forming a toner picture image.

The information carrying medium is preferably formed in the shape of a card, and data are stored as an electrostatic latent image.

In a preferred form, there are provided information recording and reproducing apparatus comprising irradiating means for applying rays of information light and a photosensitive member including a photoconductive layer, wherein an electrostatic recording card is arranged to face the photosensitive member for storing data as an electrostatic latent image in the electrostatic therefor recording card.

Preferably, the information carrying medium is adapted to record in part thereof a hologram image or a specified electrostatic latent image for preventing forging.

BRIEF DESCRIPTION OF THE DRAWINGS

In the drawings:

FIG. 31 is an illustration of a high resolution information recording and reproducing apparatus of the present invention;

FIG. 32 is a view showing a three color separation optical system;

FIGS. 33(a) to 33(c) are views illustrating how color therefor photography is carried out;

FIG. 34 is an illustration of an example of a fine color filter;

FIG. 35 is an illustration of an example in which a fine color filter and Fresnel lens are used in combination;

FIGS. 51(a) to 51(c) illustrate an information recording and reproducing method of the present invention for erasing a latent image;

FIGS. 52(a) and 52(b) illustrate another embodiment of the present invention for erasing a latent image by uniform exposure;

FIG. 68 is an illustration of the trimming operation of an original in the present invention;

FIGS. 69(a)–(d) are views illustrating a sharpness processing in the present invention;

FIGS. 77(a) to 77(c) are views illustrating how to form screen dots in the present invention;

DESCRIPTION OF THE PREFERRED EMBODIMENTS

Figure 1A:
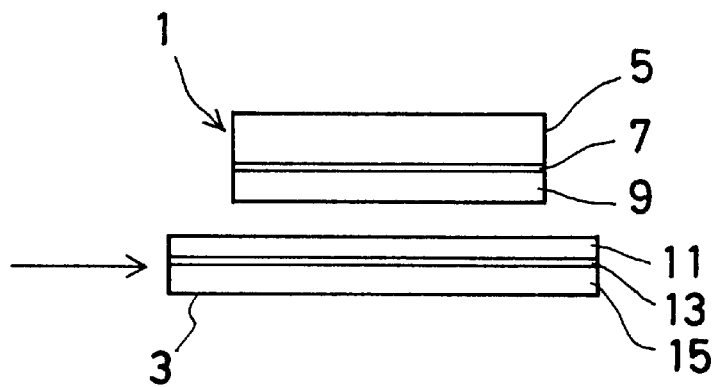
FIG. 1 is a diagrammatic view illustrating the principle of an information recording and reproducing method according to the present invention.
Figure 1B:
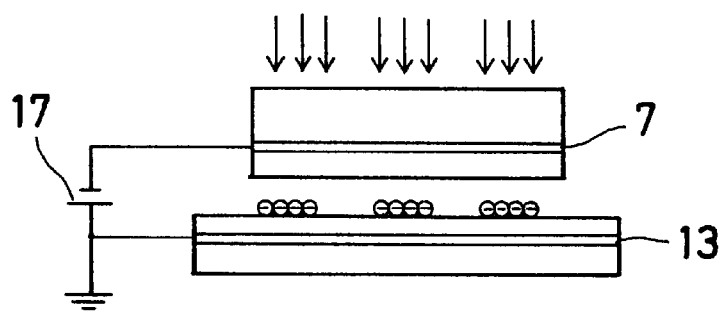
Figure 1C:
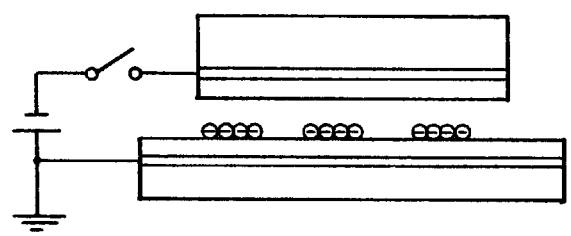
Figure 1D:
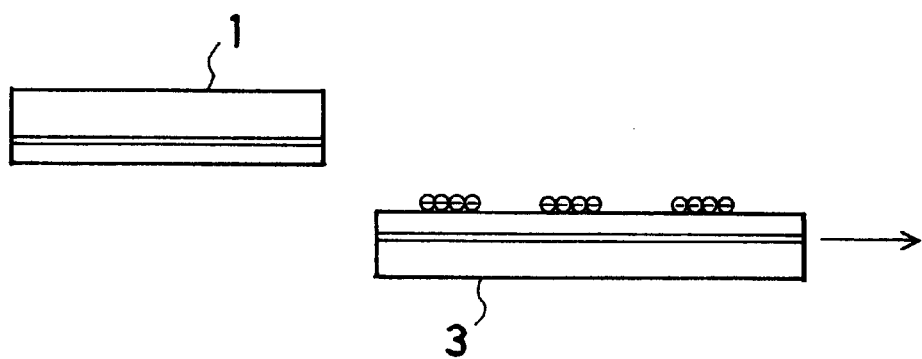

How to record information according to the information recording and reproducing method of the present invention is illustrated in FIG. 1, in which reference numeral 1 designates a photosensitive member, 3 an information carrying medium, 5 a photoconductive layer backing member, 7 an electrode, 9 a photoconductive layer, 11 an insulation layer, 13 an electrode, 15 an insulation layer backing member and 17 a power source.

In the mode of the invention in therefor FIGS. 1(a) to 1(h), exposure is performed from the side of the photosensitive member 1, which comprises a photoconductive layer backing member 5 made of 1 mm thick glass, a transparent photosensitive electrode 7 of 1000 Å thick ITO (indium-tinoxide) coated on the photoconductive layer backing member 5, and an about 10 μm thick photoconductive layer 9 disposed on the electrode 7. Spaced from the photosensitive member 1 with a gap of about 10 μm is an information carrying medium 3 which includes an insulation layer backing member 15 made of a 1 mm thick glass, a 1000 Å thick Al electrode 13 vapor deposited on the backing member 15, and a 10 μm thick insulating layer 11 coated on the electrode 13. The information carrying medium 3 is spaced about 10 μm apart from the photosensitive member 1 as shown in FIG. 1(*a*). A voltage from the D.C. power source 17 is applied across the electrodes 7 and 13 as in FIG. 1(*b*). In this state, no change occurs between the electrodes in a dark place since the photoconductive layer 9 is a high resistant material. When the photosensitive member 1 is exposed to light, portions of the photoconductive layer 9, to which the therefor light ray is applied, therefor become conductive, and hence discharging occurs between the layer 9 and the insulation layer 11 to thereby store charges in the insulation layer 11.

After the exposure, the voltage is removed by therefor turning the switch off as shown in FIG. 1(*c*). Then, an electrostatic latent image is therefor obtained by taking out the information carrying medium 3 as in FIG. 1(*d*).

It is to be noted that the photosensitive member 1 and the information carrying medium 3 may be arranged in contact with each other, in which case positive or negative charges are injected from the photosensitive electrode 7 into the exposed portions of the photoconductive layer 9. These charges are attracted by the electrode 13 of the information carrying medium 3 and are transferred through the photoconductive layer 9 to the surface of the insulation layer 11 where the charge transfer is stopped to store the injected charges. Then, the photosensitive member 1 and the information carrying medium 3 are separated with charges stored in the insulation layer 11.

When the mode of recording in FIGS. 1(*a*)–(*d*) is applied to planar analog recording, a high resolution is obtained as in silver salt photography and surface charges on the insulation layer 11 can be stored for a fairly long period without discharging in a light place or a dark place due to excellent insulation therefor properties of the atmosphere, although they are exposed to the latter.

The time of holding charges on the insulation layer 11 depends on the physical nature of the layer, specifically the charge trapping characteristic thereof, other than the insulation of the air. Injected charges may be stored on the surface of the insulation layer 11 and may be microscopically migrated into the inside of the insulation layer near the surface thereof, in which inside electrons and holes are trapped. Thus, injected charges can be stored for a fairly long period of time. To store the information carrying medium 3, the insulation layer 11 may be covered with an insulation film or the like material for preventing physical therefor damage of the information carrying medium and discharging in case of high humidity.

Materials used for the photosensitive member and the information carrying medium according to the present invention will be explained below.

There is no specific limitation of the material and thickness of the photoconductive layer backing member 5 although it must have a rigidity sufficient to support the photosensitive member 1 and for a case in which information is recorded by therefor applying rays of therefor light from the side of the photosensitive member 1, it must be transparent to the light. Use may be made of a flexible plastic film, metallic foil, paper, glass, plastic sheet, metallic plate (which may therefor serve as an electrode) or the like rigid body. When the apparatus is used as a camera in which natural light is incident on the photosensitive member, about 1 mm thick transparent glass plate or plastic film or sheet is used for the photoconductive layer backing member 5.

The electrode 7 is formed on the photoconductive electrode backing member 5 except that the latter is made of a metal. The electrode 7 has no specific limitation in material if its specific resistance is $10^6$ Ω·cm or less and may be an inorganic metallic conductive film, inorganic metallic oxide conductive film or the like film. Such a electrode 7 is formed on the photoconductive layer backing member 5 by vapor deposition, sputtering, CVD, coating, plating, dipping, electrolytic polymerization or therefor similar processes. The thickness of the electrode 7 depends on the electrical characteristic of the material thereof and voltage applied in recording of information. Specifically, the electrode 7 when made of aluminum may have a thickness of about 100–3000 Å. When the photosensitive member electrode 7 is exposed to rays of light as well as the photoconductive layer backing member 5, it must have optical characteristics as described in connection with the backing member 5. Specifically, for visible light (400–700 nm) as the information light, the photosensitive member electrode 7 may be a transparent electrode, translucent electrode or transparent organic electrode. The transparent electrode may be formed by sputtering or vapor depositing ITO ($In_2O_3$—$SnO_2$, $SnO_2$) or the like compound or by coating a mixture of a fine powder of such a material and a binder. The semitransparent electrode may be produced by vapor depositing or sputtering Au, Pt, Al, Ag, Ni, Cr or the like material. The transparent organic electrode may be formed by coating tetracyanoquinodimethane (TCNQ), polyacetylene or the like substance.

Also, for infrared light (having a wave length therefor longer than 700 nm) as the information light, the electrode materials above named may be used in the present invention. A colored visible light absorbing electrode may be used as the photosensitive member electrode 7 for therefor cutting off visible light.

The electrode materials above named may be generally used for ultraviolet light, having a wave length 400 nm or shorter, as the information light, but it is not preferable to use materials, such as an organic polymer, soda glass or the like material, which absorb ultraviolet light. It is preferable to use a material, such as silica glass, which therefor allows ultraviolet light to pass through.

When exposed to light, the exposed portion of the photo conductive layer 9 generates photocarriers (electrons and holes) which moves thicknesswise through it. This effect is large particularly when an electric field exists. The photoconductive layer 9 may be made of the following organic photoconductive materials, inorganic photoconductive materials and organic-inorganic composite photoconductive materials.

(A) Inorganic photoconductive or photosensitive material

As therefor an inorganic photosensitive material, use may be made of amorphous silicon, amorphous selenium, cadmium sulfide, zinc oxide or the like substance.

(i) amorphous silicon photosensitive member therefor an amorphous silicon photosensitive member may therefor include (1) amorphous silicon hydride (a-Si:H) and (2) amorphous silicon fluoride (a-Si:F).

These materials may be doped with no impurity, doped with B, Al, Ga, In, Tl or the like element to be a p-type (or hole carrier type), or doped with P, Ag, Sb, Bi or the like element to be a n-type (or electron carrier type).

The photosensitive or photoconductive layer may be formed in such a manner that silane gas and an impurity gas are introduced into a low vacuum atmosphere ($10^{-2}$–1 Torr) together with hydrogen gas, and then deposited by a glow discharge on an electrode substrate, heated or not heated, to form a film. They may be formed by thermochemically reacting such gases on a heated electrode substrate. Alternatively, the photosensitive layer may be formed in a single film layer or laminated film layers by vapor depositing or sputtering a solid material thereof. The thickness of the photosensitive layer may be 1 to 50 μm.

A charge injection barrier layer may be provided on the surface of the photosensitive member electrode 7 for preventing the layer 9 from being charged due to injection of charges from the transparent electrode 7 when the layer 9 is not subjected to light. It is preferable to form by glow discharging, vapor deposition or sputtering, an insulation layer, such as a-SiN, a-SiC, $SiO_2$ or $Al_2O_3$ layer, as such a charge injection barrier layer on at least one of the electrode substrate or the uppermost layer (surface layer ) of the photosensitive member. If the insulation layer has an excessive thickness, it does not allow current to flow when exposed, and hence the thickness should be 1000 Å or smaller. Preferably, the thickness is about 400–500 Å for ease of fabrication.

It is preferable to provide a charge carrier layer, as a charge injection barrier layer, on the electrode substrate, the charge carrier layer having a charge carrier capacity of a polarity opposite to the polarity of the electrode substrate, using a rectification effect. A hole carrier layer and an electron carrier layer may be provided for therefor an electrode of negative and positive polarities, respectively. For example, silicon doped with boron, a-Si:H ($n^+$) provides a rectification effect with improved the carrier characteristic of therefor holes and a layer made of such a material serves as a charge injection barrier layer.

(ii) amorphous selenium photosensitive material includes (1) amorphous selenium (a-Se), (2) amorphous selenium tellurium (a-Se-Te), (3) amorphous arsenic selenium compound (a-$As_2Se_3$), and (4) amorphous arsenic selenium compound +Te.

A photoconductive layer of these compounds may be formed by vapor deposition or sputtering and the charge injection barrier layer, such as $SiO_2$, $Al_2O_3$, SiC and SiN layer may be formed on the electrode substrate by vapor depositing, sputtering and glow discharging. The photoconductive layer may include laminated layers of compounds (1)–(4). The photoconductive member layer may be equal in thickness to the amorphous silicon photoconductive member.

(iii) cadmium sulfide (CdS)

The photoconductive layer of this photosensitive material may be formed by coating, vapor therefor depositing and sputtering. In the case of vapor deposition, a solid particle of CdS, placed on a tungsten board, is vapor deposited by resistance heating or by electron beam (EB) vapor depositing. In sputtering, CdS is deposited on a substrate in therefor an atmosphere of argon plasma. In this case, CdS is usually deposited in an amorphous state but a crystalline oriented film oriented thicknesswise is obtained by selecting sputtering conditions. In coating, CdS particles with grain size 1 to 100 μm may be dispersed into a binder to form a mixture, which is dissolved into a solvent and then coated over a substrate.

(iv) zinc oxide (ZnO)

The photoconductive or photosensitive layer may be formed by coating or chemical vapor deposition (CVD) of this material. For coating, ZnS particles having particle size 1 to 100 μm are dispersed into a binder to prepare a mixture, which is dissolved into a solvent and then coated on a substrate. According to CVD, an organic metal, such as diethylzinc and dimethylzinc, and oxygen gas are mixed in a low vacuum ($10^{-2}$–1 Torr) and then chemically reacted therefor with each other on a heated electrode substrate (150–400° C.) to deposit on it as a zinc oxide film, which is oriented thicknesswise.

(B) Organic photoconductive or photosensitive layer

The organic photoconductive or photosensitive layer may therefor be a single layer or photosensitive layer a function separation photosensitive member.

(i) Monolayer photosensitive member

Monolayer photosensitive layer may include a mixture of a charge generating substance and a charge transfer substance.

Charge generating substance

The charge generating substance is a substance which easily generates charges and may, according to the present invention, include, for example, an azo pigment, bis-azo pigment, tris-azo pigment, phthalocyanine pigment, pyrylium salt dye, porylene dye and methyne dye.

Charge transfer substance

The charge transfer substance has an excellent charge transfer characteristic and may include a hydrazone, pyrazoline, polyvinylcarbazole, carbazole, stylbene, anthracene, naphthalene, tridiphenylmethane, azine, amine and aromataic amine.

A complex may be formed by the charge generating substance and the charge transfer substance to use as a charge transfer complex.

Generally, a photosensitive layer has a photosensitive characteristic which depends on the light absorption characteristic of the charge generating substance, but a complex, made by mixing the charge generating substance and the charge transfer substance, changes, in photoabsorption characteristic. For example, polyvinylcarbazole (PVK) is sensitive in the ultraviolet region, trinitrofluorenone (TNF) near the wave length of 400 nm and PVK-TNF complex therefor in the 650 nm wave length region. The thickness of such a single layer photosensitive layer is preferably 10–50 μm.

(ii) Function separation photosensitive member

Charge generating substances have a nature to easily absorb light and therefor trap charges while charge transfer substances are excellent in charge transfer but have a poor photoabsorption characteristic. For these reasons, the function separation photosensitive member separates these substances to fully exhibit their characteristics and has a charge generating layer and charge carrier layer laminated to each other.

Charge generating layer

Substances which constitute the charge generating layer may include, according to the present invention, azo, trisazo, phthalocyanine, acid xanthene dye, cyanine, styril pigment, pyrylium, perylene, methine, a-Se, a-Si, azulenium salt and squalium salt.

Charge transfer layer

Substances which constitute the charge transfer layer may according to the present invention contain, for example, a hydrazone, pyrazoline, PVK, carbazole, oxazole, triazole, aromatic amine, amine, triphenylmethane and polycyclic aromatic compound.

To fabricate the function separation photosensitive member, a charge generating substance is applied over the electrode together with a binder resin to form a charge generation layer, and then a charge carrier material, dissolved into a solvent with a binder resin is applied over the charge generation layer to form a charge carrier layer. The charge generation layer and the charge carrier layer are preferably 0.1–10 μm and 10–50 μm in thickness, respectively.

Therefor both the single layer photosensitivemember and the function separation photosensitive member may, according to the present invention include as the binder, for example, a silicone resin, therefor stylene-butadiene copolymer, The binder may be added at an amount of 0.1–10 parts by weight per 1 part by weight of each of the charge generation substance and the charge transfer substance. Coating of the photosensitive layer may include dipping, vapor deposition, sputtering or the like processing.

The charge injection barrier layer is formed on at least one of opposite faces of the photoconductive layer 9 so as to prevent dark current (charge injection from the electrode), that is, a phenomenon of charges in the photosensitive layer as if the layer were exposed to rays of light when voltage is applied across it.

Current hardly flows to the photoconductive layer or the surface of the insulation layer in the presence of the charge injection barrier layer by application of voltage. However, upon exposure therefor to light, portions of the charge injection barrier layer which correspond to the exposed portions of the photoconductive layer therefor are subjected to high electric field since charges (electrons or holes) generated from the photoconductive layer occur. Thus, current flows through the charge injection barrier layer. Such a charge injection barrier layer may include an inorganic insulative film, organic insulative polymer film, insulative monomolecular film, and a laminated film of these monolayers. The inorganic insulative layer may be formed by glow discharging, vapor depositing or sputtering of, for example, $As_2O_3$, $B_2O_3$, $Bi_2O_3$, CdS, CaO, $CeO_2$, $Cr_2O_3$, CoO, $GeO_2$, $HfO_2$, $Fe_2O_3$, $La_2O_3$, MgO, $MnO_2$, $Nd_2O_3$, $Nb_2O_5$, PbO, $Sb_2O_3$, $SiO_2$, $SeO_2$, $Ta_2O_5$, $TiO_2$, $WO_3$, $V_2O_5$, $Y_2O_5$, $Y_2O_3$, $ZrO_2$, $BaTiO_3$, $Al_2O_3$, $Bi_2TiO_5$, CaO—SrO, CaO—$Y_2O_3$, Cr—SiO, $LiTaO_3$, $PbTiO_3$, $PbZrO_3$, $ZrO_2$—Co, $ZrO_2$—$SiO_2$, AlN, BN, NbN, $Si_3N_4$, TaN, TiN, VN, ZrN, SiC, TiC, WC and $Al_4C_3$. The thickness of the inorganic insulative layer depends on the material thereof in view of insulation to prevent injection of charges. The charge injection barrier layer, using the rectification effect, is provided with a charge carrier layer which is capable of transporting charges of polarity, opposite to the polarity of the electrode substrate, by the rectification effect. Such a charge injection barrier layer may include an inorganic photoconductive layer, organic photoconductive layer and organic-inorganic composite photoconductive layer and the thickness thereof may be 0.1–10 $\mu$m. Specifically, when the electrode is negative, there may be provided an amorphous silicon photoconductor layer, doped with B, Al, Ga, In or the like element or an organic photoconductive layer formed by dispersing into a resin an amorphous selenium, oxadiazole, pyrazoline, polyvinylcarbazole, stylbene, anthracene, naphthalene, tridiphenylmethane, triphenylmethane, azine, amine and aromatic amine. When the electrode is positive, an amorphous silicon photoconductor, doped with P, As, Sb, Bi or the like element, or a ZnO photoconductive layer may be formed. Such layers may be formed by glow discharging, vapor deposition, sputtering, CVD, coating or the like processing.

Materials of the information carrying medium and how to fabricate the information carrying medium will be described below.

The information carrying medium 3 is used together with the photosensitive member 1 for therefor recording information as a distribution of electrostatic charges on the surface or the inside of the insulation layer 11 which is a component of the information carrying medium 3, and thus the information carrying medium itself is used as a recording medium. The charge carrying medium may have various shapes according to information to be recorded or how to record information. For example, when the present invention is applied to an electrostatic camera, which is disclosed in a copending Japanese patent application filed on the same day as the subject application, the information carrying medium may be in the shape of a usual film (single frame or continuous frame) or a disc. For recording digital information or analog information by laser, it may have a tape shape, disc shape or a card shape. The insulation layer backing member 15 serves to reinforce the information carrying medium 3. The backing member 15 may be generally made of the same material as the photoconductive layer backing member 5 and may be required to have light transmissibility. Specifically, as the backing member, a flexible plastic film is used for the information carrying medium 3 made of a flexible film, tape or a disc. When rigidity is required, an inorganic material, such as a rigid sheet and glass, is used as the backing member.

The information carrying medium 3 in the shape of a flexible film, tape and disc will be described below. FIG. 1(e) illustrates a preferred mode of the medium of which resin layer 11 is continuous. The medium has a backing member 15, provided with an electrode layer, and a resin layer 11 coated over the upper face of the backing member to expose opposite lateral peripheries thereof as shown, or coated over the whole surface of the upper face. The information carrying medium has a length twice or more as great as that of one picture, that is, that of one frame of a film of a camera or the track width of a digital information recording medium. A plurality of the information carrying medium may be longitudinally jointed together. In this case, there may be a small slit or gap between two adjacent resin layers 11.

Figure 1E:
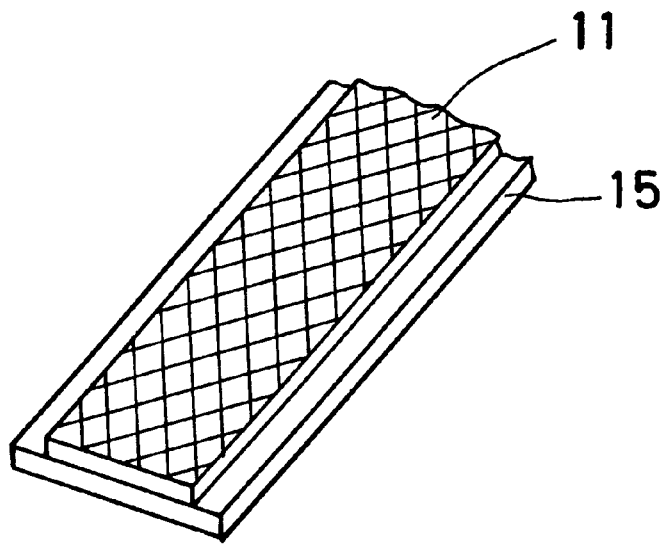
Figure 1F:
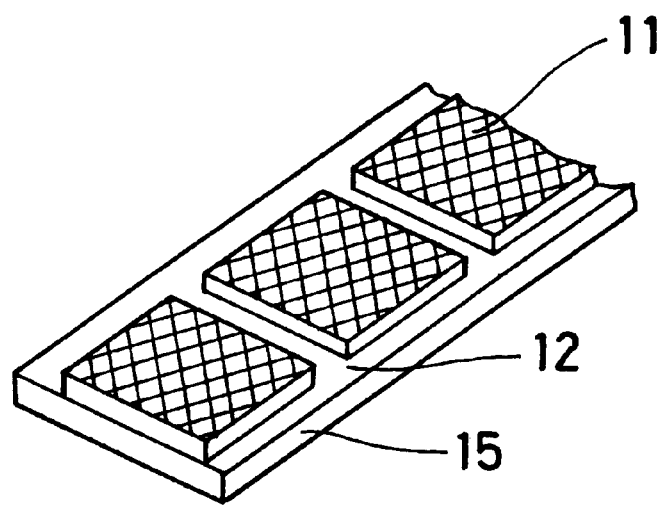

FIG. 1(f) show an information carrying medium of which resin layer 11 is longitudinally discontinuous. This resin layer 11 is formed on a backing layer, such as a plastic film, discontinuously in the longitudinal direction to uncover the opposite lateral peripheries of the backing layer as shown or to cover the whole surface thereof. The resin layer 11 consists of a plurality of sections aligned longitudinally. Although the size of each section depends on the exposure method of an input device of a picture or other type of information, it should be 36 mm×24 mm for a 35 mm camera or be equal to the therefor track width of digital information recording for spot input such as laser beam. The resin therefor lacking portions or the slits, 12 tracking formed between adjacent resin sections, may be used as therefor tracking bands in input and output of information for digital information recording. The present invention may therefor use a plurality of the information carrying medium of this type longitudinally jointed together, in which case a resin therefor lacking portion or a slit may be formed between resin layers of two adjacent mediums.

Figure 1G:
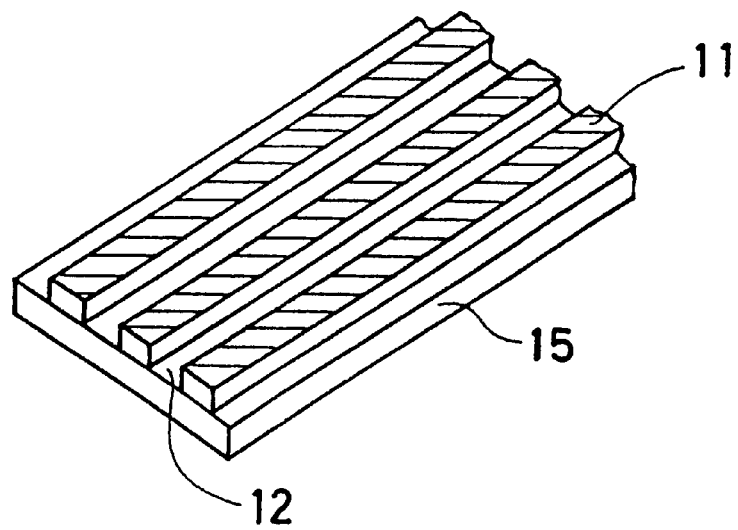

The resin layer 11 may be discontinuous widthwise as illustrated in FIG. 1(g), in which the resin layer is formed transversely discontinuously on the backing member 15, made of a plastic film or the like material and having an electrode layer (not shown) formed thereon. The resin layer 11 is coated over the backing layer 15 to uncover the opposite lateral peripheries thereof as shown or to cover the whole surface thereof. The resin layer 11 includes a plurality, three in this modification, of resin strips. The width of each strip may be equal to or an integer times as large as the track width of digital information to be recorded. A resin therefor lacking portion or gap 12 formed between two adjacent strips may be used as a tracking band for input and output of information.

Figure 1H:
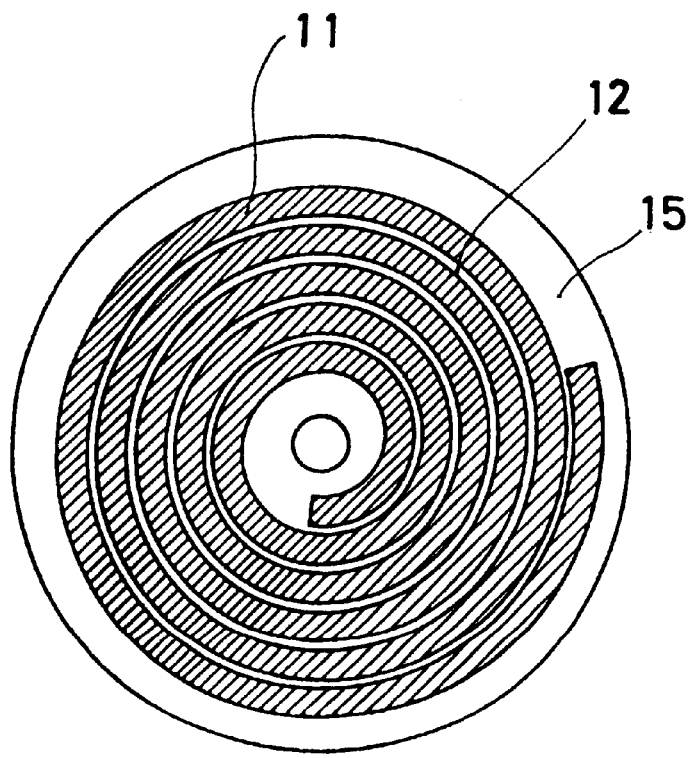

FIG. 1(h) illustrates a disc shaped information carrying medium, which is fabricated by providing a special resin layer 11 on one face of a backing member 15 having an electrode (not shown) formed on it. The resin layer 11 may be provided to cover the whole upper face of the backing member 15, and may have an circular central opening for drive by an input and output unit. The spiral resin therefor lacking portion or spiral groove 12 may be utilized as a tracking band for digital information recording.

The information carrying medium electrode 13 (not shown) may be generally of the same material as the photosensitive member electrode 7 above described and is formed on the insulation layer backing member 15 in the same process as in the photosensitive member electrode 7.

The insulation layer 11 records information as a distribution of electrostatic charges on the surface or in the inside thereof, and it is required to have a high insulation, say $10^{14}\Omega\cdot cm$ or more in specific resistance, for suppressing movement of charges. Such an insulation layer 11 may be formed by dissolving a resin or a rubber into a solvent and subsequently by coating, dipping, vapor depositing or sputtering of the backing member 15, having the electrode 13, with the dissolved resin.

The resin material of the insulation layer 11 may therefor include, according to the present invention, a polyethylene, polypropylene, vinyl resin, styrol resin, acryl resin, nylon 66, nylon 6, polycarbonate, acetal-homopolymer, fluorine resin, cellulose resin, phenol resin, urea resin, polyester resin, epoxy resin, flexible epoxy resin, melamine resin, silicon resin, phenoxy resin, aromatic polyimide, PPO, and polysulfone. The rubber may include, for example, polyisoprene, therefor polybutadiene, polychloroprene, therefor isobutyrene, nitrile rubber, polyacryl rubber, chlorosulfonated polyethylene, ethylene-propylene rubber, fluorine-contained rubber, silicone rubber, polysulfide synthetic rubber, urethane rubber and a mixture thereof.

The insulation layer 11 may be formed by sticking one of the following films on the information carrying medium electrode 13 through an adhesive or the like material: a silicone film, polyester film, polyimide film, fluorine-contained film, polyethylene film, polypropylene film, polyparabanic acid film, polycarbonate film and polyamide film. Alternatively, the insulation layer 11 may be formed by coating the electrode 13 with or by dipping it in a plastic material, such as a thermoplastic resin, thermosetting resin, electron beam setting resin and rubber, the plastic material having a curing agent, solvent or the like necessary material added to it for the processing.

As the insulation layer 11, use may be made of a mono layer or therefor built-up layers formed by Langmuir-Blodgett's technique.

A charge retaining layer may be provided between the insulation layer 11 and the electrode 13 or on the outer face of the insulation layer 11. The charge retaining layer is a layer into which charges are injected when a strong electric field ($10^4$ V/cm or larger ) is applied to it while charges are not injected in a low electric field (less than $10^4$ V/cm).

As the charge retaining layer, use may be according to the present invention, for example, of $SiO_2$, $Al_2O_3$, SiC and SiN. An organic film, such as a vapor-deposited polyethylene film and vapor-deposited polyparaxylylene film, may be used for the charge retaining layer of the present invention.

It is according to the present invention preferable to add an electron donative material (electron donor) or electron acceptive therefor material (electron acceptor) to the insulation layer 11 for holding electrostatic charges more steadily. The donor material may include, for example, a styrene, pyrene, naphthalene, anthracene, pyridine and azine compound. Specifically, use may be made of tetrathiofulvalene, polyvinyl-pyrididne, polyvinyl-naphthalene, polyvinyl-anthracene, polyazine, polyvinyl-pyrene, polystyrene, and mixture thereof. The acceptor material may include a halide, cyanide, nitrocompound and the like compound. Specifically, tetracyanoquinodimethane (TCNQ), trinitrofluorenone and their mixture may be used as the acceptor material. The donor material and the acceptor material may be added at about 0.001–10% of the resin of the insulating layer 11. Fine particles may be according to the present invention added to the information carrying medium for steadily holding charges. They may be a finely divided therefor powder of an element of the following groups in the periodic table: IA group ( alkaline metals), IB group (copper group), IIA group (therefor alkaline earth metals), IIB group (zinc group), IIIA group (aluminum group), IIIB group (rare earth metals), IVB group (titanium group), VB group (vanadium group), VIB (chromium group), VIIB group (manganese group), VIII group (iron group and platinum group), IVA group (carbon group), VA group (nitrogen group) and VIA group (oxygen group). The IVA group contains carbon, silicon, germanium, tin and lead, VA group antimony and bismuth, and VIA group sulfur, selenium and tellurium. A finely divided powder of the above-named elements may be also used for steadily holding charges. Metal elements of the above-named substances may be used in the form of metallic ion, finely divided alloy, organic metal and complex. They may be used also in the form of an oxide, phosphate, sulfonated compounds and halogenated compounds. These additives may be added therefor in a trace amount to the information carrying medium made of the above-resins and rubbers. They may be added in an amount of about 0.01–10% by weight of the information carrying medium. The insulating layer 11 must have a thickness 1000 Å (0.1 $\mu$m) or larger in view of insulation and preferably has a thickness 100 $\mu$m or smaller when flexibility is required.

The insulation layer 11 thus formed may be provided on its one face with a protecting film for preventing damage or discharging of information charges on the one face. As the protecting film, a film of adhesive rubber, such as silicone rubber, or a film of a resin, such as a polyterpene resin stuck to the surface of the insulating layer 11. Also, a plastic film may be stuck to the insulating layer 11 by means of an adhesive material such as a silicone oil. Preferably, the protecting film has a specific resistance $10^{14}\Omega\cdot cm$ or more and a thickness about 0.5–30 $\mu$m. A thinner protecting film is preferable for a higher resolution of information of the insulating layer 11. Information in the insulation layer 11 may be reproduced over the protecting layer, or therefor reproduction may be performed in a condition that the protecting layer is separated from the insulation layer.

To hold electrostatic charges, an electret may be used other than the so-called free charge holding method in which surface charges are stored as described above.

FIG. 2 is a view illustrating the electrostatic charges holding method using a photoelectret, in which the same reference characters as in FIG. 1 designate corresponding parts. In FIG. 2, reference numeral 19 indicates a transparent electrode.

Figure 2A:
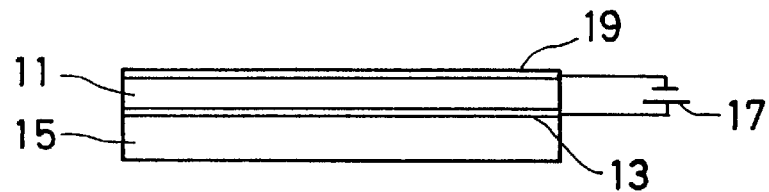
FIG. 2 is a diagrammatic view illustrating the principle of the information recording and reproducing method in FIG. 1 using photoelectret.
Figure 2B:
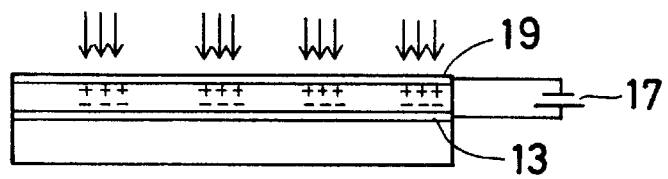
Figure 2C:
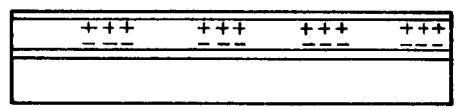

As shown in FIG. 2(a), an electrode 13 is disposed on the support member 15 such as film, and a layer of ZnS, CdS and ZnO of 1–5 $\mu$m is formed on the electrode plate by vacuum evaporation, sputtering, CVD, coating method, etc. Further, a transparent electrode 19 is placed upon the surface of this photosensitive layer on a contact or non-contact basis. When this is exposed to light under voltage application (FIG. 2(b)), an electric charge is generated on the exposed portion by light, and polarization is caused by the electric field. Therefor the electric charge is trapped and remains at the same position even when the electric field is removed (FIG. 2(c)). Thus, the electret corresponding to the exposure value is obtained. The information carrying medium in FIG. 2 is advantageous because it does not require a separate photosensitive member.

Figure 3A:
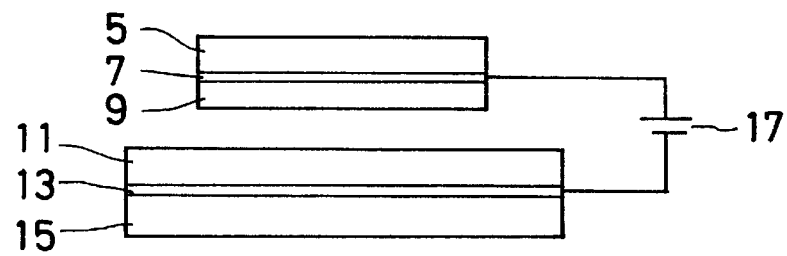
FIG. 3 is a diagrammatic view illustrating the principle of the information recording and reproducing method of the present invention using thermoelectret.

FIG. 3 shows a method used to carry an electrostatic charge using a thermal electret with the same reference therefor numbers as in FIG. 1.

The materials of a thermal electret consist, for example, of polyvinylidene fluoride (PVDF), poly (VDF/ethylene trifluoride), poly (VDF/ethylene tetrafluoride), polyvinyl fluoride, polyvinylidene chloride, polyacrylonitrile, poly-α-chloroacrylonitrile, poly (acrylonitrile/vinyl chloride), polyamide 11, polyamide 3, poly-m-phenylene-isophthalamide, polycarbonate, poly (vinylidene cyanide vinyl acetate), PVDF/PZT complex, etc., and this is provided on the electrode plate 13 in a single layer of 1–50 µm or two types or more of the materials therefor may be laminated.

Figure 3B:
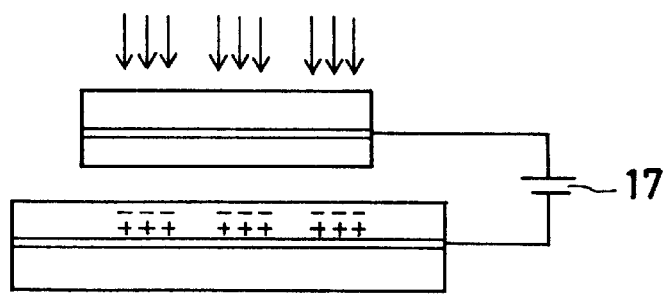
Figure 3C:
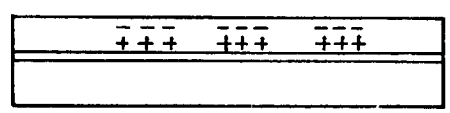

Before being exposed to light, the medium is heated above the glass transition point of the above-mentioned medium material by resistance heating or the like, and it is exposed to light under voltage application in that status (FIG. 3(b)). Ionic mobility is high at high temperature. Therefor a high voltage electric field is applied in the insulated layer of the exposed portion. Of the thermally activated ions, negative electric charges gather at the positive electrode and positive charges at the negative electrode to form the space charge, resulting in polarization. When the medium is cooled down thereafter, the generated electric charge is trapped at the same position even if the electric field is removed, and the electret corresponding to the exposure value is generated (FIG. 3(c)).

Next, as a method to input the information to the insulating layer 11, there is the method to record by a high-resolution electrostatic camera or a method to record by laser. The high-resolution electrostatic camera according to the present invention comprises a recording unit, which consists of a photosensitive member 1 made of a photoconductive layer 9 having therefor an electrode 7 on its front instead of photographic film used on the ordinary camera and of an information carrying medium made of an insulating layer 11 having an electrode 13 on the rear side. When voltage is applied therefor to both electrodes therefor an electric charge is accumulated on the insulating layer in accordance with the quantity of incident light through the photoconductive layer, and an electrostatic latent image of the incident optical image is formed on the information carrying medium. Both mechanical shutter and electric shutter can be used on this camera, and it is possible to maintain the electrostatic latent image for a long period regardless of whether it is stored in light or dark places. Also, a color filter is used, by which it is possible to separate the optical information into R, G and B components through prisms and to take them out as parallel rays. Photographing in color is achievable by forming a frame from 3 sets of the information carrying medium separated into R, G and B components or by aligning R, G and B images on one plane and by forming a frame from one set.

In the recording method by laser, therefor an argon laser (514, 488 nm), helium-neon laser (633 nm) or semiconductor laser (780 nm, 810 nm, etc.) are used as a light source. Therefor the photosensitive member and the information carrying medium closely fit with each other on their surfaces or they are placed in face-to-face position therefor separated by a constant distance, and voltage is applied. In this case, it is preferable to set the electrode of the photosensitive member with the same polarity as that of the carrier of the photosensitive member. Under such conditions, a laser exposure corresponding to an image signal, character signal, code signal and line signal is performed by scanning. Therefor an analog image such as a picture image is recorded by modulating the intensity of the laser beam, whereas therefor a digital image such as a line drawing is recorded by on-off control of the laser beam. The image consisting of dots is formed by on-off control of a dot generator on the laser beam. It is not necessary that the spectral characteristics of the photoconductive layer in the photosensitive member therefor be panchromatic, and it will suffice if it has sensitivity suitable for the wavelength of the laser source.

Next, description is given on the data memory in the form of other than an electric charge.

FIG. 4 is a drawing to explain the information recording and reproducing method based on the present invention using photoconductive particles. In this figure, 1 refers to a photosensitive member, 5 a support member, 7 an electrode, 9 a photoconductive layer, 3 an information carrying medium, 21 a thermoplastic insulating layer, 13 an electrode, 15 a support member, 23 a particle layer, 25 a photomultiplier, and 27 a laser beam.

Figure 4A:
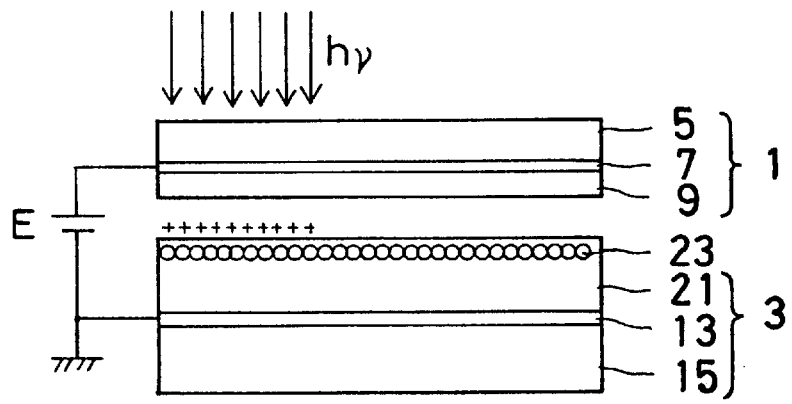
FIGS. 4(a) to 4(d) are diagrammatic views illustrating the information recording and reproducing method of the present invention using photoconductive fine particles.
Figure 4B:
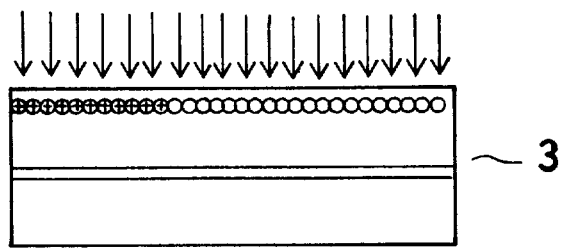
Figure 4C:
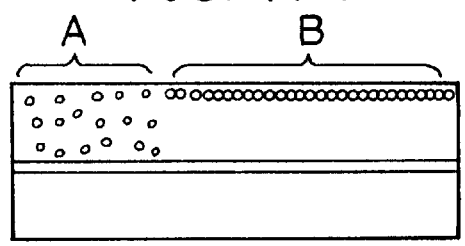

In FIG. 4(a), when image exposure is performed by applying voltage between two electrodes of photosensitive member 1 and information carrier medium 3, electric charge is accumulated on the exposed portion on the information a carrier medium. As shown in FIG. 4(b), carrier is generated in the particles by total exposure of the information carrying medium, and therefor an electric charge with therefor a polarity opposite to that of the surface accumulated charge neutralizes the surface charge. As the result, an electric charge with the same polarity as the surface accumulated charge remains within or on the particles or at the vicinity of the particles.

As the particles to store the electric charge, the electrically conductive materials may be used in addition to photoconductive materials. The method to accumulate electric charge in this case will be described later.

As the material for the photoconductive particles, inorganic photoconductive materials are used such as amorphous silicon, crystalline silicon, amorphous selenium, crystal line selenium, cadmium sulfide, zinc oxide, etc. or organic photoconductive materials such as polyvinylcarbazole, phthalocyanine, azo pigment, etc.

As the electrically conductive materials, the following materials are used: IA group of periodic table (alkali metals), IB group (copper group), II A group (alkali earth metals), II B group (zinc group), III A group (aluminum group), III B group (rare earth metals), IV B group (titanium group), V B group (vanadium group), VI B (chromium group), VII B group (manganese group), VIII group (iron group and platinum group),or carbon, silicon, germanium, tin or lead as IV A group (carbon group), and antimony or bismuth as V A group (nitrogen group), and sulfur, selenium and tellurium as VI A group (oxygen group). These materials are used in the form of fine powder. Of the elements as described above, metals can be used as metallic ions, alloy fine powder, organic metals or in the form of a complex. Further, the elements as described above can be used in the form of an oxide, a phosphate, sulfonated compounds and halogenated compounds. Especially, carbon, gold, copper, aluminum, etc. are preferred.

Figure 4D:
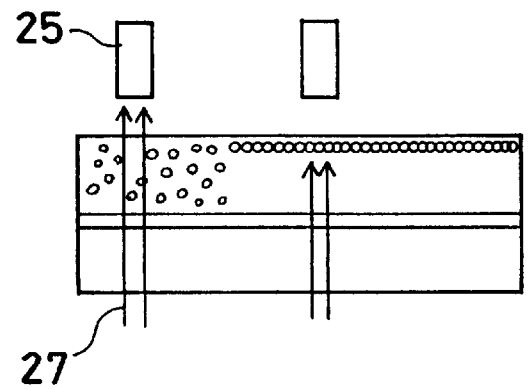
Figure 5A:
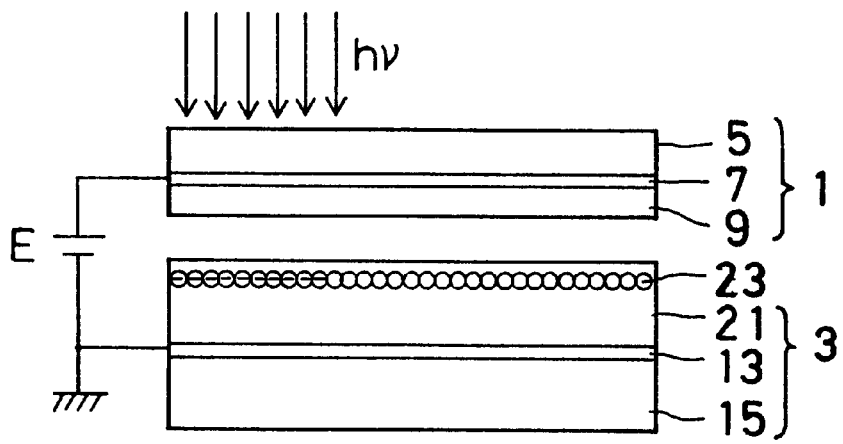
FIGS. 5(a) to 5(c) are diagrammatic views illustrating a charge storing method according to the present invention using photoconductive fine particles.
Figure 5B:
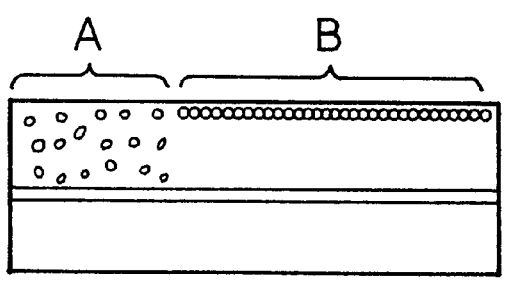
Figure 5C:
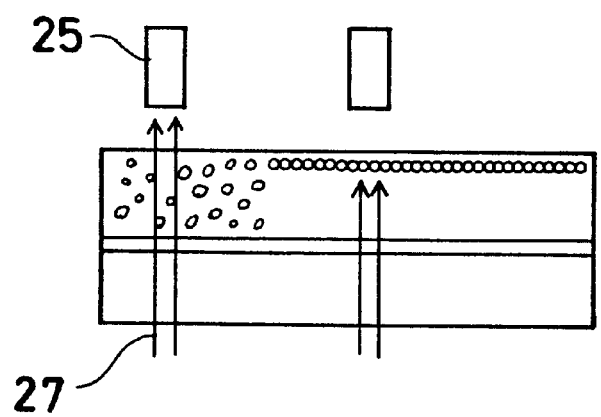

The charge accumulation method therefor when electrically conductive particles are used is explained in conjunction with FIG. 5. In this figure, the reference therefor numbers refer to the same therefor elements as in FIG. 4, and the only difference is that therefor particles 23 therefor are electrically conductive.

In FIG. 5(a), when image exposure is performed by applying voltage between two electrodes of the photosensitive member body 1 and the information carrying medium 3, electric charge is accumulated in the exposed portion on the surface of the information carrying medium. On the other hand, since a great number of electrons and positive charges are present within the electrically conductive particles, the electric charge is accumulated on the surface and the surface charge is neutralized by therefor an electric charge therefor of opposite polarity in the conductive particles. As the result, therefor an electric charge having the same polarity as that of the surface accumulated charge remains within or on the particles or at the vicinity of the particles.

Next, the method to form the particle layer is described.

First, to laminate particle layers near the surface of the resin layers in a single layer or in multiple layers, low pressure vacuum evaporation apparatus is used. Thus, the materials to form the particle layers are deposited by evaporation on the resin layers, which are piled up on the carrier and are in the unhardened, molten or softened conditions. When vaporized under low pressure of about 10 Torr–$10^{-3}$ Torr, the materials to form particle layers are aggregated and are turned to the ultrafine particles with diameter of 10–0.1 $\mu$m. For example, if the resin layer is maintained in the heated and softened conditions during evaporation, the particles are laminated near the interior of the resin layer surface in a single layer or in multiple layers. If the resin layer consists of thermoplastic resin, the resin layer is softened by heating the electrode layer through resistance heating, or the resin layer is softened by direct heating of the base plate by a heater. If the resin layer consists of thermosetting resin, ultraviolet setting resin or electron beam setting resin, the particle layer forming materials are evaporated in the unhardened conditions and they are hardened by an appropriate hardening means after the particle layer is formed.

As another means to form the particle layer near the surface of the resin layer, the particle layers are deposited by evaporation in a single layer or in multiple layers by the same method on the carrier, in which said resin layer is formed and hardened on the electrode plate in advance. In this case, a particle layer is formed on the surface of the resin layer. Then, another layer of the same resin used for the formation of said resin layer or a layer of a different insulating resin is laminated within the thickness range of 0.1 $\mu$m–30 $\mu$m. As the laminating methods, there are dry methods to directly form the resin layers by vacuum evaporation or sputtering or wet methods to use therefor a solution, in which the resin is dissolved by solvents. After the film is formed by spinner coating, dipping, blade coating, etc., the solvent is dried up. To ensure uniform particle size in the formation of the particle layer, it is suggested to maintain the base plate at therefor a temperature so as not to melt the resin layer.

Under the conditions where an electric charge is introduced to the particles, therefor an electric charge with opposite polarity to that of the electric charge accumulated to the particles is induced at the electrode therefor 13, and an electric field is generated in the insulating layer by the electric charge in the particles and the electric charge induced at the electrode. When the information carrying medium is heated under such conditions, the insulating layer is softened if temperature is therefor increased to above the softening point, and the particles having electric charge in them are pulled by the electric field and are dispersed in the insulating layer.

On the other hand, the particles in the unexposed portion remain at the same positions because there is no electric field even when the insulating layer is softened. Thus, when the information carrying medium is cooled down, the particles in the exposed portion are fixed in the dispersed conditions. As the insulating layers, thermoplastic resins may be used such as polyethylene, vinyl chloride resin, polypropylene, styrene resin, ABS resin, polyvinyl alcohol, acryl resin, acrylonitrile-styrene resin, vinylidene chloride resin, AAS (ASA) resin, AES resin, cellulose derivative resin, thermoplastic polyurethane, polyvinyl butyral, poly-4-methylpentene-1, polybutene-1, rosin ester resin, etc.

As shown in FIG. 4(d), when a laser beam is irradiated toward the information carrying medium and is received by photomultiplier therefor 25 on the opposite side, the laser beam transmits therefor through the dispersed region, while it does not transmit therefor through the unexposed portion where the particles form two-dimensional layers, and the transmission light is not detected. Thus, pattern of the particle dispersion can be identified by laser scanning. Therefor a reflection of the electrode is detected in the exposed portion by the reflecting light, and not by transmission light, whereas the reflection light is not detected in the unexposed portion because the incoming light is absorbed by the particles. This again makes it possible to identify the pattern.

Because the surface of the unexposed portion is not frosted as in the conventional type, there is no influence caused by irregular reflection or by scattering, and this makes it possible to read at higher accuracy.

FIG. 6 shows an embodiment in which irregularities are formed on the surface of the information carrying medium for data accumulation.

Figure 6A:
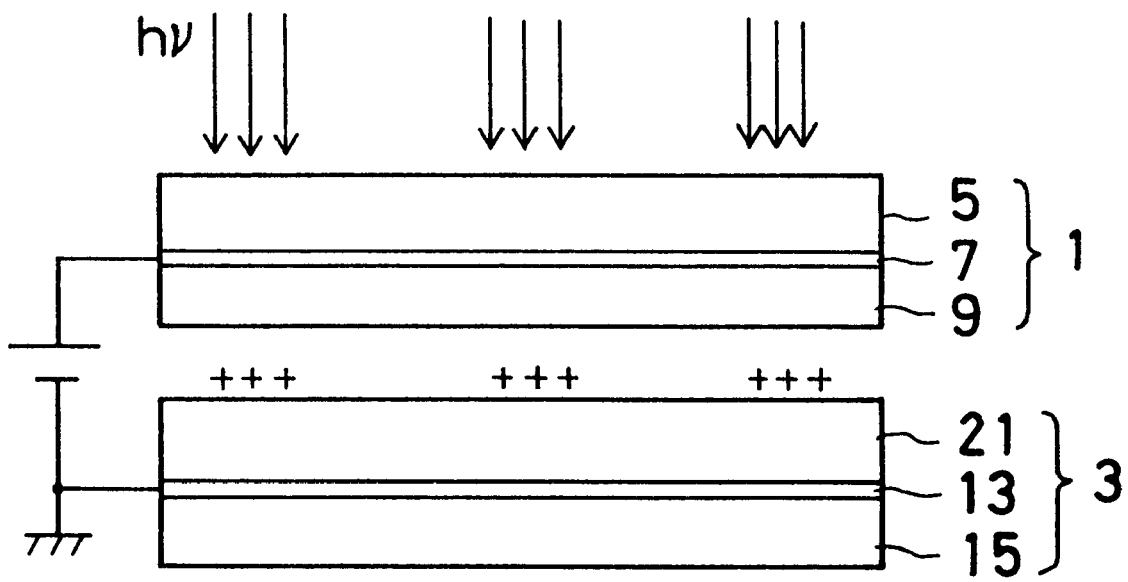
FIGS. 6(a) and 6(b) are views showing how to store information by means of irregularity of the surface of the information recording material.
Figure 6B:
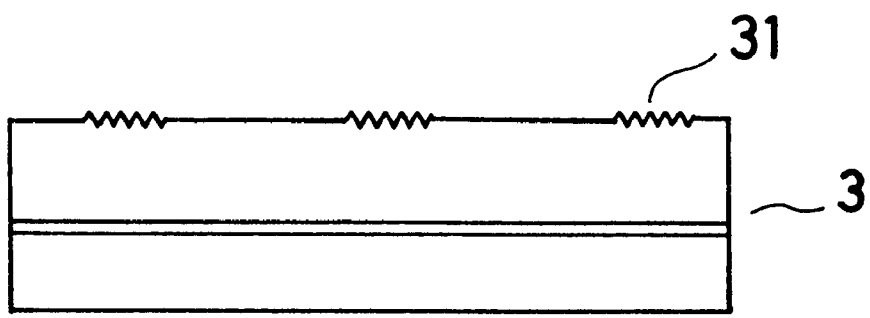

In this embodiment, electric charge is accumulated in a pattern by light exposure under voltage application on the insulating layer 21, consisting of thermoplastic resin as shown in FIG. 6(a), and the information carrying medium 3 is then heated. Because an electric charge with the opposite polarity from that of the surface charge is induced on the electrode 13 corresponding to the charge accumulated portion, an electric field is generated inside layer 21 and the electric charge is pulled toward the electric field. As the result, irregularities as shown in FIG. 6(b) are formed on the surface of the resin plasticized by heating. When the information carrying medium is cooled down, these irregularities are fixed and are recorded as information. When light is irradiated, irregular reflection occurs from these irregularities and the patterns of the irregularities are read by transmission light or reflection light for the purpose of reproducing the information. The electric charges on the surface tend to leak during therefor a subsequent heating process, and most of them disappear.

Figure 7:
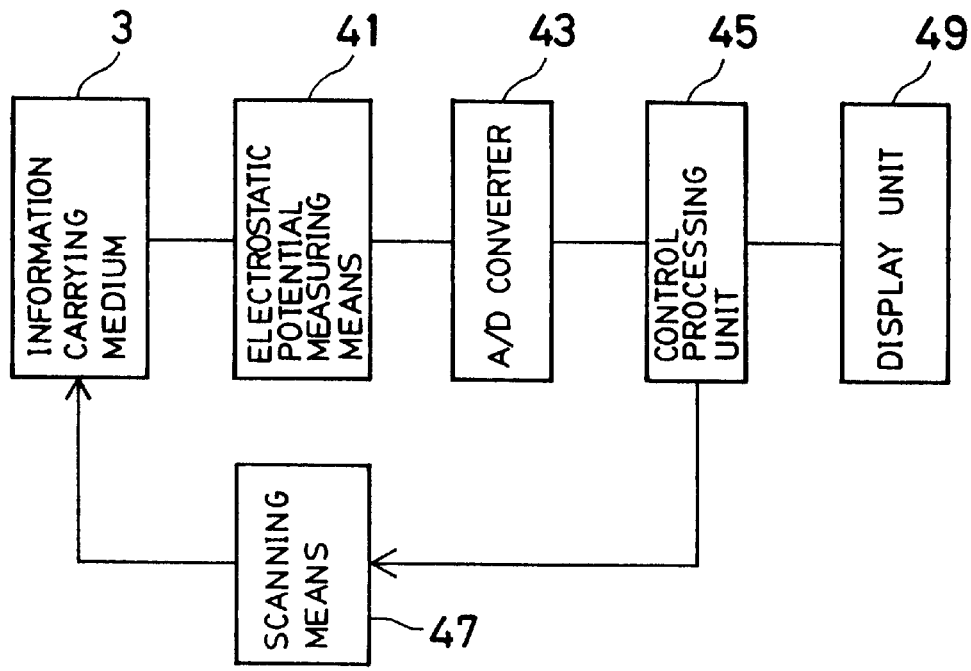
FIG. 7 is a block diagram showing the information recording and reproducing apparatus for picturizing electrostatic latent image according to the present invention.

FIG. 7 represent an embodiment of the information recording and reproducing apparatus according to the present invention. In the figure, 3 is an information carrying medium, 41 a means to measure electrostatic potential, 43 an A/D converter, 45 a control processing unit with built-in CPU, 47 a scan driving means, and 49 a display unit.

In the information carrying medium, an electrostatic latent image is recorded by the method as described for FIGS. 1–3. The electrostatic potential measuring means 41 reads the potential at an arbitrary point on the information carrying medium 3 as signals by various methods such as a contact or a non-contact method, or a DC amplifier method, AC amplifier method, power collecting type, electron beam type, CT scan type, etc., and issues them as analog signals. When detected, the analog potential signals are converted to digital signals by A/D converter 8 to suit the processing by the control processing equipment 45 consisting of a microcomputer and the like. Digital signals thus converted are taken up as the data at the arbitrary point measured on the information carrying medium 3. After the data at a point on the information carrying medium 3 is taken in, the scan driving means 47 consisting of X and Y stages is driven by the control processing equipment 45 to drive and scan the information carrying medium 3, and the data on each portion of the information carrying medium 3 are collected. It is naturally allowed to drive and scan the probe of the electrostatic potential measuring means.

Also, it is possible, for example, to scan the information carrying medium on a two-dimensional basis by primary scan driving of the information carrying medium and by secondary scan driving of electrostatic potential measuring means.

The electrostatic latent image data thus read are further processed by the control processing equipment 45 as necessary and are displayed on the display unit 49. It is naturally allowed to print out the data by connecting the printer as necessary.

Figure 8:
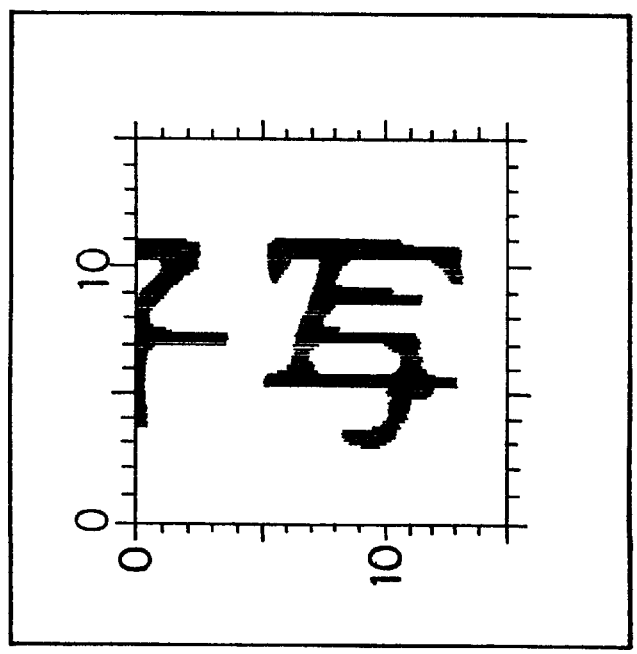
FIG. 8 is an illustration of an electrostatics latent image.
Figure 9:
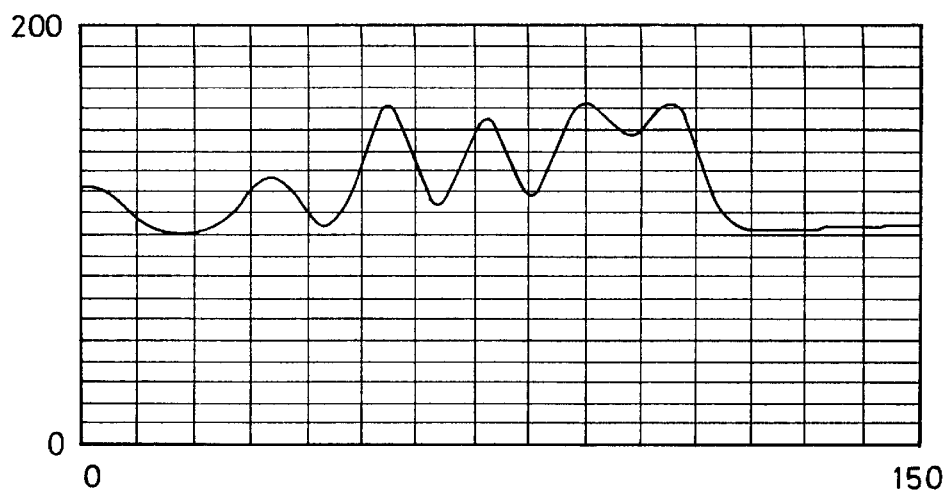
FIG. 9 is a view illustrating a detected potential distribution of the electrostatic latent image in FIG. 8.

FIG. 9 gives the results of the measurement of the potential distribution at Y=8 mm when the image shown in FIG. 8 is formed within the area of X=15 mm and Y=15 mm. It is evident from FIG. 9 that the potential distribution of 100 V min. and 163 V max. is detected.

Figure 10:
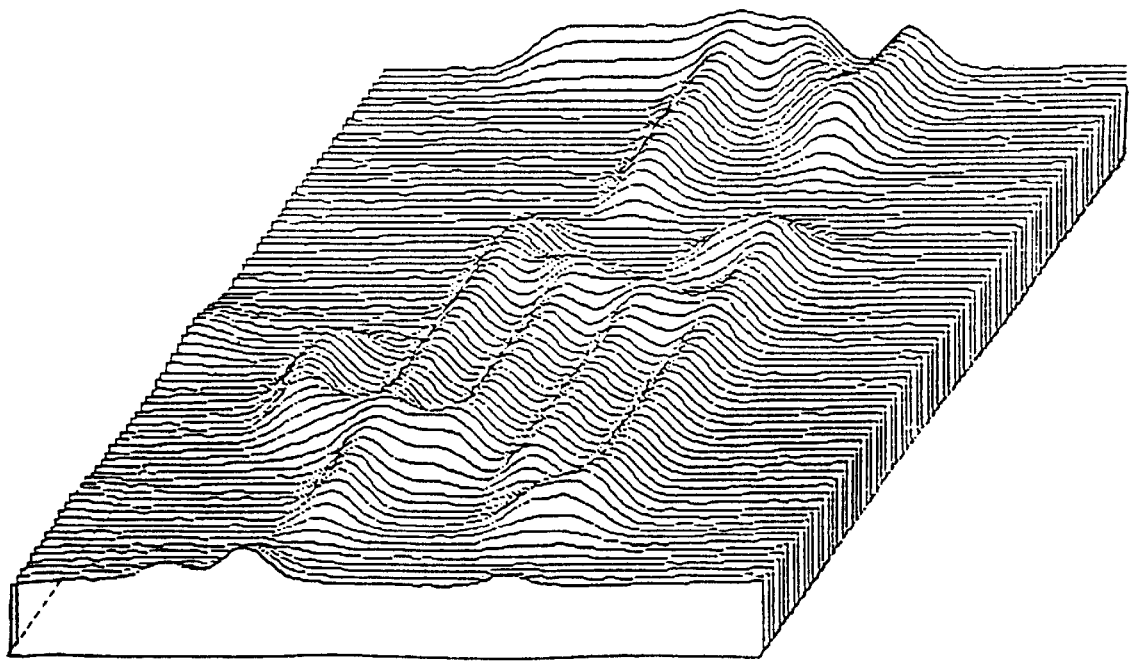
FIG. 10 ia a view showing a developed example of the electrostatic latent image in FIG. 8.

FIG. 10 gives an example, in which the potential on the information carrying medium 3 with the image as shown in FIG. 8 is scanned and read and the stereo image is displayed by the image processing.

In this way, an electrostatic latent image can be taken as data, and the data can be turned to images of various shape by data processing. Since these are taken as data, it is possible to minimize noise by integrating the data or to display the image by partially modifying the data, or to utilize the data for the recording on other recording medium when necessary. Further, it is possible to select and output any region at any time or to reproduce it repeatedly.

In order to take the data recorded on the electronic information carrying medium on a two-dimensional basis as data, it is necessary to move the probe of the measuring unit or the information carrying medium to scan.

As the scanning methods, there are: (1) the method to use a stepping motor, in which therefor a scan is stopped after it is moved to the measuring position and the potential is measured, and it is then moved to the next position. (2) the method, in which the data are moved at constant speed and measurement is repeated at a predetermined constant timing so that the obtained data and the measuring position match each other.

The method (1) provides accurate position control but it is disadvantageous is that the scanning time is too long. To shorten the data collecting time, it is desirable to use the method (2), in which the movement is scanned at constant speed.

Figure 11:
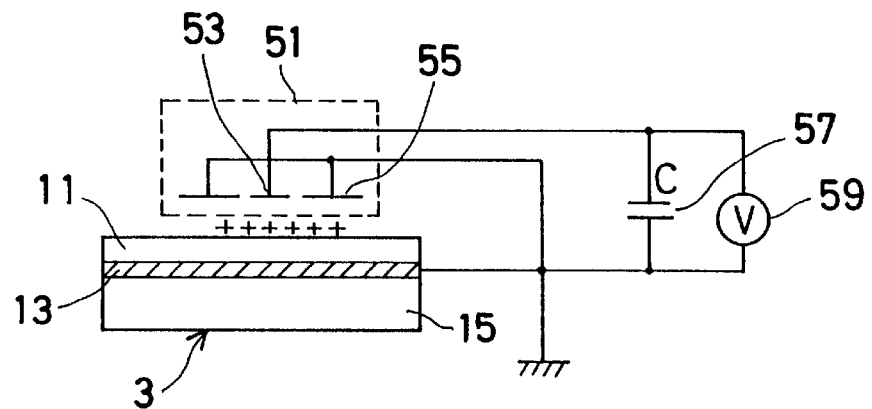
FIGS. 11 to 13 are views illustrating direct current amplification type potential reading methods according to the present invention.

FIG. 11 shows an example of the potential reading method for the information recording and reproducing apparatus according to the present invention, and the reference therefor numbers represent the same therefor elements as in FIG. 1. In this figure, 51 refers to a potential reading unit, 53 a detection electrode, 55 a guard electrode, 57 a condenser, and 59 a voltmeter.

When the potential reading unit 51 is placed face-to-face to the charge accumulated surface of the information carrying medium 3, the electric field generated by the electric charge accumulated on the insulating layer 11 of the information carrying medium 3 exerts action on the detection electrode 53, and the electric charge equivalent to the charge on the information carrying medium is induced on the surface of the detection electrode. Since the condenser 57 is charged with the electric charge equivalent to but having the polarity opposite to the induced charge, and therefor a potential difference is generated between the electrodes of the condenser. By reading this value on voltmeter 59, the potential on the information carrying medium can be obtained. By scanning the surface of the information carrying medium with the potential reading unit 51, an electrostatic latent image can be outputted as an electric signal. When only the detection electrode 53 is used, the resolution may be reduced by the action of an electric field (electric therefor lines of force) by an electric charge in a wider range than the region opposite to the detection electrode of the information carrying medium. Thus, the guard electrode 55 grounded on the surrounding of the detection electrode may be allocated. Then, the electric therefor lines of force will be directed to the direction perpendicular to the surface, and electric therefor lines of force of only the region facing toward the detection electrode 53 will exert action. This makes it possible to read the potential at the region with approximately the same area as that of the detection electrode. Because the accuracy and resolution of the potential reading greatly differ according to the shape, size of the detection electrode and the guard electrode and to the distance from the information carrying medium, it is essential to design the potential reading unit with optimal conditions to suit the specified performance characteristics.

Figure 12:
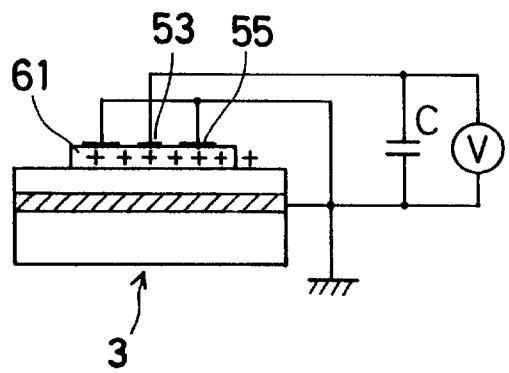

FIG. 12 gives another example of the potential reading method. It is the same as the example of FIG. 11, except that the detection electrode and guard electrode are provided on the insulating protective film 61 and that the potential is detected through this insulating protective film.

By this method, it is possible to keep the distance from the detection electrode at a constant level because detection can be made in direct contact with the information carrying medium.

Figure 13:
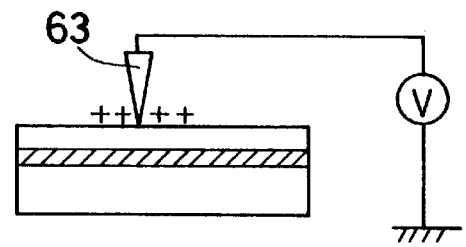

FIG. 13 shows a further example of the potential reading method, by which the potential is detected by bringing the needle electrode 63 in direct contact with the information carrying medium. By this method, high resolution can be attained because the detection area is minimized. If two or more needle electrodes are provided for detection, the reading speed can be increased.

The methods described above relate to the DC amplifier type to detect a DC signal on a contact or non-contact basis. In the following, the examples of an AC amplifier type will be described.

Figure 14:
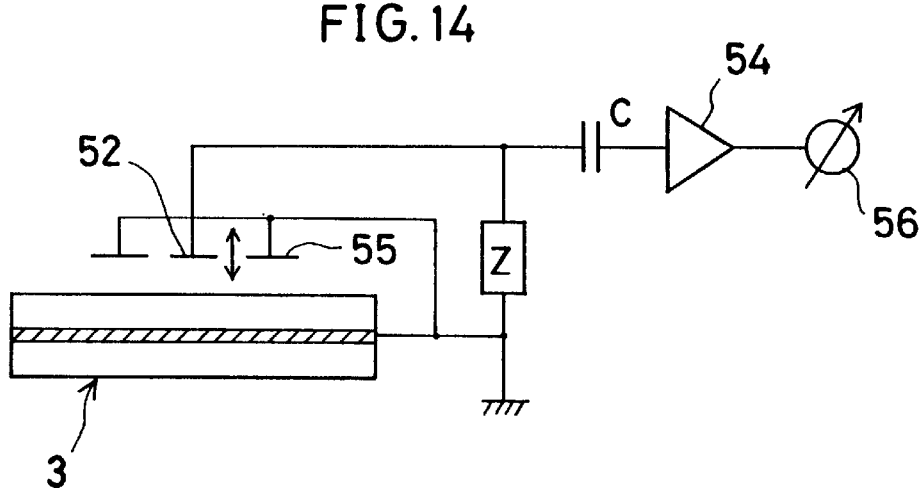
FIGS. 14 to 16 are views alternating current type potential reading methods according to the present invention.

FIG. 14 shows the potential reading method of an oscillating electrode type, in which 52 represents a detection electrode, 54 an amplifier and 56 a metering instrument.

The detection electrode 52 is oscillating and is driven in such manner that the distance is changed over time in relation to the charged surface of the information carrying medium 3. As the result, the potential at the detection electrode 52 is changed over time with therefor an amplitude corresponding to the electrostatic potential of the charged surface. This change of the potential over time is taken out as a voltage change at both ends of impedance Z, and the AC component is amplified by the amplifier 54 through the condenser C. By reading this value on the metering instrument therefor 56, electrostatic potential on the charged surface can be determined.

Figure 15:
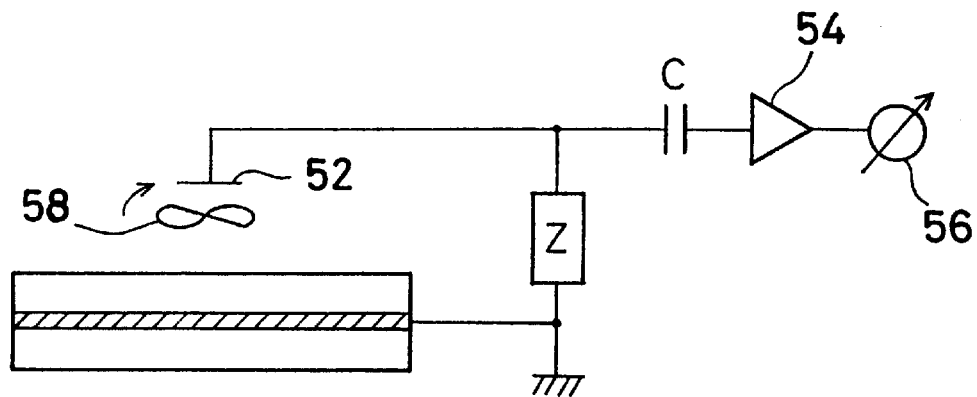

FIG. 15 gives an example of a rotary type detector, and 58 refers to a rotary vane.

An electrically conductive rotary vane 58 is furnished between the electrode 52 and the charged surface of the information carrying medium 3 and is rotated and driven by a driving means not shown. As the result, the space between the detection electrode 52 and the information carrying medium 3 is electrically shielded at periodic therefor intervals. Accordingly, a potential signal with a periodically changing amplitude corresponding to the electrostatic potential of the charged surface is detected, and the AC components are amplified by the amplifier 54 and are read.

Figure 16:
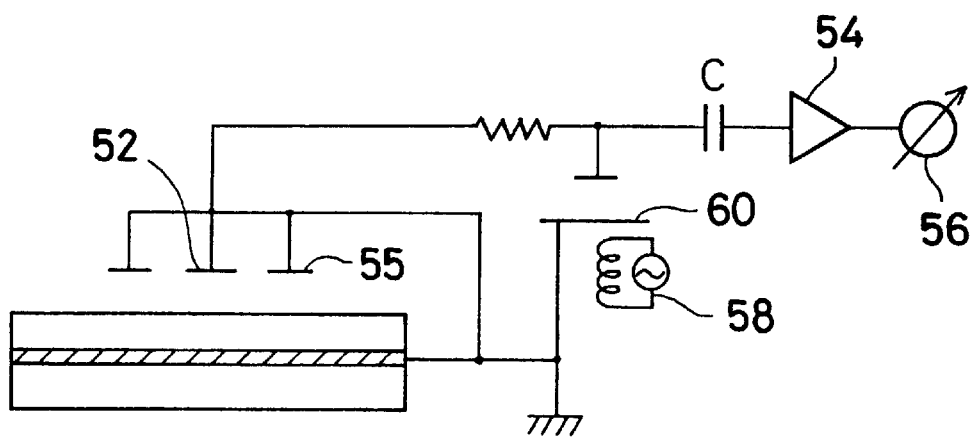

FIG. 16 shows an oscillating capacitative type detector, in which 58 represents a driving circuit, and 60 an oscillating piece.

The oscillating piece 60 of an electrode forming the condenser is oscillated by the driving circuit 58, and the condenser capacity is changed. As the result, the DC potential signal detected by the detection electrode 52 is modulated, and its AC component is amplified and detected. This detector can convert DC to AC and can measure the potential with high sensitivity and stability.

Figure 17A:
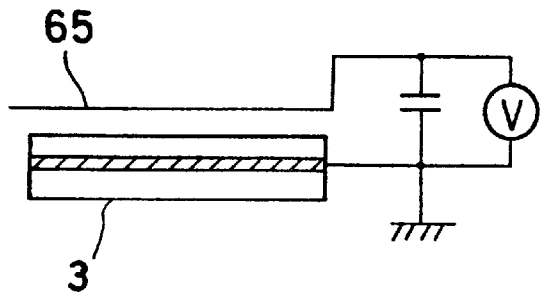
FIGS. 17(a), 17(b) and 18 illustrate how to read potential according to CT scan.

FIG. 17 gives another example of the potential reading method, in which a long and thin detection electrode is used and the potential is detected by CT technique (computed tomography).

Figure 17B:
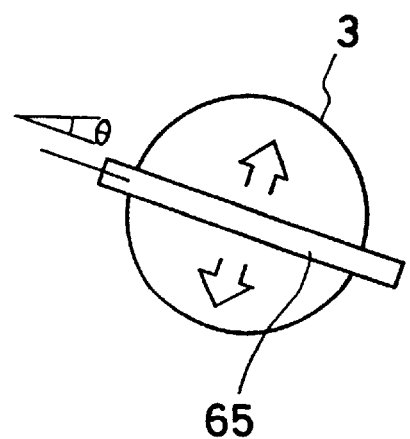

When the detection electrode 65 is allocated to traverse the charge accumulated surface, the obtained data are the value determined by line integral along the detection electrode, i.e. the data corresponding to the projected data by CT can be obtained. Thus, scanning is performed over the total surface of the detection electrode as shown in FIG. 17(b) by therefor arrows, and necessary data can be collected by scanning with different therefor angles θ. By processing the collected data through a CT algorithm, the potential distribution on the information carrying medium can be obtained.

Figure 18:
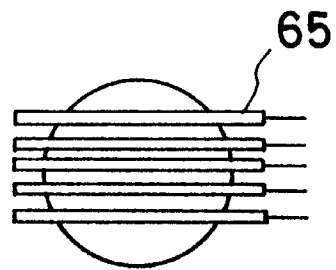

If two or more detection electrodes are disposed as shown in FIG. 18, the data collecting speed can be increased and this facilitates the processing speed as a whole.

Figure 19:
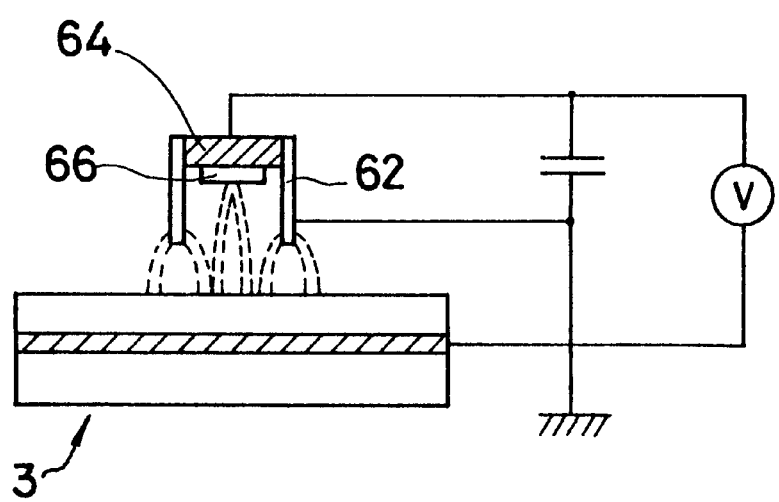
FIG. 19 is an illustration of a power collecting type potential reading method.

FIG. 19 indicates a power collecting type detector, and 62 refers to a grounded type metal cylinder, 64 an insulator, and 66 a power collector.

Radioactive substance is incorporated in the power collector 66, and α-rays are radiated from there. In the metallic cylinder, the air is ionized and positive and negative pair of ions are generated. These ions disappear through re-binding and diffusion in the natural conditions, keeping an equilibrium state, whereas, if an electric field exists, they move toward the direction of the electric field, repeating the collision with the molecules of the air by thermal movement, and they play the role therefor of carrying an electric charge.

Specifically, the air is therefor made to electrically conductive by ions, and it is regarded that an equivalent electric resistance pathway is present therefor between the objects in the surrounding including the power collector 66.

Therefore, supposing that the resistances between the charged surface of the information carrying medium 3 and the grounded metal cylinder therefor 62, between the charged body and power collector 66, and between power collector 66 and the grounded metal cylinder 62 are $R_0$, $R_1$ and $R_2$ respectively, and that the potential of the charged member is $V_1$, the potential $V_2$ of the power collector 66 is as shown below in the steady state:

$$V_2 = R_2 V_1 / (R_1 + R_2)$$

Therefore, by reading the potential of the power collector 66, the potential of the information carrying medium 3 can be obtained.

Figure 20:
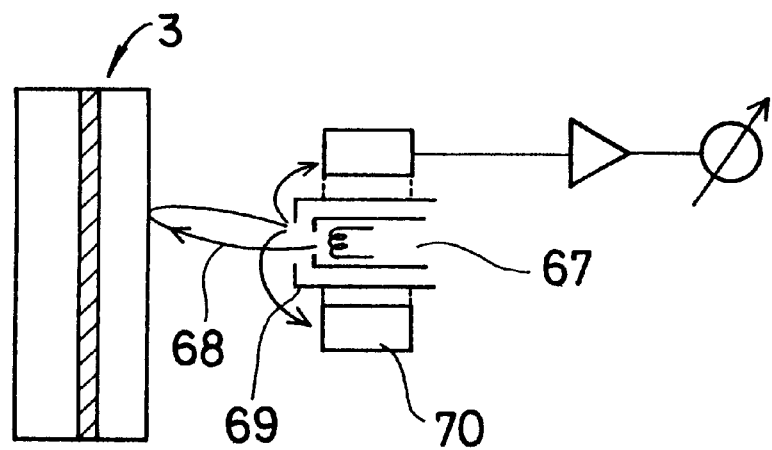
FIG. 20 illustrates an electron beam type potential reading method according to the present invention.

FIG. 20 shows an example of therefor a potential reading unit of the electron beam type, and 67 represents an electronic gun, 68 the electron beam, 69 a first dynode, and 70 a secondary electron multiplier.

The electrons issued from the electronic gun 67 are deflected by an electrostatic deflection or electromagnetic deflection unit (not shown) and scan the charged surface. A part of the scanning electron therefor beam is bonded together with the electric charge on the charged surface, and therefor a charging current flows. This decreases the potential of the charged surface to therefor an equilibrium potential. The remaining modulated electronic beams return to the direction of the electronic gun 67 and collide with the first dynode 69. Its secondary therefor electrons are amplified by the secondary electron multiplier 70 and therefor are taken out as the signal output from the anode. The reflected therefor electrons or the secondary therefor electrons are used as the returning electron beam.

In case of an electron beam type, therefor unit a uniform electric charge is generated on the medium after scanning, whereas therefor a current corresponding to latent image is detected during scanning. If the latent image has a negative charge, there are few accumulated therefor charges by electrons and the charging current is low in the portion with a high electric charge (exposed portion), while maximum charging current flows in the portion without an electric charge. If the latent image has a positive charge, therefor the reverse occurs.

Figure 21:
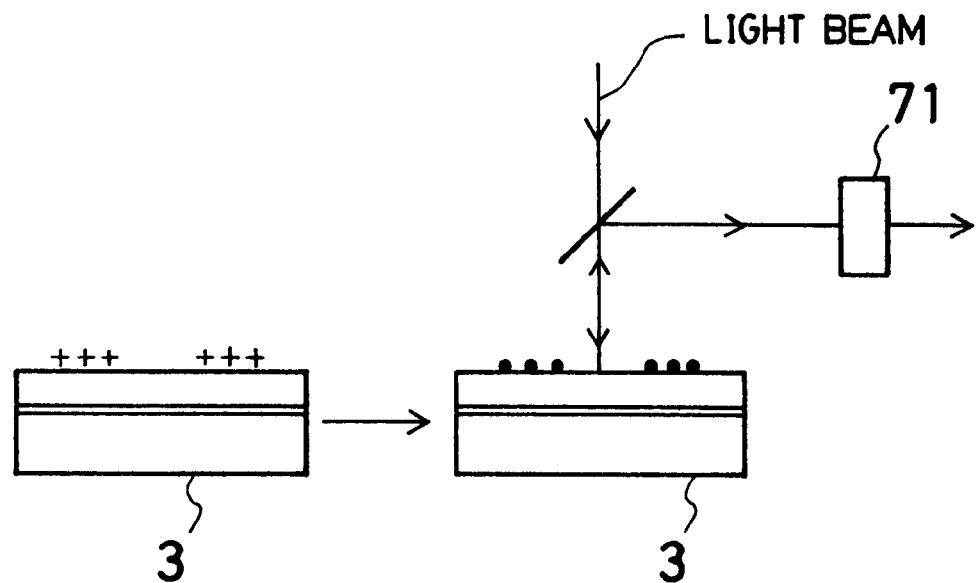
FIGS. 21 and 22 illustrates a method of reading potential, using toner coloring.

FIG. 21 shows another example of therefor a potential reading method. The information carrying medium 3, where the electrostatic latent image is formed, is processed by toner development, and the colored surface is scanned by optical beam. The reflected light is then converted to electric signals by photoelectric converter 71. By reducing the diameter of the optical beam, high resolution can be attained, and the electrostatic potential can be detected in an optically easier manner.

Figure 22:
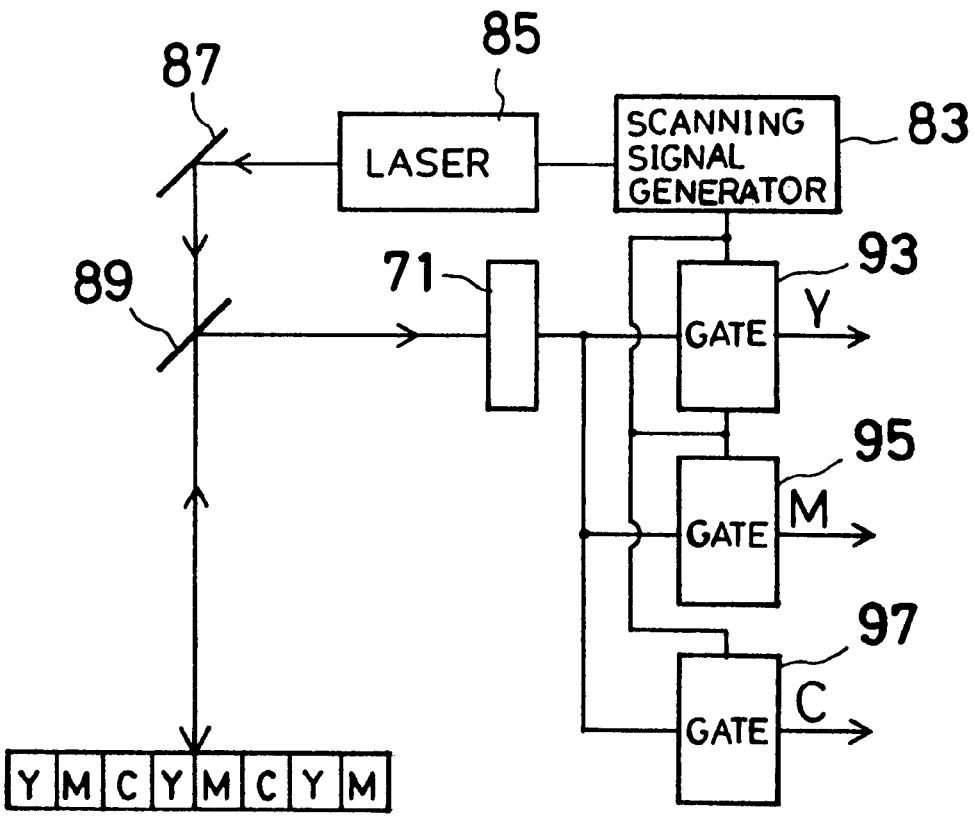

FIG. 22 shows one more example of the potential reading method. The images of R, G and B separated by therefor a fine color filter as described later are processed by toner development, and the colored surface is irradiated by optical beam. Thus, Y, M and C signals are obtained by the reflected light. In the figure, 83 represents a scanning signal generator, 85 a laser, 87 a reflection mirror, 89 a half mirror, 71 a photoelectric converter, and 93, 95 and 97 indicate gate circuits.

Laser beam from the laser 85 is directed by the scanning signal from the scanning signal generator 83 through the reflection mirror 87 and the half mirror 89 to the colored surface for scanning. The reflected light from the colored surface enters the photoelectric converter 71 through half mirror 89 and is converted to an electric signal. If the opening and closing of the gate circuits 93, 95 and 97 are controlled synchronously with the signals from the scanning signal generator 83, the opening and closing of gate circuits 93, 95 and 97 are controlled synchronously with the pattern of the fine filter. Accordingly, the signals for Y, M and C can be obtained without the need for coloring Y, M and C.

In case the color image is divided into 3 planes as described later, the signals for Y, M and C can be obtained in exactly the same manner, and there is also no need to color Y, M and C in this case.

In the electrostatic potential detection method as given in FIGS. 21 and 22, it is preferable that the toner image has γ characteristics matching the charged value of the electrostatic latent image and that there is no threshold to the analog change of the charged value. However, γ may be corrected by electric processing even when γ characteristics do not coincide if necessary measure is available.

In the information recording and reproducing therefor process according to the present invention, the information read from the information carrying medium can be outputted by various types of printers.

Figure 23:
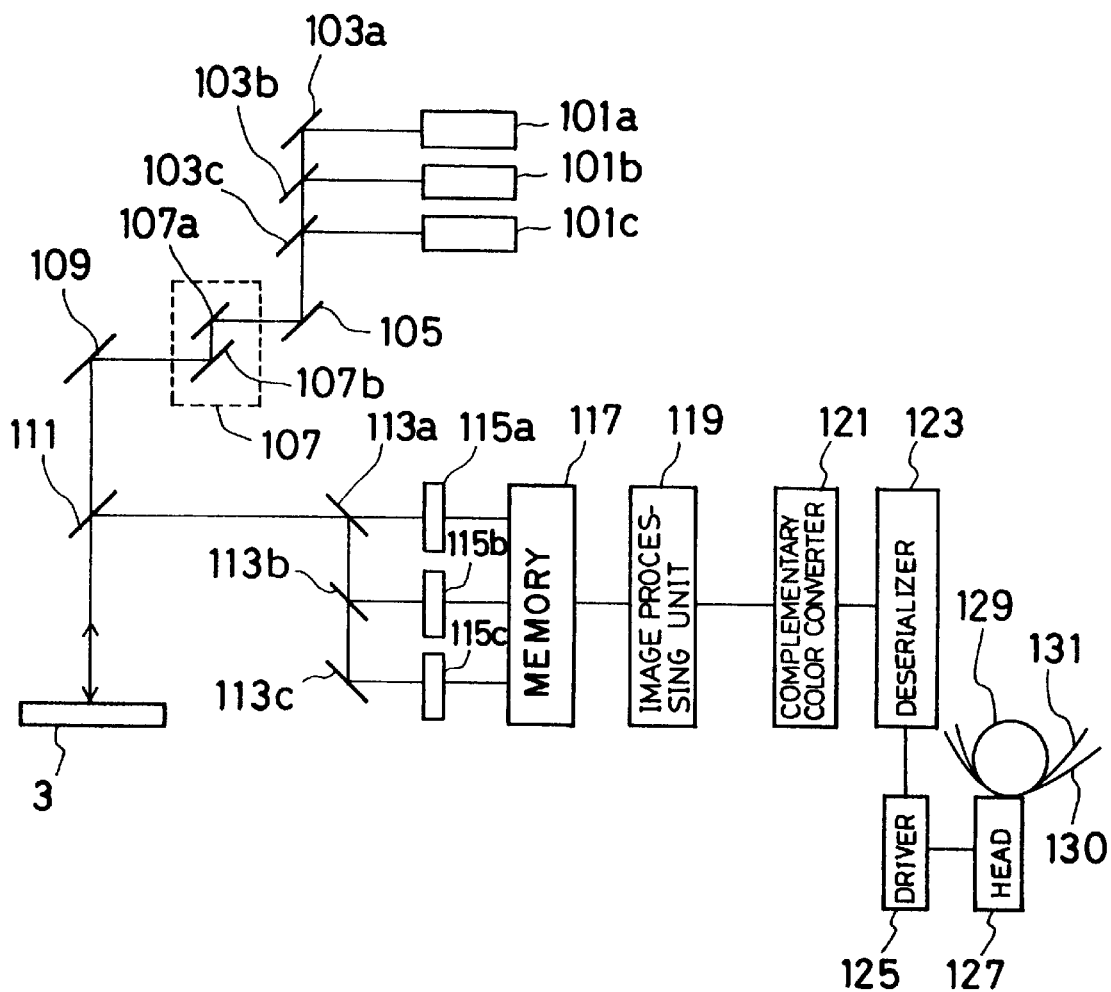
FIGS. 23 to 25 illustrate how to output a color picture, optically read, to a thermal dye transfer printer according to the present invention.
Figure 24:
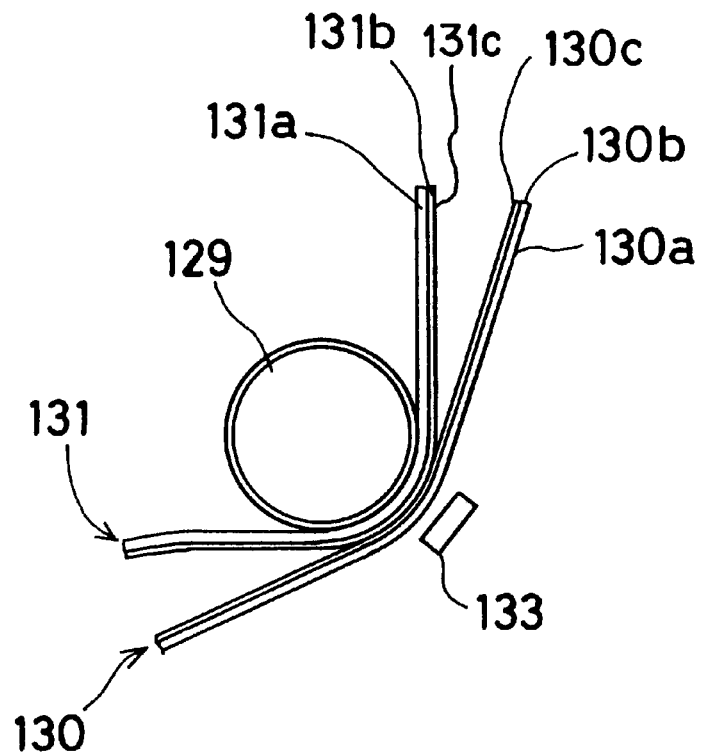
Figure 25:
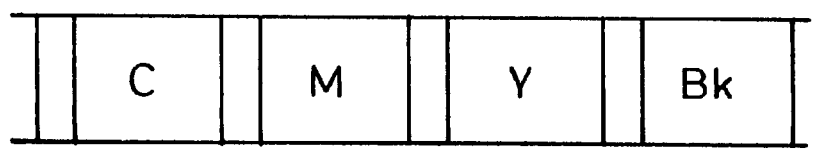

FIGS. 23–25 show the therefor example, in which the optically read color image is outputted to a sublimation transfer printer. In the figure, 101 refers to a laser, 103a a reflection mirror, 103b and 103c dichroic mirrors, 105 a reflection mirror, 107 a scanning system, 109 a reflection mirror, 111 a half mirror, 113a and 113b dichroic mirrors, 113c a reflection mirror, 115 a photoelectric converter, 117 a memory, 119 an image processing unit, 121 a complementary color converter, 123 a deserializer, 125 a driver, 127 a head, 129 a platen roller and 131 the image receiving paper.

The light beams R, G and B from the laser 101 are unified into one beam through the reflection mirror 103a and dichroic mirrors 103b and 103c and scan the information carrying medium 3 through the reflection mirror 105, the scanning system 107, the reflection mirror 109 and the half mirror 111. On the information carrying medium 3, for example, the color-separated images of R, G and B formed by the fine color filter are processed by toner development and colored. The scanning system 107 consists of the galvano-mirrors 107a and 107b, which scan in X and Y directions. Thus, the reflected light obtained by the scanning of the information carrying medium is separated to R, G and B and is converted to an electric signal by therefor each photoelectric converter 115a, b, c, and is stored in the memory 117. Picture element density conversion, color correction, tone correction, etc. are performed by the image processing unit 119 as necessary, and they are converted to color signals of Y, M and C by the complementary color converter 121 for printing purpose. The signals are further converted to serial signals for each line by the deserializer 123 and are therefor provided to the driver 125. Thermal head 127 is driven and controlled at therefor a duty ratio corresponding to the color signals of Y, M and C, and the signals are transferred from thermosensible transfer film 130 to the image receiving sheet 131.

When necessary, a BK (black) signal may be generated in addition to Y, M and C at the same time with the complementary color conversion. In this case, the dynamic range on the shadow side of the hard copy can be widened by using black thermosensible transfer film in the thermosensible transfer recording and by recording in four colors.

FIG. 24 indicates a transfer mechanism from transfer film to the image receiving sheet.

The transfer film consists of a heat-resistant sliding layer 130a, a transfer base material 130b and a sublimation transfer layer 130c, each of which is laminated with a primer therebetween in order to ensure better adhesion of the coated material to the base. As the heat-resistant sliding layer 130a, a mixture of polyvinylbutyral, polyisocyanate and phosphate ester is used. As the transfer base material 130b, polyethylene phthalate, polyimide, etc. are used. Thermal dye transfer layer 130c consists of sublimable dyes such as indoaniline, pyrazolone, azo groups, etc. and binders such as polyvinylacetal, cellulose groups, etc.

The image receiving sheet 131 consists of an image receiving layer 131b, an image receiving sheet base material 131a and a backside layer 131c, each of which is laminated with the primer therebetween. Therefor image receiving layer 131b is made of saturated polyester, vinyl chloride, etc., and the base material 131a is made of synthetic paper, foam polyester, foam polypropylene, etc., and the backside layer consists of binder, lubricant and coating agent, etc.

The image receiving sheet 131 consisting of an image receiving layer 131b and an image receiving base material 131a is wound around the platen roller 129, and the transfer film 130 is laminated closely on it. By attaching the thermal head 133 on the backside of the transfer film 130 and by heating it, the sublimable dye is heated and transferred and this sticks to the image receiving layer 131b and therefor dyes it. In the above example, the signals read from the information carrying medium are treated by digital image processing. Because the dye is transferred to the image receiving layer in the thermal dye transfer unit, the tone gradation corresponding to the heat quantity for each picture element dot can be recorded. Accordingly, there is no need to perform mesh point processing therefor on data outputted from the information carrying medium with analog recording, and the data can be directly printed out. In this way, the thermal dye transfer printer can process and express the gradation of the image signal of the information carrying medium with high-resolution analog recording by each dot, and this is most suitable for the purpose of the present invention.

The latent image on the information carrying medium can be recorded at a resolution according to the size of the electric charge and hence at high accuracy. In contrast, the reading method has not reached yet high accuracy at present. However, an image with the gradation of $2^8$ for 1 $\mu$m×1 $\mu$m is obtained at present. This corresponds to therefor a memory capacity of 100 MBytes on the information carrying medium of 1 cm×1 cm, and 2 pieces of color printing image data in A4 size can be stored in memory. In the above example, the information carrying medium processed by toner development is read optically, but it goes without saying that the image potential on the information carrying medium can also be electrically read out.

FIG. 25 gives the pattern of thermal dye transfer film, in which the dyes of C, M and Y are coated one after another on the surfaces. When these are wound on a drum and the drum is rotated, the image receiving sheet coated with the image receiving layer is printed with one color at each rotation of the drum, and if black color (Bk) is taken into account, it is printed in four colors.

Further, the melting type thermosensible transfer film may be used for the information recording and reproducing processing according to this invention.

Figure 26:
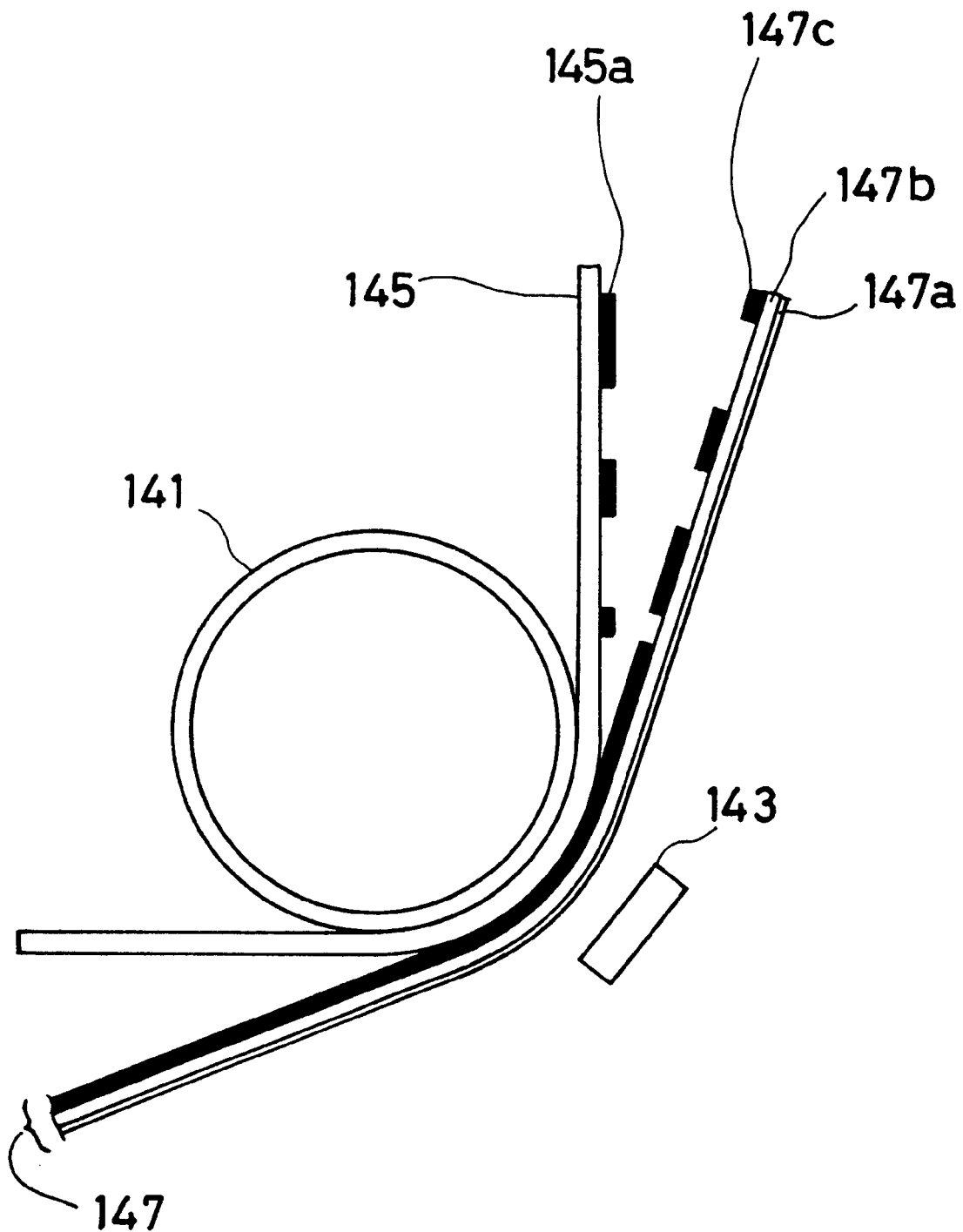
FIG. 26 is an illustration of an example of an output to a melting transfer printer.

In the melting type thermosensible transfer, ordinary paper 145 is set between the rubber roll 141 and the transfer film 147 as shown in FIG. 26. When transfer film is heated in accordance with the image data by thermal head 143, the melting transfer layer (wax) coated on the transfer base film 147b is molten if the heat quantity is higher than therefor a predetermined value and is transferred on the ordinary paper 145. If it is lower than the predetermined value, it is not transferred and is recorded in binary value for each picture element dot. Therefore, unlike the case of sublimation transfer, the gradation is expressed by the ratio of the number of dots constituting one picture element to the number of the recorded dots.

In addition to this, therefor a ink jet printer may be used, by which the ink is injected in fine drops and ink dots are attached on the recording paper in therefor a pattern matching each image.

This is also applicable for therefor a micro-capsule system. In this system, therefor a micro-capsule in the order of a $\mu$m, in which therefor a monomer, leuco dye and reaction initiator are sealed, is coated thinly over the paper, and ultraviolet light or visible light is irradiated. When the receptor coated with acid clay is piled up, the micro-capsule is not smashed if the irradiated light quantity is higher than the predetermined value and the polymerization of monomer is advanced, whereas the micro-capsule with lesser light irradiation is smashed, and leuco dye comes out of the capsule and sticks to acid clay, thus dyeing the latter. In this case, if micro-capsules in R, G and B colors are used and if such leuco dye is used that it is complementary to the color of the capsule, the monomer in the capsule of R is not polymerized and it is hence not smashed. Therefore, C does not come out of the capsule, while the capsules of G and B are smashed, and the dyes of M and Y come out and are mixed therefor to dye in R. Accordingly, the color image can be obtained if such therefor micro-capsules are used.

Further, the system is naturally applicable for therefor an output system for silver salt photographic film, toner development (to be described in detail later) and thermo-sensible transfer printer.

Also, the display unit is not limited to a CRT, and the reproduction and display can be performed by liquid crystal display, electrochromic display, projector, light emitting diode display, electroluminescence display, plasma display, etc.

In therefor a following, the method to correct the image potential of the information carrying medium is described.

Figure 27:
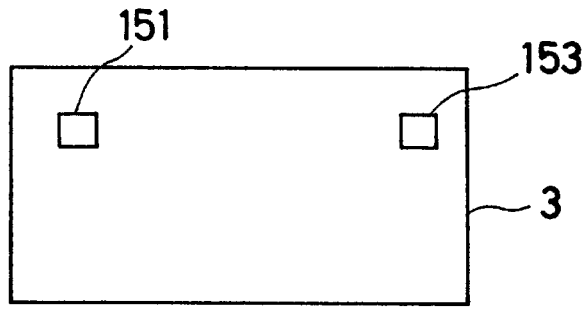
FIG. 27 is an illustration in which luminous and unexposed portions are formed in the information carrying medium of the present invention.

FIG. 27 shows an embodiment having a luminous light exposed portion (maximum exposed portion) and an unexposed portion on the surface of the information carrying medium.

The luminous light portion 151 is formed by the method as shown in FIG. 29.

Figure 29A:
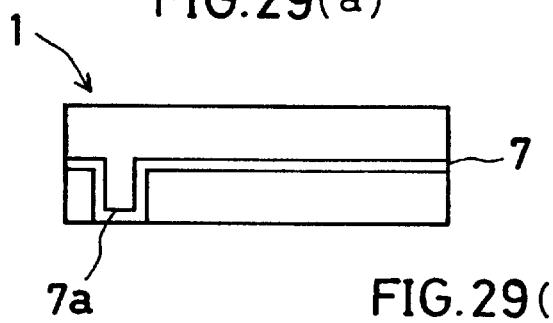
FIG. 29(a) to 29(c) is an illustration as to how to form the luminous portion in the present invention.
Figure 29B:
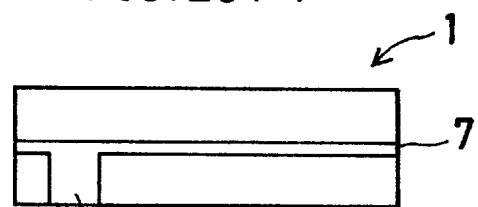

In FIG. 29(a), a part of the electrode 7 of the photosensitive member 1 is bent and is exposed on the surface of the photoconductive layer disposed face-to-face to the information carrying medium during exposure. In so doing, a strong electric field is applied on the information carrying medium, and an electric charge is accumulated on the information carrying medium so that maximum potential can be obtained. As shown in FIG. 29(b), a part of the electrode is thickened and is exposed on the surface of the photoconductive layer, and the same effect as in (a) can be obtained.

Figure 29C:
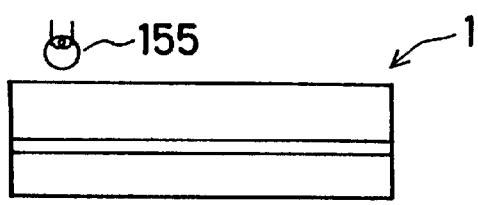

FIG. 29(c) represents a luminous light portion, which is formed by irradiating the irradiating light source 155 from the side of the photosensitive member.

The unexposed portion is formed by the procedure as shown in FIG. 30.

Figure 30A:
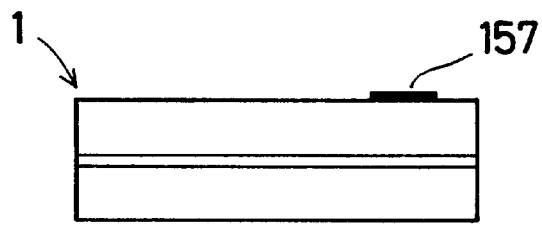
FIGS. 30(a) to 30(b) are diagrammatic view illustrating how to form an unexposed portion in the present invention.
Figure 30B:
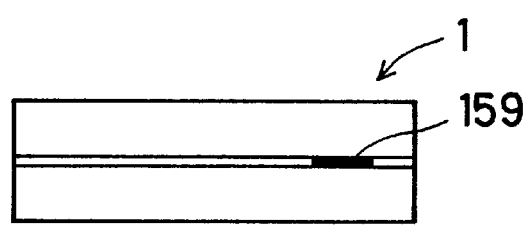
Figure 30C:
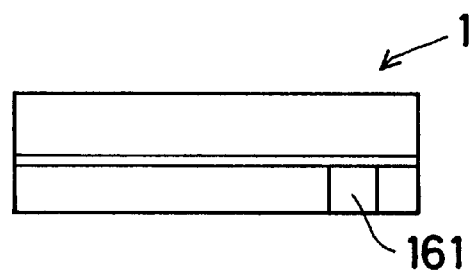

In FIG. 30(a), therefor a light-shutting portion 157 is shown, which is formed on the surface of the electrode carrier. In FIG. 30(b), a part of the transparent electrode is formed with Al to make it not transparent so that light does not pass through. FIG. 30(c) shows a part of the photoconductive layer, on which a cutaway part 161 of the photoconductive layer is formed so that a carrier is not generated even when irradiated by light.

In this non-photoconductive portion, the carrier injection from the electrode occurs in the same degree as the photoconductive layer in a dark condition. The transport characteristics of the injected carrier occurs in the same degree as the photoconductive layer in the dark condition, and any material can be used if it is non-photoconductive to the wavelength of the light to which it is exposed. That is, any material can be used, which exerts the same action as the photoconductive layer in an unexposed status when exposed to light.

As the examples of such materials, PVK/TNF may be used as a photoconductive layer and PVK as a non-photoconductive portion. Or, in the function-separated type photosensitive member, in which the charge generating layer and the charge transport layer are piled upon each other, therefor a portion not containing the charge generating material can be provided on a part of the charge generating layer, and this can be used as a non-photoconductive portion. Also, it is possible to use insulating macromolecular materials with the adjusted resistance value.

Figure 28:
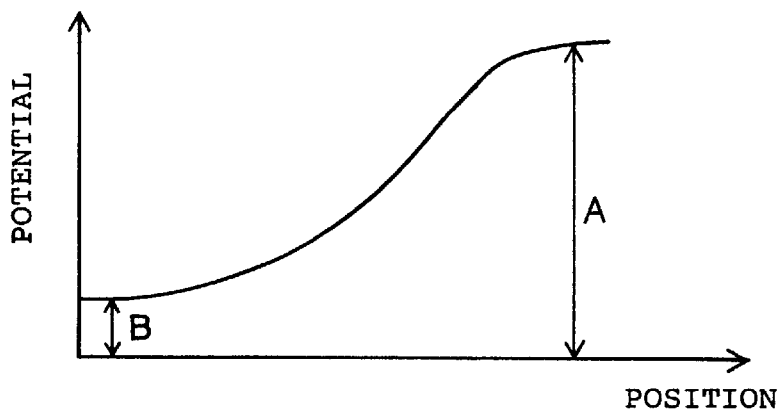
FIG. 28 ia an illustration as to how to compensate image potential in the present invention.

Supposing that, when the luminous light portion and the unexposed portion are formed, the potentials on these portions are A and B respectively as shown in FIG. 28, the potential of the portion where the image is recorded assumes the value somewhere therebetween. If the image potential is decreased by the change over time, the potentials at the luminous light portion and the unexposed portion are similarly attenuated. Accordingly, if the potentials on the luminous light portion and the unexposed portion are measured in advance, the potential of the exposed portion can be easily obtained by correction.

The above description is given on an example, which is provided with both the luminous light portion and the unexposed portion, but the presence of only one of them will suffice.

FIG. 31 shows an embodiment of the information recording and reproducing apparatus according to the present invention. In the figure, the same reference number refers to the same content in FIG. 1. 171 represents a photographing lens, 173 a mirror, 175 a focusing screen, 177 a pentagonal prism, 179 an ocular lens, and 181 a negative image.

The processing apparatus according to the present invention uses the photosensitive member 1 and the information carrying medium 3 as shown in the FIGS. 1–3. (In case of the information carrying medium of FIG. 2, no photosensitive member is required.) instead of the film for single-lens reflex camera. By turning the power source 17 on or off by the switch (not shown), a mirror 173 is moved up to the position indicated by dotted line, and an electrostatic latent image of the object is formed on the information carrying medium 3. In this case, the exposure may be performed without a mechanical shutter because the photosensitive member itself optically plays the role of a shutter. When necessary, the negative image 181 can be obtained if the information carrying medium is processed by toner development. Also, it is possible to read the electrostatic potential and to output it as electric signal, to display it on a CRT or to transfer it on recording means such as magnetic tape.

Also, color photographing is achievable using a color filter.

FIG. 32 shows a color separation optical system by prism. In the figure, 191, 193 and 195 refers to the prism blocks, 197, 199 and 201 the filters, and 203 and 205 the mirrors.

The color separation optical system consists of 3 prism blocks. The optical information coming from the surface "a" of the prism block 191 is partially separated and reflected on the surface "b". Further, it is reflected on the surface "a", and B color component is taken out from the filter 197. The remaining optical information enters the prism block 193, advances to the surface "c" and is partially separated and reflected. The other advances straightforward and G color component and R color component are taken out through the filters 199 and 201 respectively. When G and B color components are reflected by the mirrors 203 and 205, the light beams R, G and B can be obtained as parallel rays.

When such a filter 211 is placed in front of the photosensitive member 1 as shown in FIG. 33(a) and information is photographed, it is possible to form a frame by 3 sets of the information carrying medium separated to R, G and B as shown in FIG. 33(b) or to form a frame by lining up the images of R, G and B on the same plane as shown in FIG. 33(c).

In FIG. 34, an example of a fine color filter 213 is illustrated. For instance, it is formed by the following methods: The method to form R, G and B strip patterns by exposing a film coated with resist to the light in a masked pattern and to dye in R, G and B colors; method to generate the interference fringes of R, G and B by passing the color-separated lights as shown in FIG. 32 through narrow slits and to record them on the hologram recording medium; The method to expose the photoconductive body closely fitted with a mask to light, to form R, G and B stripe patterns by electro-static latent image and to form toner stripes by color synthesis through 3 times of transfer after toner development. One picture element is formed from one set of R, G and B of the filter, and, for instance, one picture element is made as fine as about 10 μm. By using this filter as the filter 211 of FIG. 33, a color electrostatic latent image can be formed. In this case, the filter can be separated from the photosensitive member or it may be incorporated in it.

FIG. 35 gives an example, in which a fine color filter 213 and Fresnel lens 215 are combined together. By use of a Fresnel lens, it is possible to reduce R, G and B patterns in size and to record them. Compared with an ordinary lens, a thin and compact lens can be designed for easier mounting on the equipment.

The equipment of FIG. 31 is provided with a recording unit, consisting of a photosensitive member 1 having photoconductive layer furnished with a transparent electrode on the front instead of photographic film as used in an ordinary camera and of an information carrying medium 3 facing toward the photosensitive member and having the insulating layer furnished with an electrode on the backside. When voltage is applied on both electrodes, electric charge is accumulated on the insulating layer according to the incoming light quantity, and electrostatic latent image of the incident optical image is formed on the information carrying medium. Mechanical optical shutter may naturally be provided, but it may not be provided, and electrostatic latent image can be maintained for long period regardless of whether it is stored in dark or light places.

Figure 36:
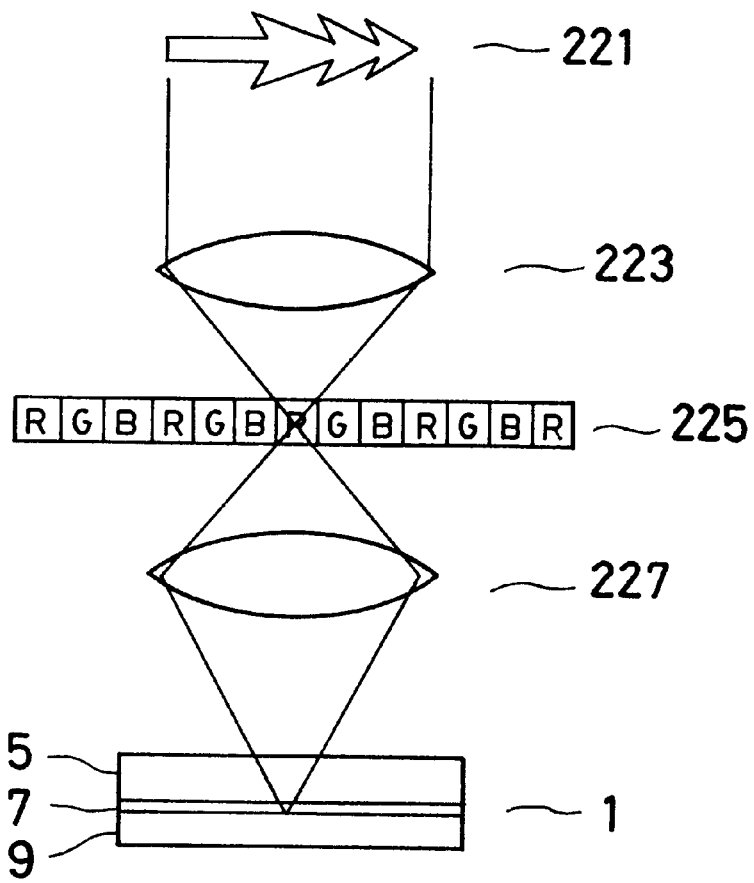
FIG. 36 is a view illustrating one embodiment of an optical system used in the information recording and reproducing apparatus of the present invention.

FIG. 36 is a drawing to explain the optical system to be used for the information recording and reproducing apparatus based on the present invention. In this figure, 221 refers to an object, 223 a first optical system, 225 a color filter, 227 a second optical system, and 1 a photosensitive member.

In FIG. 36, a color filter 225 and a secondary optical system 227 are placed in front of the photosensitive member 1, and the image of the color filter 225 is formed near the transparent electrode 7 of the photosensitive member.

First, the image of the object 221 is formed on the color filter 225 by the first optical system 223. Then, the image of the color filter 225 is formed on the transparent electrode 7, or more strictly, on the photoconductive layer by the secondary optical system 227. By exposing the image to light, the photoconductive layer 9 shows the electrically conductive pattern corresponding to the image formed on the color filter 225, and an electrostatic latent image is recorded on the information carrying medium (not shown) corresponding to the pattern. As the result, image blur or color fade can be prevented.

Figure 37:
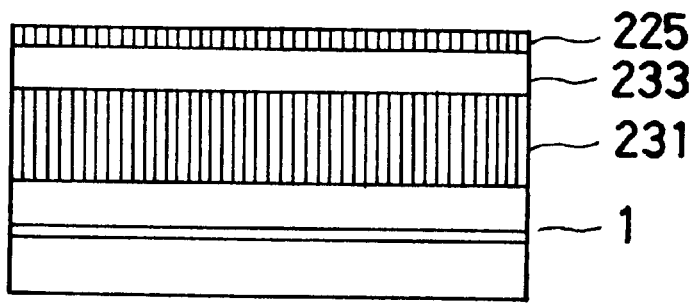
FIGS. 37, 38 and 39 illustrate optical systems used in the information recording and reproducing of the present invention.

FIG. 37 gives another embodiment of the present invention.

In this embodiment, the secondary optical system 227 is composed of a columnar lens array, the so-called SELFOC lens 231, in which the refractive index is changed to parabolic as it goes from a central axis toward an outer periphery, and this SELFOC lens is laid on the photosensitive member 1. Further, the color filter 225 is layered with a transparent spacer of predetermined thickness, for example, a glass base plate 233.

Such system composition makes it possible to form the image of the color filter 225 near the transparent electrode 7 and to obtain an electrostatic latent image of high resolution without color fade.

Figure 38:
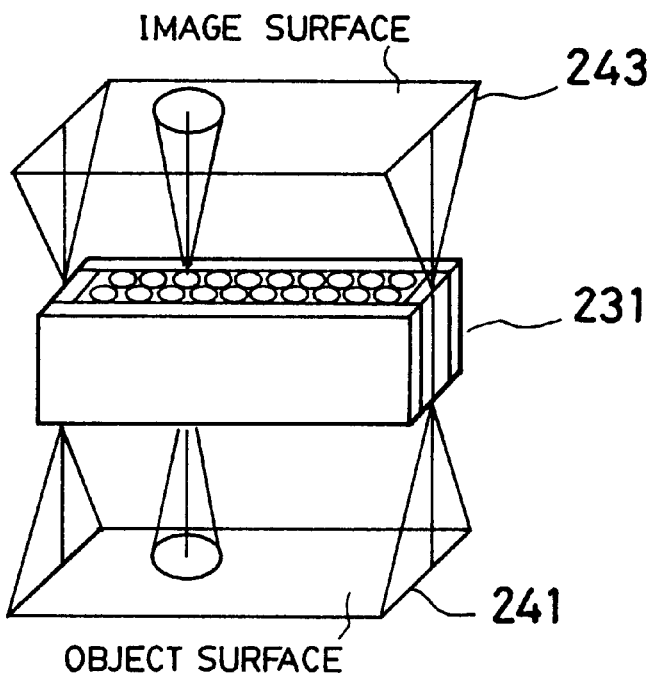

In this SELFOC lens 231, the object surface 241 and the image surface 243 are disposed at symmetrical positions to the lens 231 as shown in FIG. 38 and this constitutes a lens system with a magnification factor 1.

As shown in FIG. 37, the image of the color filter 225 can be formed on the transparent electrode 7 by making the thickness of glass base plate 233 the same as that of the insulating layer 5 and by layering it between the color filter and the lens. Accordingly, by forming the image of the object on an color filter, the image with high resolution and without color fade can be attained.

By placing the color filter and the photosensitive member separately, these can be manufactured by separate processes, and this makes it possible to prevent a decline in accuracy by shrinkage, expansion or discoloring of the expensive color filter by heat.

Figure 39:
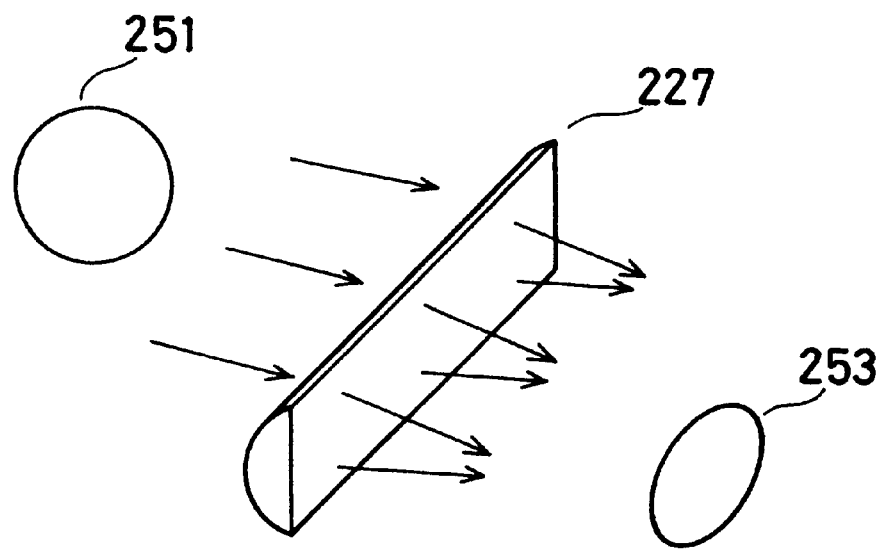

FIG. 39 shows a further embodiment of the present invention, in which a cylindrical lens is used as the secondary optical system 227 of FIG. 36.

A cylindrical lens is a lens system, which has power in one direction and no power in the direction perpendicular to it. For instance, the image of a circular object indicated by 251 is formed as an oval shape 253. Therefore, if such a cylindrical lens is used as the secondary optical system, image recording with variable power can be achieved.

Although not shown in the drawing, a large size image can be recorded by small size equipment if a Fresnel lens is used as the secondary optical system. Also, it is possible to enlarge or reduce the image in size using a convex lens, a concave mirror, etc. and to record it.

Figure 40:
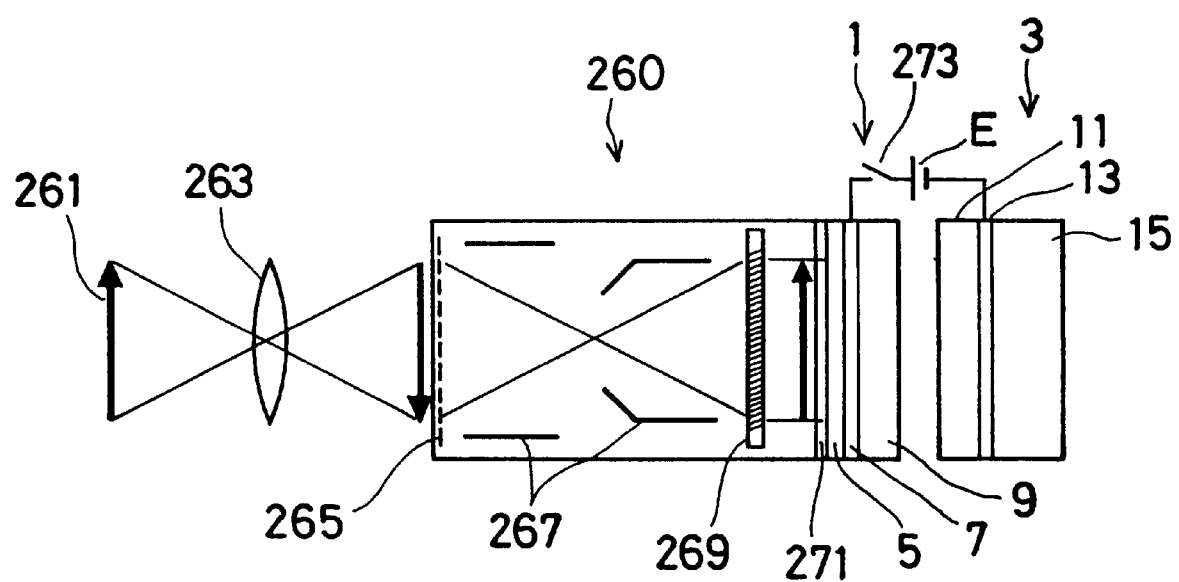
FIG. 40 illustrates an embodiment of the present invention using a photomultiplier.

FIG. 40 represents an embodiment of the information recording and reproducing apparatus using a photomultiplier. In the figure, 260 refers to an image intensifier, 261 an object, 263 an objective lens, 265 a photoelectric surface, 267 an electronic lens, 269 a multi-channel plate (MCP), 271 a fluorescent surface and 273 a switch.

The image intensifier 260 comprises a vacuum tube, which consists of a photoelectric surface 265 to convert the light to electrons, an electronic lens 267 to form the image of electrons released from the photoelectric surface, a MCP 269 to amplify the incoming electrons by several thousand times and a fluorescent surface 271 to convert the incident electron image from the MCP to an optical image. On the backside of the fluorescent surface, a transparent base plate 5 layered with a transparent electrode 7 and photoconductive member 9 are attached. Further, the information carrying medium 3 layered with the electrode 13 and with the insulating layer 11 is placed face-to-face on the base plate 15 in the photosensitive member 1 with a gap of about 10 μm. A battery E is connected between the transparent electrode 7 and the electrode 13 through a switch 273.

When the image of the object 261 is formed on the photoelectric surface 265 through the objective lens 263, electrons are released from the photoelectric surface in accordance with the incident optical image. The electrons thus released are converged by the electronic lens 267 and form an electronic image on the incident surface of MCP269. MCP269 is a thin glass plate with diameter of 25 mm and thickness of 0.48 mm and is provided with a multiple number of small holes, i.e. channels, with diameter of 12 μm. When electrons come into the channels, electrons are pulled by a potential gradient in the MCP and collide with the inner walls several dozens of times and go out to the opposite side.

At each collision, the wall surfaces of the channels release secondary electrons, and the outputted electrons are multiplied by several thousands of times compared with the incoming electrons. The MCP is provided with 1,500,000 channels in total, and each of them corresponds to one picture element. Thus, each picture element is multiplied at the same time.

The outputted electrons thus multiplied are pulled by the electric field, collide with the fluorescent surface and emit fluorescent light. This fluorescent light is several thousands of times more luminous than the incident light, and enters the photoconductive member 9 through the transparent baseplate 5 and the transparent electrode 7. As the result, a carrier is generated within the photoconductive member 9, and the exposed portion acquires an electrically conductive property. In the gap between the conductive portion and the information carrying medium, a strong electric field is applied and a corona discharge occurs, and an electric charge corresponding to the incident optical image is accumulated on the insulating layer 11.

Thus, the electric charge accumulated on the insulating layer is maintained in a stable manner, and this makes it possible to maintain the electrostatic latent image in a stable conditions for a long period. Also it is possible to read this electrostatic latent image by various methods such as toner development, potential reading or optical reading utilizing an electro-optical effect. Because the image is not formed on the information carrying medium unless the switch 273 is turned on, the switch may function a shutter.

In the embodiment as described above, the transparent electrode and the photoconductive member are layered upon each other through the transparent baseplate on the fluorescent surface. Since a thick transparent baseplate may hinder the high resolution of the image, this may be omitted. Thus, the transparent electrode may be formed directly on the fluorescent surface and the photoconductive member may be layered on it.

A mechanical shutter may be provided on the front surface of the photoelectric surface instead of providing a voltage shutter by the switch. Or, the distance between the photosensitive member and the information carrying medium may be made variable and may be adjusted to a critical distance, where corona discharge occurs, and the shutter function may be provided by changing the distance between the photosensitive member and the information carrying medium. In the above, a description was given of an embodiment with an image intensifier, but it goes without saying that this may be used in combination with an image converter, which converts the invisible image to visible image in the wavelength range where incident light is infrared or ultraviolet rays.

Figure 41A:
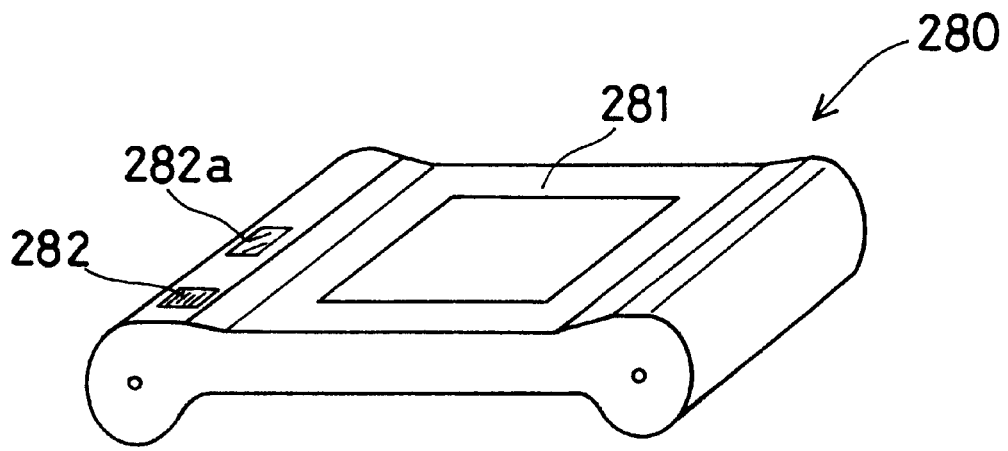
FIG. 41(a) to 41(c) illustrate a cassette used for the information recording and reproducing apparatus according to the present invention.
Figure 41B:
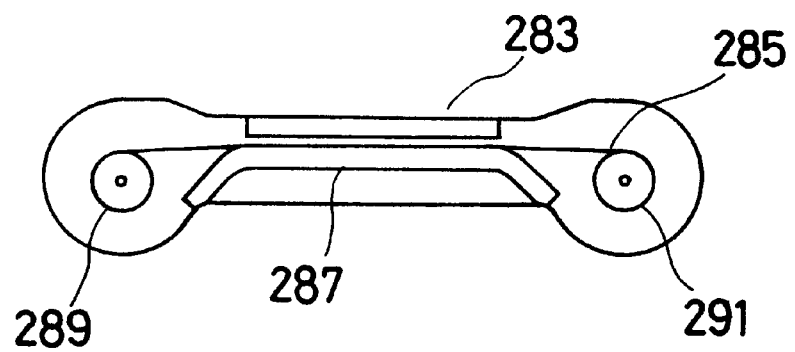
Figure 41C:
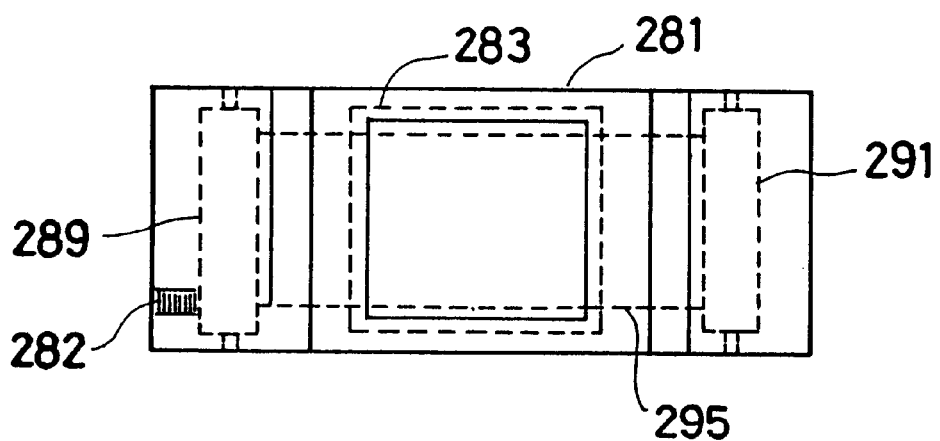

FIG. 41 shows an embodiment of a cassette for the information data recording and reproducing apparatus. In the figure, 280 refers to a cassette, 281 a window, 282 bar code, 283 a photosensitive member, 285 a film-like information carrying medium, 287 a film carrier material, 289 a feed roll, and 291 a take-up roll.

The cassette 280 consists of an integral case made of plastics, and a flexible film is used as the information carrying medium in the present embodiment. At the top of the cassette, a window 281 is provided, and a photosensitive member 283 is fixed in the cassette case. The space setting material 287 with a smooth surface establishes a predetermined distance in relation to the photosensitive member 283, keeping the space between the photosensitive member and the information carrying medium at a constant distance, and it is fixed on the cassette case. In so doing, the spacing between the photosensitive member and the information carrying medium can be set at the fabricating accuracy as determined in advance. The position of the space setting material 287 may be made adjustable in order to adjust the distance between the photosensitive member and the information carrying medium. Since the sensitivity differs according to the type of the materials of the photosensitive member, first information such as the material of the photosensitive member may be displayed as the conductive bar code 282, which can be read, for instance, by a contact furnished on a camera. In direct contact with the smooth surface of the space setting material 287, the film-like information carrying medium 285 is fed by the feed roll 289, and it is taken up by the take-up roll 291 when the recording is completed. The cassette may be of a disposable type, or only the film may be replaceable.

If first a material sensitive to X-ray is used as the photosensitive member, the equipment can be used for medical application.

In the meantime, the information carrying medium in the embodiment of FIG. 41 is composed of flexible film, and the electrically conductive layers are deposited by evaporation in the interior or on a lower surface. A grounding connection may be furnished through the film carrier material 287, and voltage may be applied between the medium and the photosensitive member 283. When the image is exposed to light through the window 281 under voltage application, an electrostatic latent image is recorded on the film-like information carrying medium 285. In this case, the films used as the photosensitive member and the information carrying medium are set in advance in the cassette. Because the spacing between these two is already adjusted at the time of setting-up and is constant, the users can select a cassette incorporated with the desired photosensitive member if the cassette is provided, in which the type of the photosensitive member for the desired purpose is set. Thus, it is possible to select a cassette suitable for each purpose, i.e. ASA100 and ASA500. In the present embodiment, a window is provided and recording is performed through it. A separate window for reading purpose may be provided, through which the recorded image can be read by potential reading or optical reading.

Figure 42:
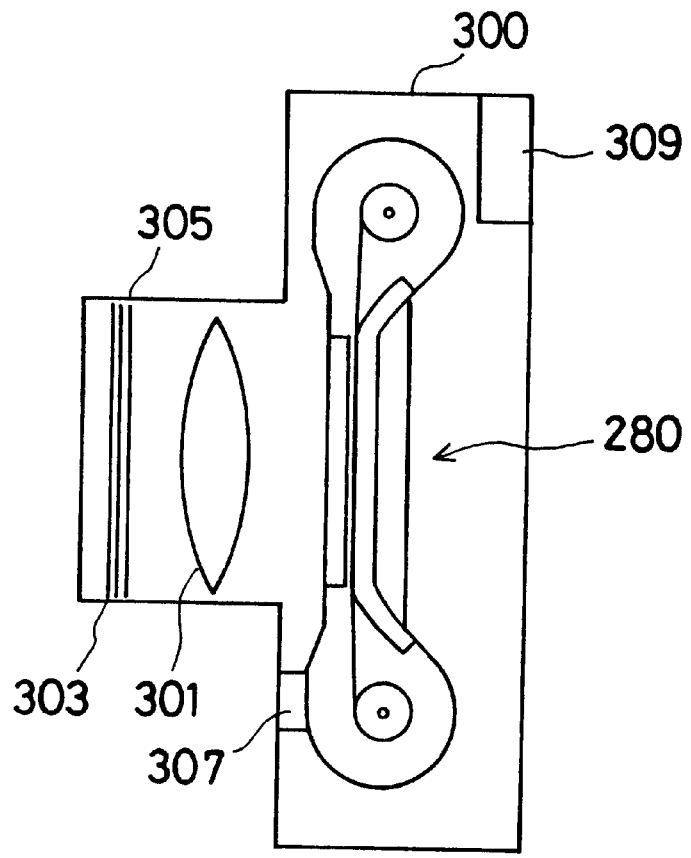
FIG. 42 is a diagrammatic view illustrating the structure of an information recording and reproducing apparatus of the present invention, having the cassette in FIGS. 41(a) to 41(c) incorporated in it.

FIG. 42 is a schematic drawing of the information recording and reproducing apparatus, in which the cassette of FIG. 41 is incorporated. In the figure, 300 represents the information recording and reproducing apparatus, 301 an objective lens, 303 a diaphragm, 305 a shutter, 307 a contact, and 309 a battery and circuit device.

The information recording and reproducing apparatus 300 can be incorporated in the cassette of FIG. 41. When the cassette is inserted, the contact 307 comes into direct contact with the bar code 282. The material of the photosensitive member incorporated in the cassette is read. At the same time, the voltage applied between the photosensitive member and the information carrying medium, the shutter speed, aperture, etc. and other photographing data are automatically set by a ROM, which is incorporated in the circuit device 309. Therefore, the user can perform high resolution photographing by simply turning on the switch (not shown) because the image is exposed at optimal conditions.

Figure 43:
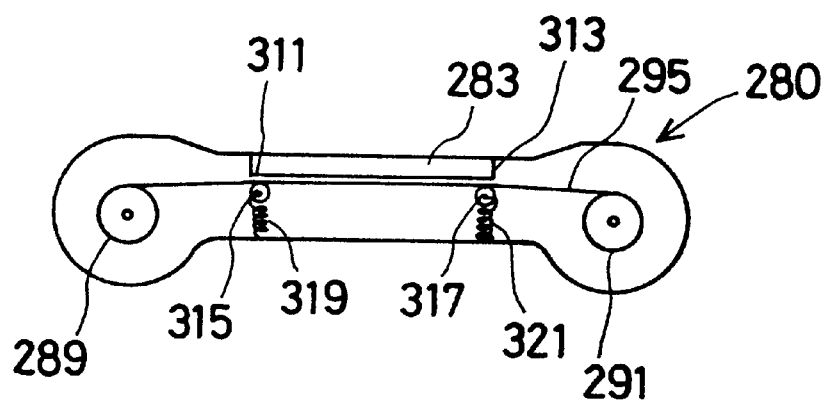
FIG. 43 is a diagrammatic view of another embodiment of the cassette used for electrostatic recording.

FIG. 43 represents a further embodiment of the cassette for electrostatic recording, in which the same reference number indicates the same content as in FIG. 41. 311 and 313 refer to spacers, 315 and 317 rolls, and 319 and 321 springs.

In the cassette of the present embodiment, the spacers 311 and 313 are provided on the photosensitive member. The rolls 315 and 317 disposed face-to-face to them are pushed on the spacers by the springs 319 and 321. By the rotation of the rolls 315 and 317, film is smoothly fed, and the spacing between the photosensitive member and the film-like information carrying medium is maintained at a constant distance. In the present embodiment, a ground connection may be furnished through the rolls.

Figure 44:
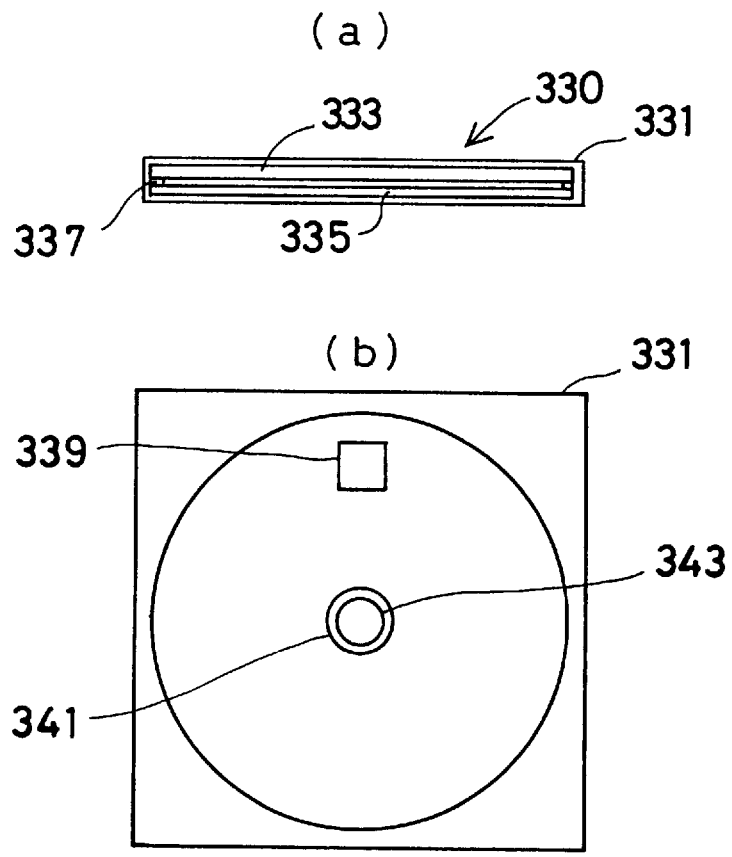
FIGS. 44(a) to 44(b) are diagrammatic views illustrating another embodiment of a disc type cassette for electrostatic recording.
Figure 45:
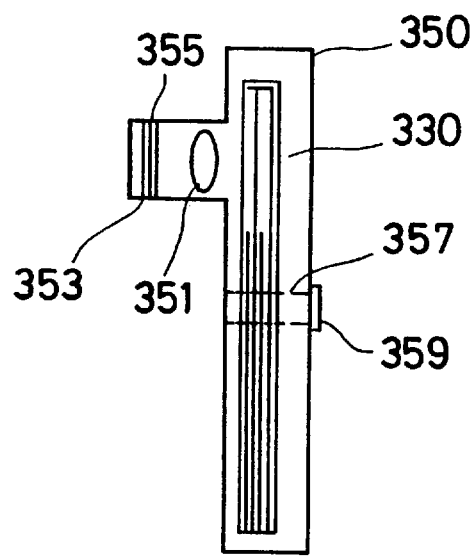
FIG. 45 is a diagrammatic view of another embodiment of the information recording and reproducing apparatus according to the present invention incorporating the cassette, in FIGS. 44(a) to 44(b), in it.

FIG. 44 shows a cassette for electrostatic disk recording, and FIG. 45 represents an information recording and reproducing apparatus, in which the cassette of FIG. 44 is incorporated. In the figure, 330 refers to a disk type cassette, 331 a case, 333 a photosensitive member, 335 an information carrying medium, 337 a spacer, 339 a window, 341 a hole in the cassette, 343 a disk hole in the disk, 350 a camera, 351 an objective lens, 353 a diaphragm, 355 a shutter, 357 a rotating shaft and 359 a rotating knob.

In this embodiment, the information carrying medium is designed in disk type, and a disk is incorporated in the cassette 330. A window 339 is provided on the case 331, and the image is recorded through the window. A hole 341 is furnished at the center of the case, and a hole 343 at the center of the disk. When this cassette is set in the camera 350 and the rotating knob 359 is turned by passing the rotating shaft 357 through the holes 341 and 343, the disk is rotated and the image can be recorded on the information carrying medium through the objective lens 351.

Figure 46:
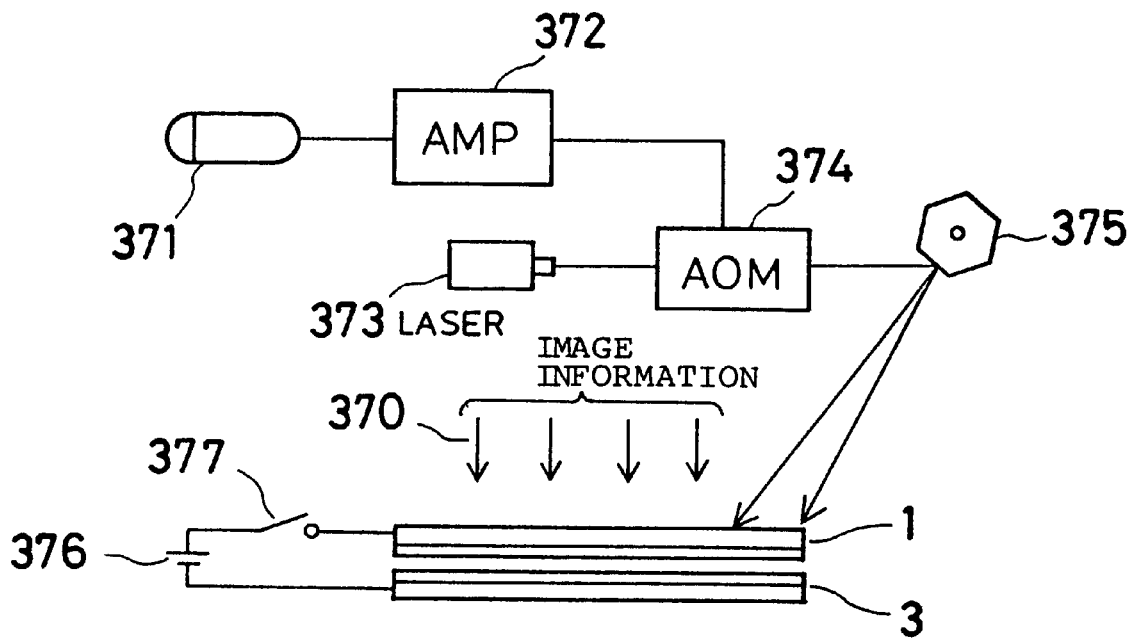
FIG. 46 is an illustration of an information recording and reproducing apparatus according to the present invention having an aural information input function.

FIG. 46 represents an embodiment of the information recording and reproducing apparatus provided with an audio data input function. In the figure, 371 refers to a microphone, 372 an amplifier, 373 laser, 374 an acousto-optic modulator, 375 a polygonal mirror, and 376 a power unit.

A switch 377 is provided between the photosensitive member 1 and the information carrying medium 3, and by turning it on or off, the predetermined voltage is applied from the power unit. By the surface exposure of the image information light 370 under the application of the predetermined voltage, the latent image potential corresponding to the image is generated on the information carrying medium 3. On the other hand, the electric signal corresponding to the voice through the microphone 371 is amplified by the amplifier 372. The laser beam from the laser 373 is modulated according to the voice signal by acousto-optic modulator 374. Scanned by the polygonal mirror 375 and irradiated on the photosensitive member 1, the latent image potential corresponding to the voice signal is generated on the information carrying medium 3. Thus, voice information is also recorded together with the image information on the information carrying medium 3. As an result, when the image such as a landscape is recorded on the information carrying medium, the situations at the time of photographing can be recorded as an audio signal. Thus, it is possible to obtain the reproduction of the image with a simultaneous explanation.

In the above example, the light is modulated by the combination of an optical modulator and a polygonal mirror, and scanning and exposure are performed. Further, an electron beam may be used for scanning by the combination of a CRT and a modified means such as a flying spot scanner (FSS), and the light from the luminescent spot on the CRT may be passed through the photosensitive member for scanning and exposure. Or, the information carrying medium may be placed near the tube surface of a CRT having a group of needle electrodes on the tube surface, and direct discharge recording may be performed on the information carrying medium through the needle electrodes, on which the scanning electronic beam hits.

Figure 47:
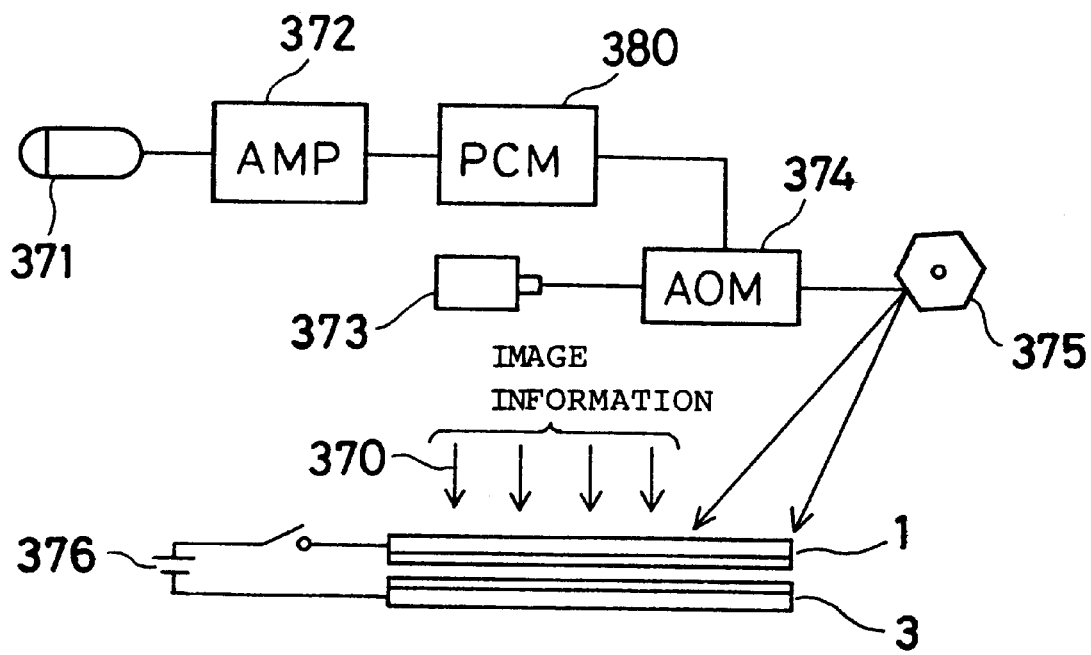
FIG. 47 is a diagrammatic illustration of another embodiment of the present invention utilizing pulse code modulation.

FIG. 47 shows another example of the present invention using PCM modulation. The reference number represents the same content as in FIG. 46. In the case of FIG. 47, a voice signal is converted to a digital signal by PCM380, and a voice signal of good quality and highly resistant to noise can be recorded.

Figure 48A:
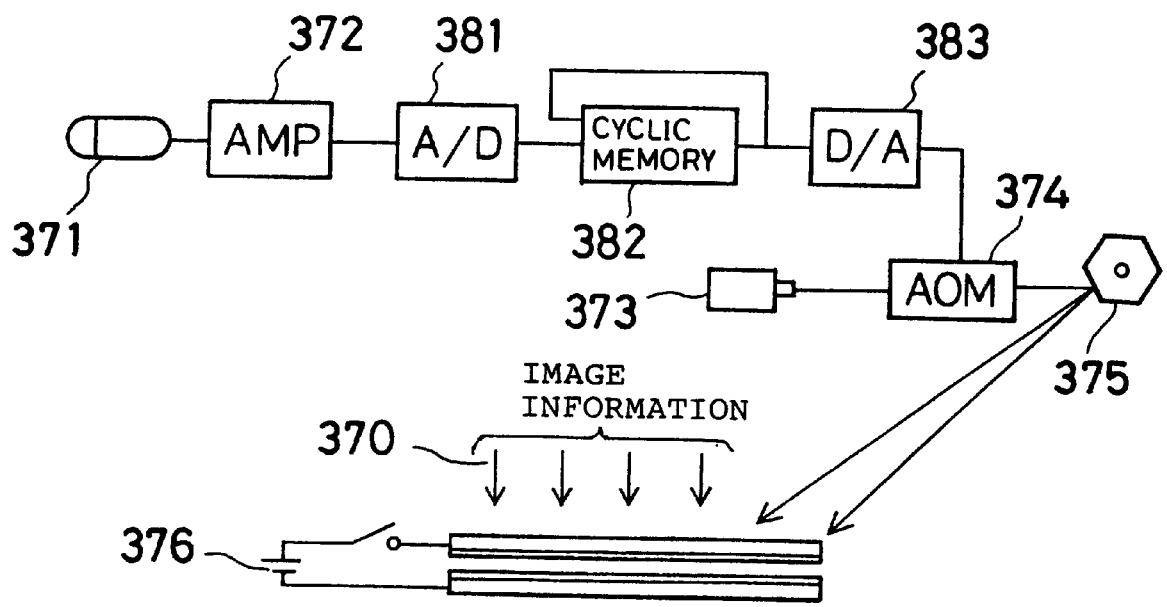
FIGS. 48(a) and 48(b) illustrate another embodiment of the present invention which records voice for a predetermined period of time.
Figure 48B:
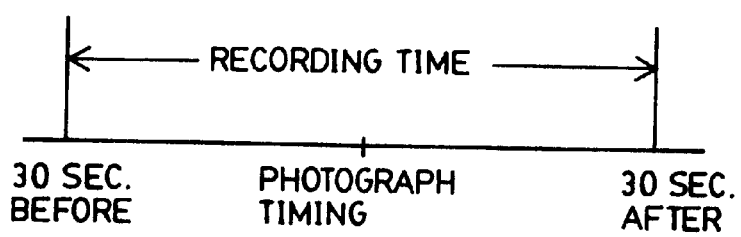

FIGS. 48(*a*) and 48(*b*) show a further embodiment according to the present invention, in which 381 refers to an A/D converter, 382 a cyclic memory, and 383 a D/A converter.

In this embodiment, a voice signal is converted by the A/D converter and is stored in the cyclic memory, and the output of the cyclic memory 382 is converted by the D/A converter and this is recorded. The cyclic memory is provided with memory capacity to store the voice information for a certain period of time, and the content of the memory is sequentially updated so that the voice information for a certain period of time up to now is stored in memory. For example, if the memory capacity of the cyclic memory is set in such manner that the voice information for one minute can be recorded, the voice information can be recorded from 30 seconds before the photographic time point to 30 seconds thereafter. Thus, the situations at the time of photographing can be reproduced with real feeling. For instance, as shown in FIG. 48(*b*) in photographing a steam locomotive, the puff-puff sound from the locomotive can be recorded with the photographs of the locomotive itself, and in reproducing, the watchers can feel the actual scene on the reproduced images.

Figure 49:
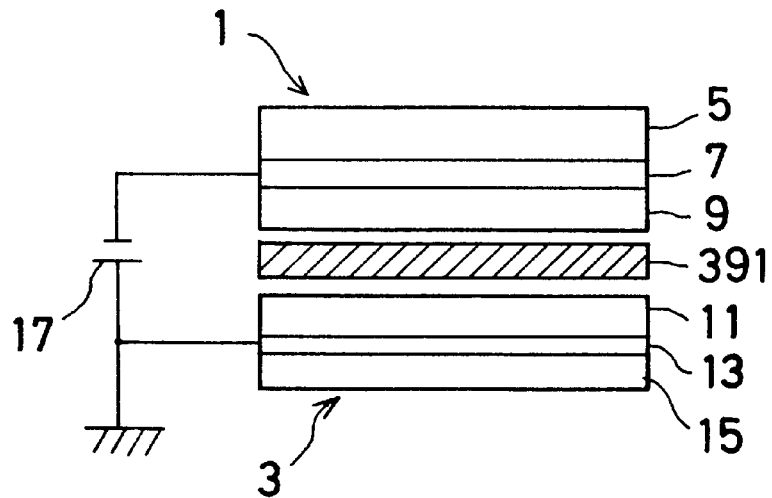
FIG. 49 illustrates another embodiment of the present invention.

FIG. 49 represents an embodiment of the information recording and reproducing apparatus, in which the same reference number indicates the same content as in FIG. 1. 391 refers to a dielectric substance.

In this embodiment, a dielectric substance 391 is furnished between the photosensitive member 1 and the information carrying medium 3, and the electrostatic latent image is formed on the insulating layer 11 through the dielectric substance. Because of the presence of this dielectric substance 391, dielectric strength is improved, and the supply voltage of the power unit 17 can be increased. Hence, it is possible to apply high voltage between the photosensitive member and the information carrying medium, and the latent image can be formed on the information carrying medium even when there is slight incidence of light. This will strikingly improve the sensitivity. If sufficiently high voltage is applied, the carrier generating efficiency when light is applied can be made closer to 1.

As the dielectric substance, the solid inorganic insulating materials and solid organic insulating materials as listed below can be used:
(1) Solid insulating materials
(1-1) Solid inorganic insulating materials
(1-1-1) Natural minerals
   (1) Mica
   (2) Rock crystal
   (3) Other minerals and sulphur
(1-1-2) Ceramics and porcelain
   (1) Feldspar porcelain
   (2) Steatite porcelain
   (3) Alumina porcelain
   (4) Micalex
   (5) Others
(1-1-3) Glass
   (1) Soda-lime glass
   (2) Boro-silicated glass
   (3) Quartz glass
   (4) Pyrex glass (5) Others
(1-2) Solid inorganic insulating materials
(1-2-1) Paraffin hydrocarbon
   (1) Paraffin
   (2) Ceresin
   (3) Wax such as microcrystal wax
   (4) Others
(1-2-2) Rubber
   (1) Natural rubber
   (2) Butyl rubber
   (3) Chloroprene rubber
   (4) Styrene-butadiene rubber
   (5) Silicone rubber
   (6) Others
(1-2-3) Thermosetting resin
   (1) Phenol resin
   (2) Diallyl phthalate resin
   (3) Unsaturated polyester
   (4) Epoxy resin
   (5) Silicone resin
   (6) Urea resin
   (7) Melamine resin
   (8) Others
(1-2-4) Thermoplastic resin
   (1) Vinyl resin (such as vinyl chloride)
   (2) Polyethylene
   (3) Polystyrene
   (4) Polypropylene
   (5) Ionomer resin
   (6) ABS resin
   (7) Polyvinyl alcohol
   (8) Acryl resin
   (9) Acrylonitrile-styrene resin
   (10) Vinylidene chloride resin
   (11) AAS resin
   (12) AES resin
   (13) Cellulose derivative resin
   (14) Thermoplastic polyurethane
   (15) Polyvinyl butyral
   (16) Poly-4-methylpentene-1
   (17) Polybutene-1
   (18) Others
(1-2-5) Engineering plastics
   (1) Fluorine resin
   (2) Polycarbonate
   (3) Polyamide
   (4) Acetal resin
   (5) Polyphenylene oxide
   (6) Polybutylene terephthalate
   (7) Polyethylene terephthalate
   (8) Polyphenylene sulfide
   (9) Polyimide resin
   (10) Polysulfone and polyethersulfone
   (11) Aromatic polyester
   (12) Polyallylate
   (13) Others
(1-3) Ferroelectrics
   (1) Rochelle salt
   (2) Deuterium Rochelle salt
   (3) Potassium dihydrogenphosphate
   (4) Potassium dideuteriumphosphate
   (5) Barium titanate
   (6) Potassium niobate
   (7) Glycine sulfate
   (8) Ammonium sulfate
   (9) Guanidine-aluminum sulfate hexahydrate
   (10) Sodium nitrite
   (11) Yellow prussiate of potash
   (12) Antimony iodide sulfide
   (13) Others
(1-4) Antiferroelectrics
   (1) Ammonium dihydrogenphosphate
   (2) Lead hafnate
   (3) Lead zirconate
   (4) Sodium niobate
   (5) Others
(1-5) Piezoelectric crystal
   (1) Ethylenediamine tartarate (EDT)
   (2) Potassium tartarate (KDT)
   (3) Rock crystal
   (4) Selenium
   (5) Tellurium
   (6) Cadmium sulfide
   (7) Cadmium selenide
   (8) Zinc oxide
   (9) Barium titanate
   (10) Zinc sulfide
   (11) Ammonium dihydrogenphosphate
   (12) Others
(1-6) Others
   (1) Natural fiber
   (2) Cellulose paper
   (3) Papers such as chemically treated paper
   (4) Natural fiber such as copal, shellac, etc.
   (5) Insulating varnish In FIG. 50, an embodiment using gas or liquid as the insulating material is illustrated. In the figure, 393 is a container, 395 a window, and 397 an insulating material.

Figure 50A:
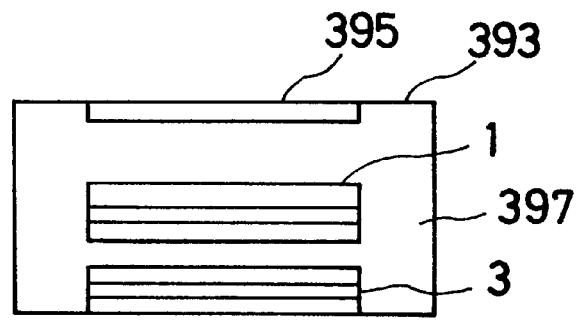
FIGS. 50(a) and 50(b) illustrate another embodiment of the present invention using a liquid or a gas as an insulating material.

As shown in FIG. 50(a), the insulating material 397 consisting of gas or liquid is sealed in a container 393, and the photosensitive member 1 and the information carrying medium 3 are disposed in it, and the exposure under voltage application is performed through a window 395. As the gas insulating material, the materials as listed below can be used. Dielectric breakdown voltage can be increased if voltage is raised to higher level.

Figure 50B:
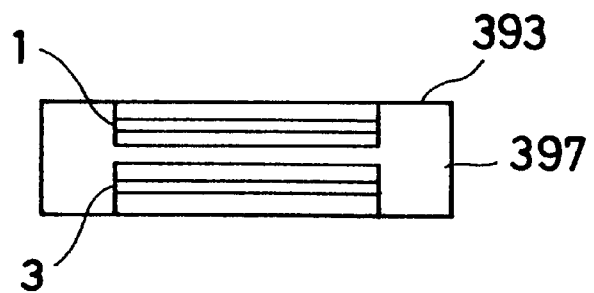

(2) Gas insulating materials
   (1) Nitrogen
   (2) Carbon dioxide
   (3) Fluorine gas, e.g. sulfur hexafluoride
   (4) Carbon fluoride Instead of gas insulating materials, the liquid insulating materials as listed below can be used:

(3) Liquid insulating materials
   (1) Transformer oil
   (2) Circuit breaker oil
   (3) Impregnated cable oil
   (4) Oil-filled cable oil
   (5) Condenser oil
   (6) Paraffin hydrocarbon
   (7) Natural mineral oil with main components such as naphthane hydrocarbon composed of cyclohexane and its bonding substances
   (8) Askarel
   (9) Alkylbenzene
   (10) Synthetic oil consisting of polybutene and the like
   (11) Silicone oil
   (12) Others FIG. 50(b) shows an embodiment, which uses the position of photosensitive member or the information carrying medium as the window, and other parts are the same as in FIG. 50(a).

By providing an insulating material between the photosensitive member and the information carrying medium, spark discharge can be prevented when applying high voltage, and carrier generating efficiency at exposure can be made closer to 1 by increasing the voltage. Thus, high sensitivity exposure under voltage application can be achieved.

FIG. 51 shows an embodiment of the information recording and reproducing apparatus.

As shown in FIG. 51(a), a predetermined voltage is applied between the photosensitive member 1 and the information carrying medium 3 by power unit 17, and exposure is performed under this condition. Then, a negative electric charge is trapped on the insulating layer 11 of the information carrying medium 3, and a latent image is formed. To erase this latent image, the polarity of the power source 17 is reversed as shown in FIG. 51(b), and exposure is performed in the same exposure patterns as in FIG. 51(a). The electric charge of the polarity opposite to that of FIG. 51(a) is recorded on the insulating layer 11 of the information carrying medium 3, and the latent image formed by the exposure of FIG. 51(a) is cancelled. Thus, the potential on the insulating layer 11 is turned to 0, and the latent image is erased.

As shown in FIG. 51(c), when the voltage of the same polarity as that of exposure in FIG. 51(a) is applied and exposure is performed in a pattern reverse to that of FIG. 51(a), a negative electric charge is uniformly recorded on the insulating layer 11, and the latent image is erased. In case of FIG. 51(c), the insulating layer 11 is maintained at the predetermined constant potential. Accordingly, if exposure is performed by reversing the polarity of supply voltage, recording can be repeated.

FIG. 52 gives a further embodiment of this invention. By performing a uniform exposure of the information carrying medium, on which the latent image is formed, the latent image can be erased.

In FIG. 52(a), an example is illustrated, in which uniform exposure is performed by applying a voltage of the same polarity as that of the exposure under voltage application. Since the portion with the latent image is loaded with more charges at the exposure, it is quickly saturated if exposure is continued. Also on the portion where a latent image was not formed, it will be saturated when exposure is continued. By performing exposure for a certain period of time, a saturated voltage is reached on the surface of the insulating layer 11, and the latent image is erased. If exposure is then performed under this condition by reversing the polarity of the supply voltage, re-writing can be attained.

FIG. 52(b) gives an example, in which uniform exposure is performed by applying a voltage of a polarity reverse to that of the exposure of FIG. 52(a). In this case, the portion not exposed in FIG. 51(a) is first saturated with the positive charge. The exposed portion with a latent image is then saturated, leading to total uniform charging, and the latent image is erased. In this case, it is possible to achieve re-writing by reversing the polarity of the voltage.

In FIG. 52(c), an example of latent image erasing by voltage application only is illustrated. When light is not irradiated, the photosensitive body has a higher resistance and the erasing speed is slow, while this method eliminates uniform lighting. Also, it is possible to increase the erasing speed by employing an electrode instead of a photosensitive member. In the figure, a voltage with a polarity different from that of the recording is applied, whereas it is naturally allowed to apply the voltage of the same polarity.

Figure 53:
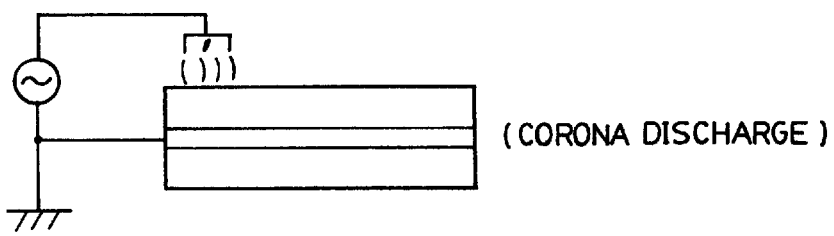
FIG. 53 illustrates another embodiment of the present invention in which latent image erasure is carried out by uniform charging by corona discharging.

FIG. 53 shows an embodiment, in which a latent image is erased by uniform charging through corona discharge.

In this embodiment, for example, AC corona discharge is performed, and uniform charging is performed by a positive or a negative charge on the insulating layer 11, and the latent image is erased. It is naturally possible to perform discharge not in AC but in DC.

The methods used to erase the latent image by heating are illustrated in FIGS. 54–57.

Figure 54:
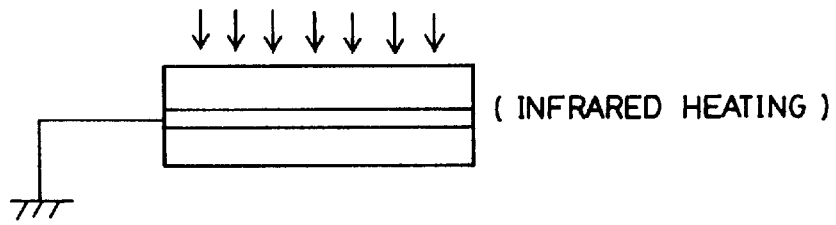
FIG. 54 is an illustration of how to erase a latent image by infrared heating according to the present invention.

FIG. 54 shows a method to erase the latent image by infrared heating. By irradiating infrared rays on the information carrying medium where a latent image is formed, the insulating layer 11 is heated. As the result, the conductivity of the insulating layer 11 is increased, and the charge forming the latent image is leaked, thus erasing the latent image.

Figure 55:
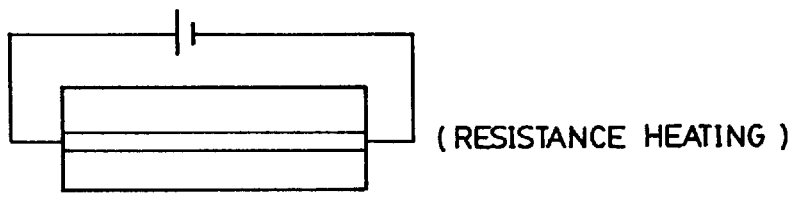
FIG. 55 is an illustration of another embodiment of the present invention in which latent image erasing is performed by resistance heating by applying voltage across the electrode of the information carrying medium.

FIG. 55 shows an embodiment, in which electric current is connected to the electrode of the information carrying medium, and the latent image is erased by resistance heating. The electrode of the information carrying medium consists of a substance having resistance of $10^6 \Omega \cdot cm$ or lower. Since it is provided with a predetermined resistance, it is heated up when power is connected. Because the information carrying medium itself is very thin and has small heat capacity, it is heated up within a short time.

Thus, the charge forming the latent image is leaked, and the latent image is erased.

Figure 56:
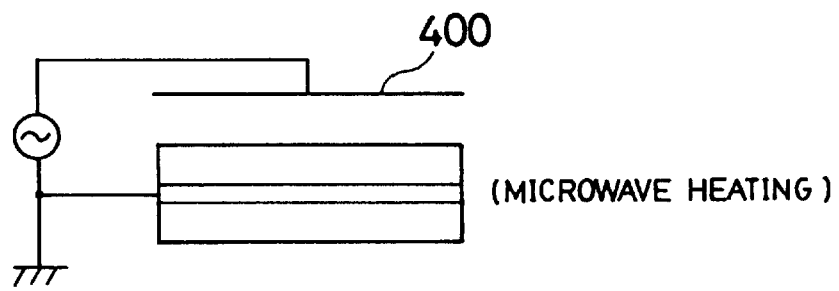
FIG. 56 is an illustration of how to erase a latent image by microwave heating.

FIG. 56 shows the erasing of a latent image by microwave heating using an electrode 400. The insulating layer itself is heated up by dielectric loss of the insulating layer 11. As temperature and the conductivity are increased, the charge is leaked, and the latent image is erased.

Figure 57:
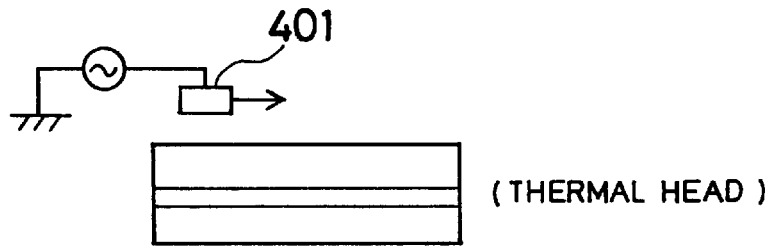
FIG. 57 is an illustration of another embodiment of the present invention, in which a latent image is erased by a thermal head.

FIG. 57 represents an example, in which the surface of the insulating layer 11 of the information carrying medium is heated up and the latent image is erased. When thermal head 401 is heated and the insulating layer 11 is heated on contact or non-contact basis, the charge forming the latent image is leaked, and the latent image is erased.

In FIG. 58, an embodiment is illustrated, in which a latent image is erased by irradiating with ultraviolet rays.

Figure 58A:
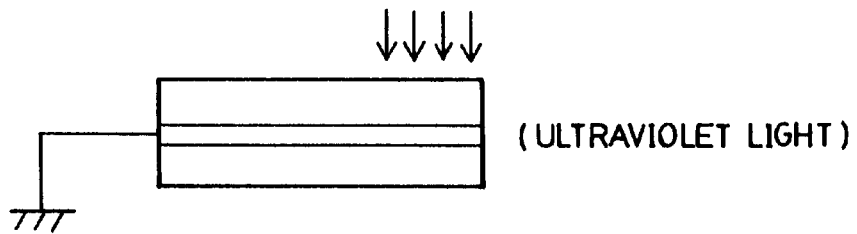
FIG. 58 is an illustration of another embodiment of the present invention in which therefor a latent image is erased by irradiating ultraviolet light.

FIG. 58(a) shows the irradiation of ultraviolet light of the same pattern as the exposure pattern, by which a latent image was formed. By irradiation of ultraviolet rays a carrier for electrons and holes is generated in the insulating layer 11. Because an electric field is generated by the electric charge, which forms the latent image, on the portion with the latent image, a carrier of polarity opposite to that of the electric charge is pulled and the neutralized, and electric charge with the opposite polarity goes toward the earth. As the result, the electric charge forming the latent image is neutralized, and the latent image is erased.

Figure 58B:
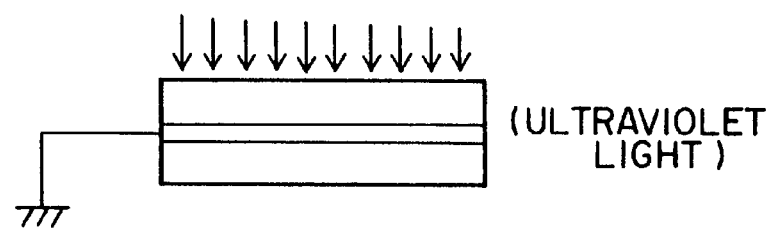

FIG. 58(b) shows an example, in which ultraviolet rays are uniformly irradiated on the information carrying medium. Since the electric charge is neutralized in the same way as disclosed above with respect to FIG. 51(a) on the portion with the latent image and no electric field is generated on the other portions, the generated carriers are bonded together immediately and disappear. Thus, an electric charge is not accumulated as a whole on the insulating layer 11, and the latent image can be erased.

Figure 59:
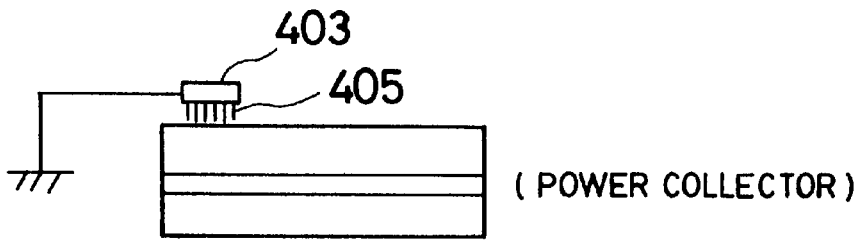
FIG. 59 is an illustration of another embodiment of the present invention in which a latent image is erased by leaking charges with a power collector.

FIG. 59 represents an embodiment, in which the electric charge on the insulating layer 11 is leaked by a power collecting material. In the figure, 403 is a conductive material having a brush 405. By scanning the surface of the information carrying medium with brush 405, the electric charge is leaked away and the latent image can be erased.

Figure 60:
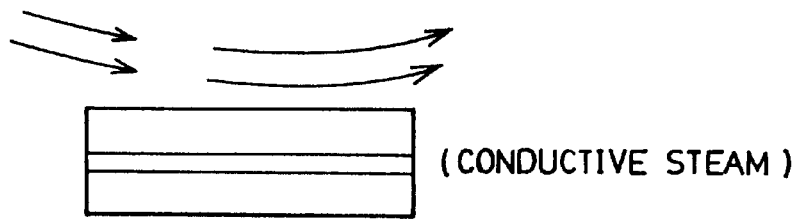
FIG. 60 is an illustration of another embodiment of the present invention in which a latent image is erased by spraying steam.

FIG. 60 shows an example, in which steam is blown on the information carrying medium and the electric charge is leaked by giving conductivity to it. Through the conductive gas, the electric charge is leaked, and the latent image can be erased.

As described above, the latent image with high insulating property and difficult to erase on the information carrying medium can be easily and positively erased. Therefore, it is possible to repeatedly use the information carrying medium.

An example will be given in which an information recording and reproducing apparatus using an information carrying medium according to the present invention as an external memory unit is applied to printing.

Figure 61:
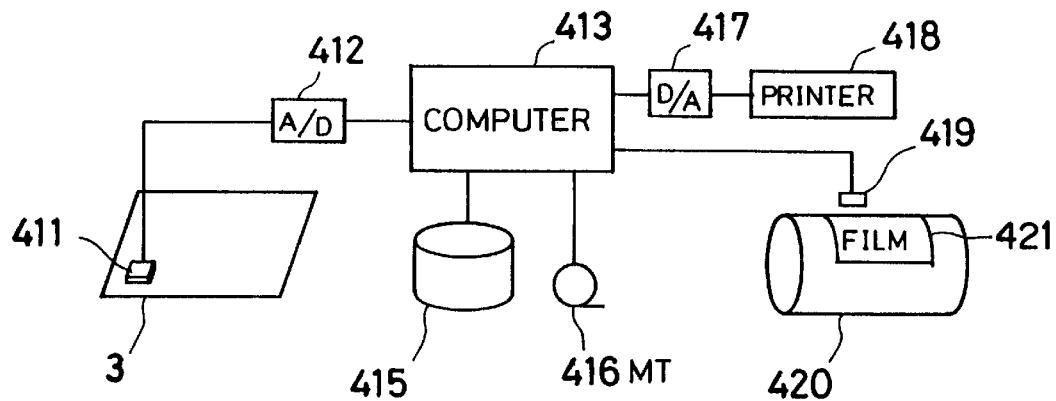
FIG. 61 is an illustration of an information recording and reproducing apparatus using an information carrying medium of the present invention.

FIG. 61 illustrates one embodiment of an image processing system using an information carrying medium as a recording medium. In FIG. 61, reference numeral 3 designates an information carrying medium, 411 a read head, 412 an A/D converter, 413 a computer, 415 a magnetic disk, 416 a magnetic tape (MT), 417 a D/A converter, 418 a printer, 419 a recording head, 420 a recording cylinder, and 421 a film.

An original is recorded on the information carrying medium 3. The read head 411 scans the surface of the medium 3 and reads its electric potential by a scanner which will be described later, thereby reading it into the computer 413 after an A/D conversion. In this case, there is a large amount of data and the recording is made on the magnetic disk 415 or the magnetic tape 416 so as to read much of the image information. When required, this is read and its image is synthesized under observation of a monitor which is not illustrated herein. Then, it is put into designated image processing such as color correction, conversion of magnification power, masking, and detail emphasis, and then exposed to and recorded by the recording head 419 on the film 421 which is set on the recording cylinder 420. The image data can be printed by means of the printer 418 as needed.

In the case above, because the information carrying medium 3 which is a component of an input scanner is a flat bed type, the structure can be made compact and difficult operations such as setting of an original can be eliminated. When the medium 3 on which analog information is recorded with a surface exposure is substituted as is for the MT, total time from reading of an original to exposure and reading can be decreased owing to omission of time required for recording on and reading from the MT.

Figure 62:
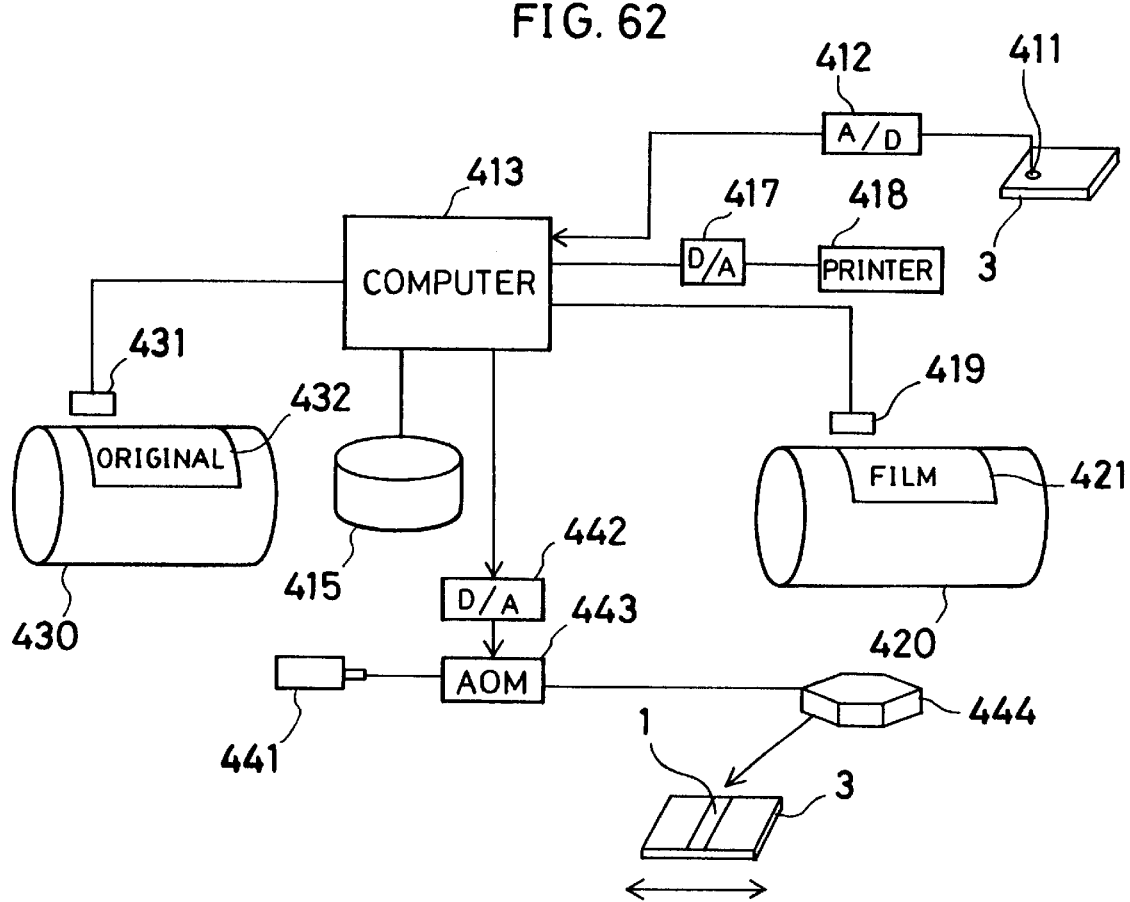
FIG. 62 is an illustration of a scanner system using an information carrying medium of the present invention.

FIG. 62 illustrates the overall structure of an information recording and reproducing apparatus using an information carrying medium according to the present invention, in which identical reference numerals to those in FIG. 61 imply identical contents to the same. In FIG. 62, reference numeral 430 designates a read cylinder, 431 a read head, 432 an original, 441 an optical modulator, and 444 a polygonal mirror.

In the apparatus of FIG. 62, there is employed an information carrying medium in place of an MT for temporarily storing image data which is read, whereas there is employed a conventional scanner for reading an original and exposure and recording. An image data read into the computer 413 is converted by means of the D/A converter into analog information. Then, this signal modulates a laser beam emitted from the laser 441 to irradiate the beam by means of the polygonal mirror 444 on a linear photosensitive member 1, thereby sequentially recording on the medium 3. Now, similar to that in the case of FIG. 61, the recorded information is freely read as needed with the electric potential read head 411 to be put into A/D conversion and fed into the computer for an image processing; thus, an exposure to and a recording on the film 421 is made by means of the recording head 419.

According to this system, the apparatus can be made compact, the time required for reading and recording can be decreased, and the record can be preserved permanently, because of employment of an information carrying medium as a recording medium for image data.

In the description above, scanning and exposure are made by modulating light as shown in combination of an optical modulator with a polygonal mirror. Besides this, for example as in the case of a flying spot scanner, scanning and exposure may be made by scanning an electric beam with a CRT and a deflection means, and then by scanning and exposing by way of a photosensitive member with light from the bright spot of the CRT surface. Also, an information carrying medium may be placed facing and adjacent to the surface of a kind of CRT whose surface comprises a group of needle electrodes, so that electric discharge and recording may be directly made on the medium by way of the needle electrode to which the scanning electric beam is applied. A semiconductor laser can also be used as a laser and, in such a case, the method of directly modulating a semiconductor laser is commonly practiced without using an AOM (Acousto-optic Momodulator) as shown in FIG. 62.

With respect to FIGS. 63 and 64, a method of recording color image information will be described.

Figure 63:
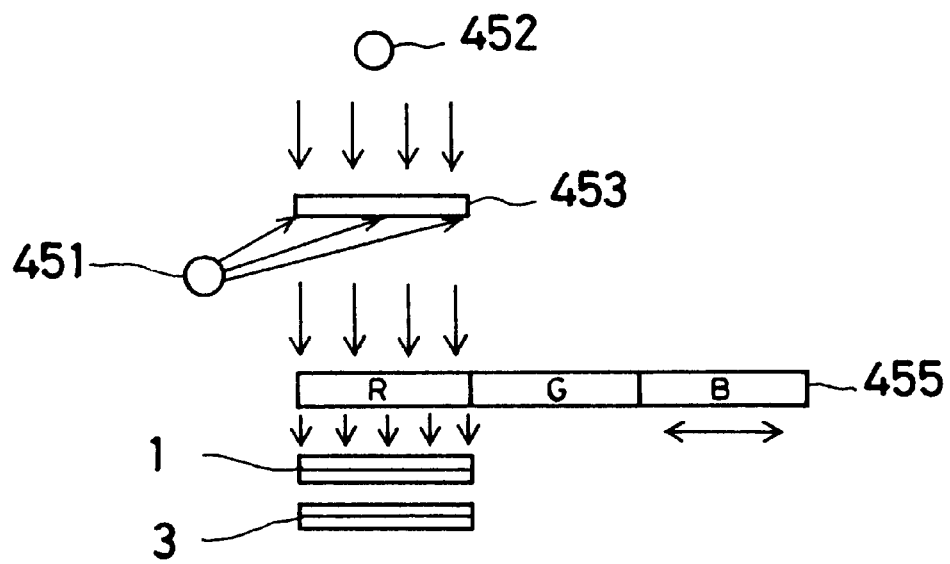
FIGS. 63 and 64 are views illustrating of how to record a color picture image.

In FIG. 63, an original is irradiated either by light source 451 or 452, and reflected light or transmitted light of the irradiated light is exposed by way of a color filter 455 to a photosensitive member 1 for recording on an information carrying medium 3. The color filter 455 comprises three elements R, G, and B. The filter is moved in the horizontal direction for selecting R, G, or B, where a group consisting of three information carrying media completes recording of one image information.

Figure 64:
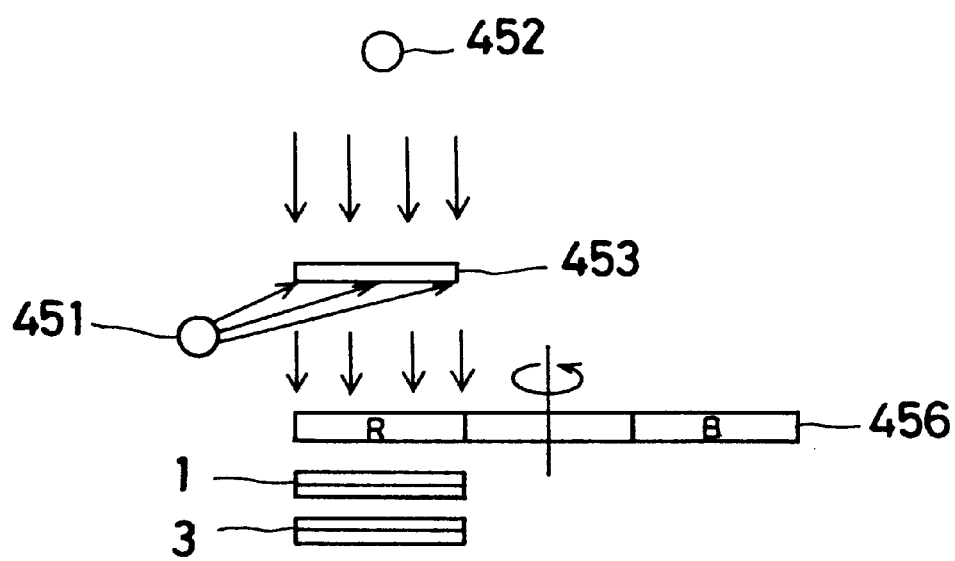

The structure shown in FIG. 64 is the same as that shown in FIG. 63, except a color filter 456 is a rotating type and thereby the selection of R, G, or B is achieved.

Now, with respect to FIGS. 65 to 69, notable features of an information carrying medium according to the present invention will be described in the case where it is applied to a scanner system.

Figure 65:
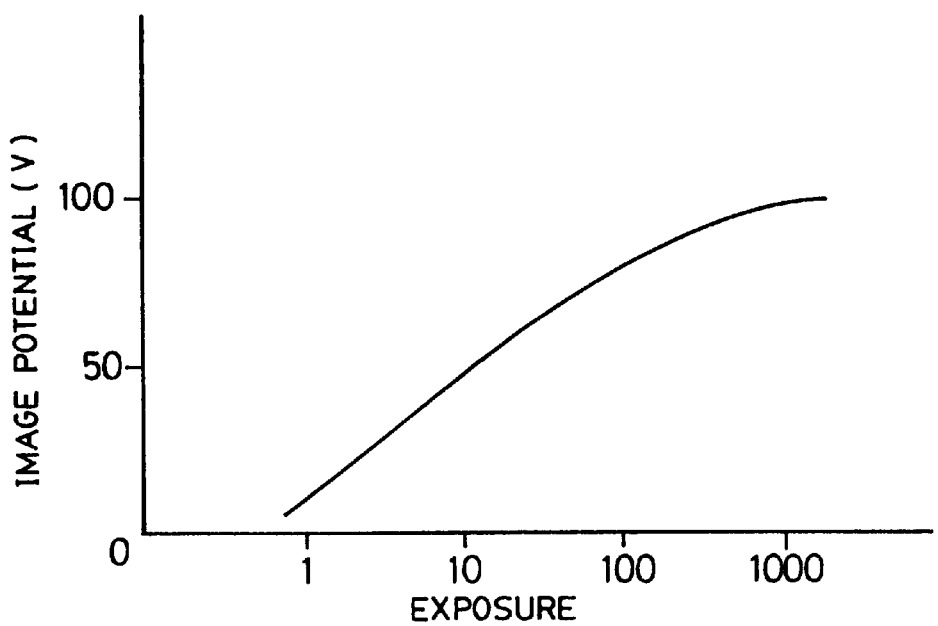
FIG. 65 is a graph showing a characteristic of image potential versus exposure of the information carrying medium of the present invention.

The graph in FIG. 65 describes characteristics of the change of image potential relative to the quantity of an exposure of an information carrying medium according to the present invention, where the quantity of the exposure is set in a free unit and shown in a logarithmic scale.

Normally, in a process scanner the dynamic range required for image density (a logarithmic indication value which is a proportion of irradiation light to transmitted light) is about 3, which is currently realized by photo multiplier, thereby making it impossible for the processing to use a conventional CCD or the like because of its dynamic range being about 2 at the utmost. Contrary to this, as can be understood when the characteristics shown in FIG. 65 is referred to, an information carrying medium according to the present invention can sufficiently cope with the dynamic range of about 3 of image density and is suitable for a processing scanner.

Figure 66:
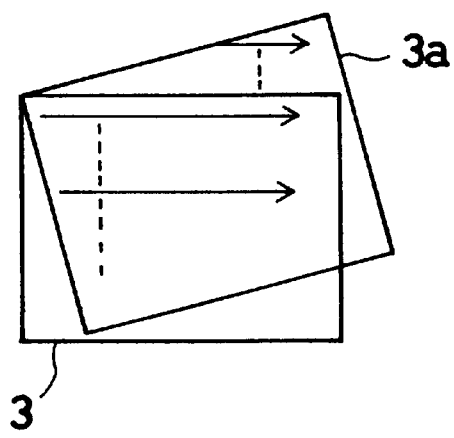
FIG. 66 is an illustration of an original being rotated a predetermined angle according to the present invention.
Figure 67:
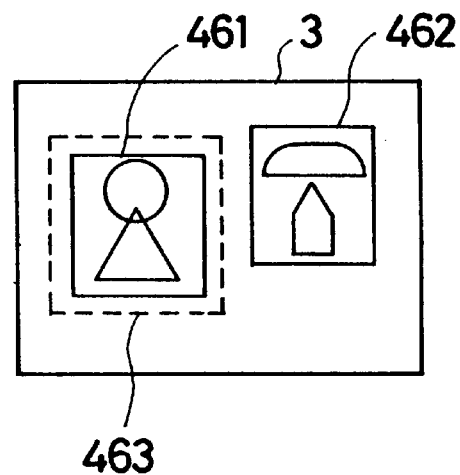
FIG. 67 is an illustration of how to therefor trim a desired picture from an original.

FIG. 66 illustrates an original which is rotated a designated angle.

Conventionally, when exposure and recording are made by rotating a picture image, an original itself is rotated a designated angle and set on a read cylinder of the drum scanner for reading, but the setting of the original on the cylinder by accurately rotating the original the designated angle is difficult. Since an information carrying medium according to the present invention is flat, as shown in FIG. 66, the medium 3 can be rotated a designated angle like 3a easily and accurately, and an image can be rotated easily by reading sequentially as shown with arrows in the drawing.

Normally, the center of a picture image is designated as the center of rotation, but in the example shown in FIG. 66 an angle at the upper left is designated as the center of rotation. As for the center of rotation, a picture image processing is made and a desired rotated picture image can be obtained when the relationship between the rotation of a picture image on an information carrying medium and the center of the table on which the medium is placed is found. Specially modified picture images can also be obtained by changing rotation speed and so forth. An illustration in FIG. 67 describes how a designated picture image is cut out from an original.

Conventionally, when a FIG. 461 is cut out, for example, an original is cut larger by means of a mask on the software as shown with a dotted line 463. In the case of an information carrying medium according to the present invention, only the FIG. 461 can easily be read when a mask having the same shape and size as those of the FIG. 461 is employed.

FIG. 68 illustrates an operation of cutting out of an original.

For example, in FIG. 68, when a picture image which needs to be cut out is that shown with reference numeral 471 and an instruction for the cut out is that shown with reference numeral 472, a detecting circuit 475 detects the relationship of relative positions between the position from the origin point of 472 to a head 411b and the position from the origin point of 471 to a head 411a, and this detecting signal drives an XY stage 476 to transfer an information carrying medium, thereby permitting reading only a designated area or erasing others while preserving information only in a designated area.

Illustrations in FIG. 69 describe the sharpness processing.

First, in the illustration (a), a recording is made of a picture image whose density changes like a step. Next, in the illustration (b), a double exposure is made over an electrostatic latent image of the image 481 by separately obtaining an unsharp signal 482 by means of, e.g. passing a signal of the image 481 through a low-pass filter after reversing the polarity of voltage applied to an information carrying medium. Since voltage of the reverse polarity is applied in an exposure in this case, a subtraction is made between the images 481 and 482 to result in an electrostatic latent image as shown with numeral 483 in the illustration. In the illustration (c), an image 484 whose edge is emphasized can be obtained by overlapping for an exposure the image 481 with the image 483 in a condition where the voltage is of the same polarity as that of the illustration (a), and therefore the sharpness processing can easily be made by simply repeating an exposure.

This sharpness processing is performed by adding and subtracting image potentials, and by developing this procedure a two-dimensional image operation can be performed with an information carrying medium.

Formation of a negative latent image according to the present invention can easily be made by exposing to a uniform amount of light at a bias of a designated polarity, and then by exposing at voltage having a polarity which is reverse relative to the former.

FIGS. 70(a) and 70(b) illustrate one embodiment of an information recording and reproducing apparatus which is used for protecting a printed original.

In FIG. 70(a), reference numeral 1 designates an information carrying medium, 500 a camera, 501 a color separation filter, 7 a photosensitive member, 503 an original, 511 a read head, 513 an amplifier, 515 a signal processing unit, 517 a memory, 519 a CRT, 521 an input unit, and 523 a recording head, In FIG. 70(a), the electrostatic camera 500 reads the printed original 503. The camera 500 comprises the color separation filter 501, photosensitive member 7, and information carrying medium 1, and separates an input image into R, G, and B images by means of the color separation filter 501. A predetermined voltage is applied between the photosensitive member 7 and the medium 1, and a portion of the photosensitive member 7 which is irradiated with an exposure to light and thereupon shows conductivity and discharges electricity at the portion between the medium, thereby forming an electrostatic latent image on the medium 1 according to image 503.

Then, a color image is displayed on the CRT 519 after a designated image processing in the signal processing unit 515 of FIG. 70(b). At an instruction data unit this color image is monitored and the input unit 521 is used for inputting data for designation of a portion which needs trimming or for designation of magnification power and the like. Thus, the color image and the instruction data are recorded electrostatically on the medium 1 from the signal processing unit 515 by way of the recording head 523.

Figure 71:
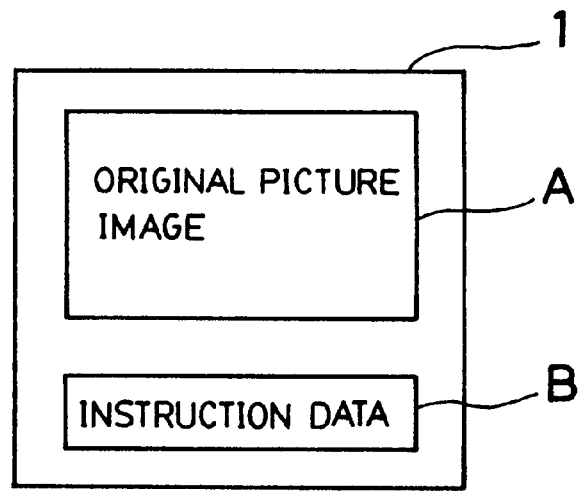
FIG. 71 is a view illustrating data of an information carrying medium according to the present invention.

FIG. 71 illustrates an information carrying medium on which a color image and instruction data are recorded, where A designates a printed original image and B an electrostatic latent image of the instruction data which has previously been obtained. Thus, damage and stain that occur conventionally in each processing can be prevented completely by recording the printed original and the instruction data on the medium, and then by feeding them into a printing process instead of feeding the printed original.

In FIG. 70(b), in the case of recording with the recording head 523 on the information carrying medium 1 from the signal processing unit 515, electrostatic recording is performed by scanning the plane of the medium 1 with the recording head. Besides this, there are other methods, e.g. the ion deposition method, in which a laser beam is optically modulated with an output from the signal processing unit 515, and recording is made on the information carrying medium with an exposure to which voltage is applied while the modulated laser beam being scanned.

Figure 72:
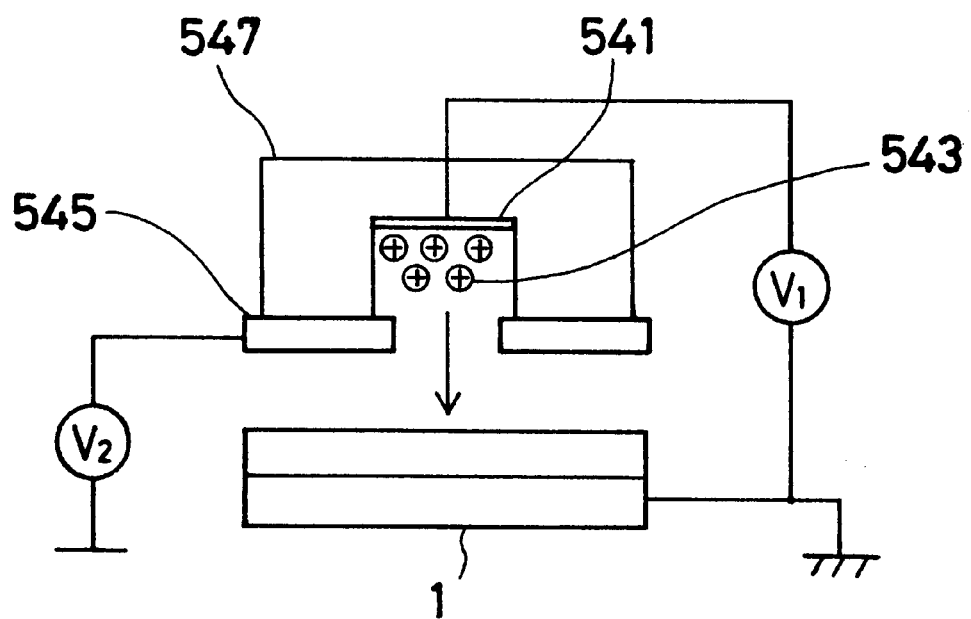
FIG. 72 is a view showing a deposition method used in the present invention.

FIG. 72 illustrates the ion deposition method, where an electrostatic latent image is formed by producing a corona discharge between an information carrying medium 1 and an electrode 541 and, by controlling the corona 543 which is attracted onto the medium 1 by controlling the voltage which is accordingly applied to the electrode 541 and to a gate electrode 545 which is insulated with an insulator 547.

As described above, since an information carrying medium is used in place of a printed original such as a color original, the original can be prevented from damaging. Also, instructing can be rationalized because a display such as a CRT can be monitored when preparing instruction data, and a faulty printing process and the like resulting from misidentification between an original and instruction data can be securely prevented because the instruction data and the information of the original are recorded on the same medium.

Figure 70:
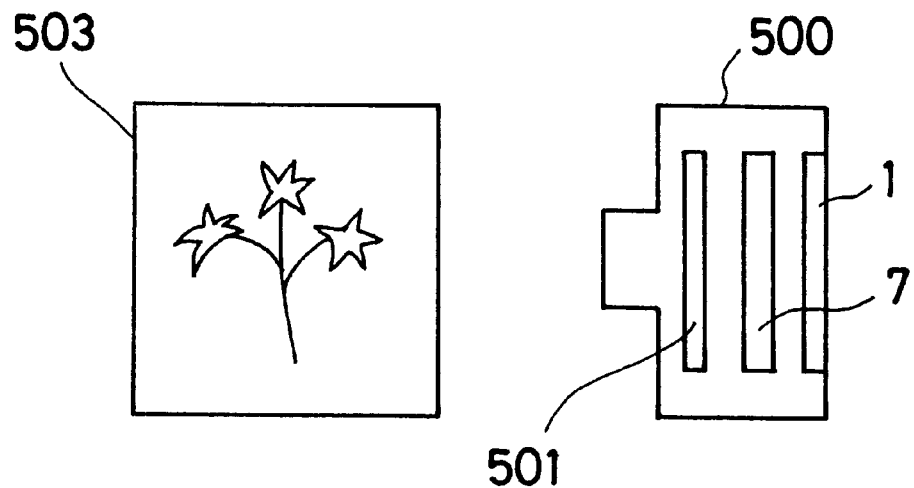
FIGS. 70(a) and 70(b) is a view showing another embodiment of the present invention for protecting a printing original.
Figure 70:
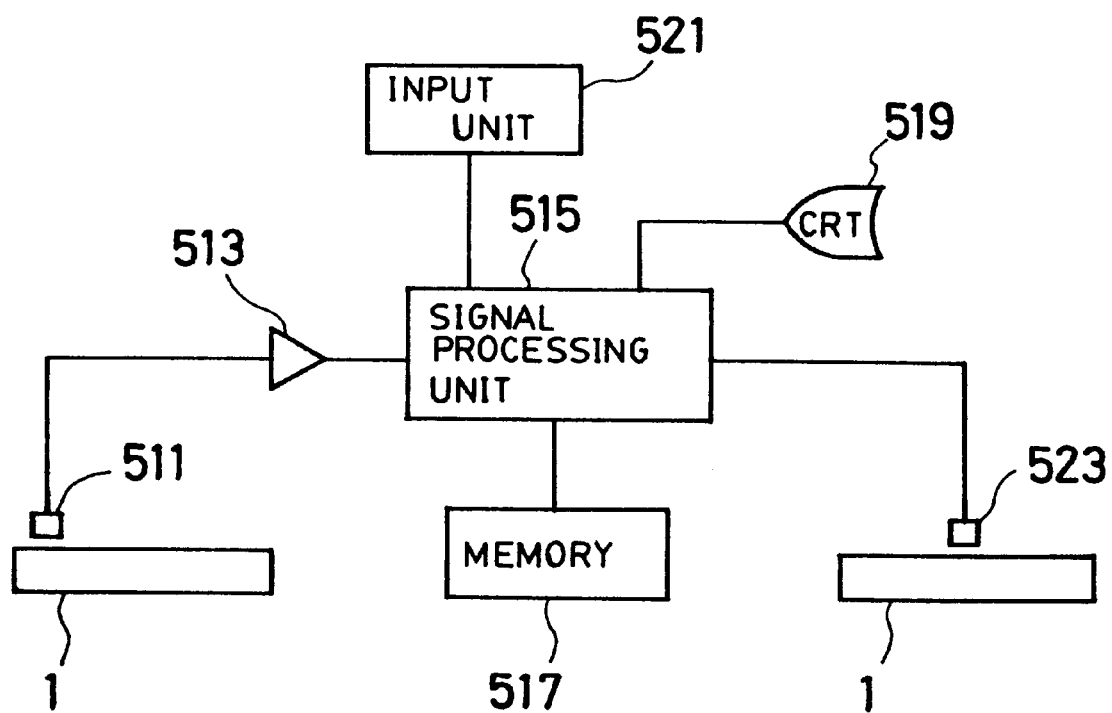
Figure 73:
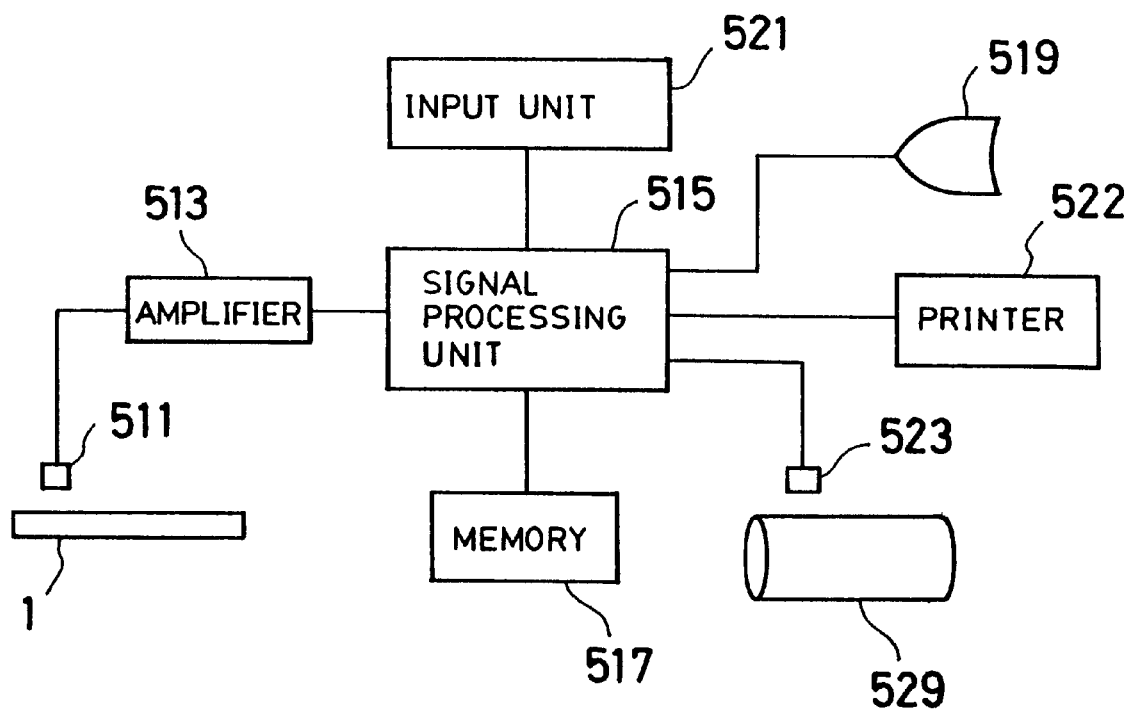
FIG. 73 is a view showing the whole structure of a color scanner used in the present invention.

FIG. 73 illustrates the overall structure of a color scanner according to the present invention, in which identical reference numerals to those in FIG. 70 imply identical contents to the same. Reference numeral 522 designates a printer and 529 a cylinder.

In FIG. 73, an information carrying medium is placed facing a photosensitive member, and an electrostatic latent image is recorded when an exposure is made in the condition that a designated voltage is applied.

Besides an image of an original A as shown in FIG. 71, instruction data B such as magnification power or designated data for trimming are recorded on the information carrying medium 1. As for recording of these instruction data, for example in FIG. 73, the recording can be made on the information carrying medium by the ion deposition method or the like, in which the electrostatic latent image on the medium 1 is read with the read head 511 to display a color image on the CRT 519 after introducing a designated image processing with the signal processing unit 515, then magnification power or designated data for trimming is inputted with the input unit 521 while the color image is being monitored, and voltage application and exposure are made after optically modulating a laser beam with an output from the signal processing unit 515.

Figure 74:
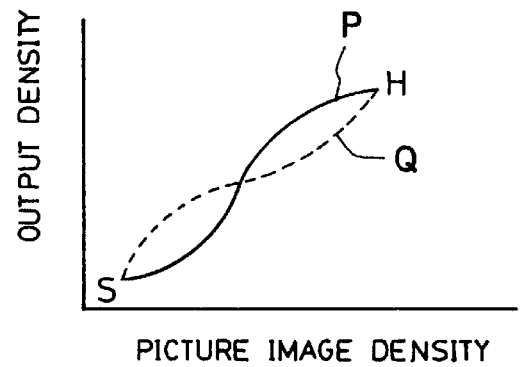
FIG. 74 is a graph illustrating a set up point of the scanner.

Then, as shown in FIG. 74, the highlight point H and the shadow point S are determined by monitoring the color image which is displayed on the CRT 519. Simultaneously, an output density is determined between the H and the S if it can be like, e.g. an output density having characteristics as designated by P or Q. Accordingly, when the setup is completed, a hard copy is printed with, e.g. a sublimation transfer printer 15, and the setup is inspected to see whether or not it is properly made.

Upon completion of the setup, a printed image will be outputted on a processing film which is set on the cylinder 529, by way of the head 523 from the signal processing unit 515.

Figure 75:
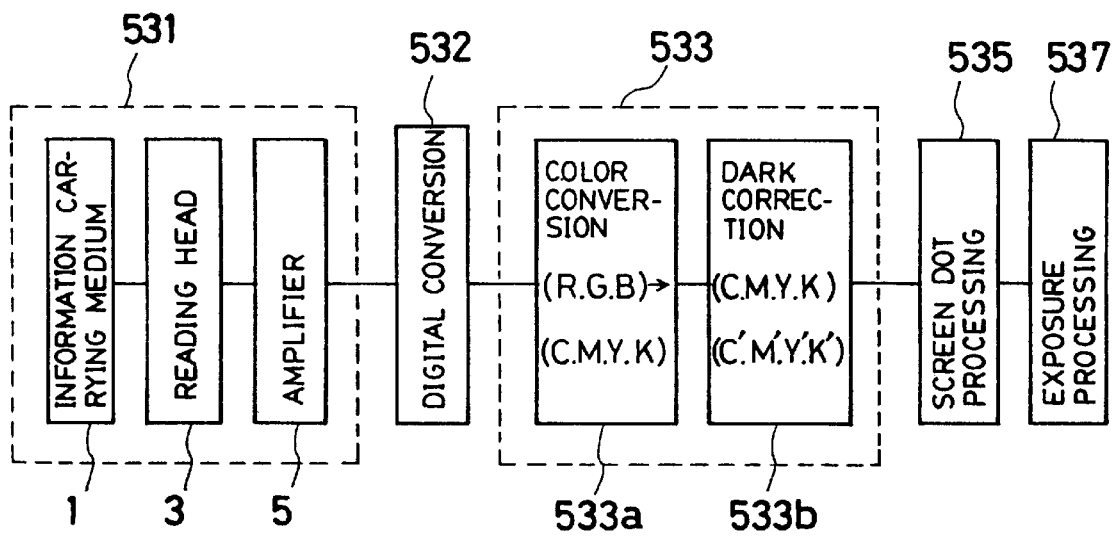
FIG. 75 is a view showing the process of the scanner.

Referring to FIG. 75, further details of the process of printing and processing will be described.

First, a read unit 531 reads an electrostatic latent image which is recorded on an information carrying medium. Here, a read head 511 reads the electrostatic latent image which is recorded on the medium 1. The analog data which have been read will be put into a digital conversion 532 after amplification at an amplifier 513, and then color correction will be made at a color correction unit 533. In the color correction, signals R, G, and B are converted into signals C, M, Y, and K, first. Since an ink darkens, C', M', Y', and K are corrected for darkness at a dark correction unit 533b.

Next, after the setup previously described, a screen dot processing 535 will be made, and an exposure processing 537 will be carried out according to the formation of the screen dots.

Figure 76A:
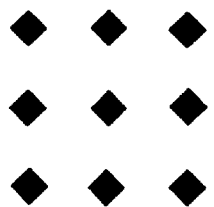
FIGS. 76(a) to 76(c) are views illustrating screen dots.
Figure 76B:
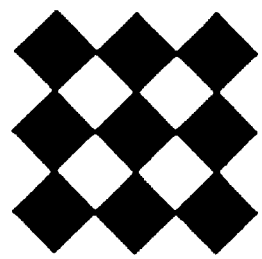
Figure 76C:
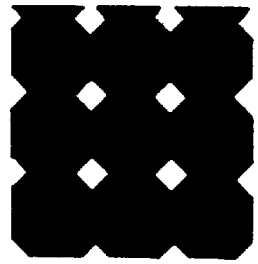

As illustrated in FIG. 76, screen dots are changed in size depending on the image density. When whitish, screen dots are like those shown in FIG. 76(a). When dark, they are like those in FIG. 76(c). When gray, they are like those in FIG. 76(b). Thus, screen dots are changed in size with the pitch being kept unchanged.

Figure 77B:
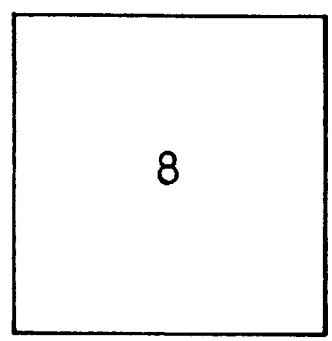
Figure 77C:
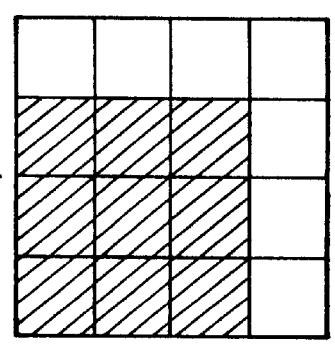

In order to form these screen dots, for example, a dot generator may be used as illustrated in FIG. 77. Here a general description will be made on this method; with one screen dot like that shown in FIG. 77(a), weight determination is made as in the (a), and when a density level of an image equivalent to one screen dot is 8 as shown in FIG. 77(b), a weight determination value is compared to the image level 8 and a portion whose weight value exceeds a density level is designated in black as shown in FIG. 77(c). Thus, a screen dot whose size corresponds to a density level can be formed. Since an information carrying medium is used in place of a color original, as above, the color original can be free from damage and operation efficiency can be improved because preparation of a scanner is not required. Also, errors can be decreased because instruction data are mechanically read together with a picture image from the medium on which they are recorded. However, conventionally a drum of a different size must be used when a different enlargement ratio is employed, the present invention allows a change of enlargement ratio by simply changing scanning density in reading.

Figure 78:
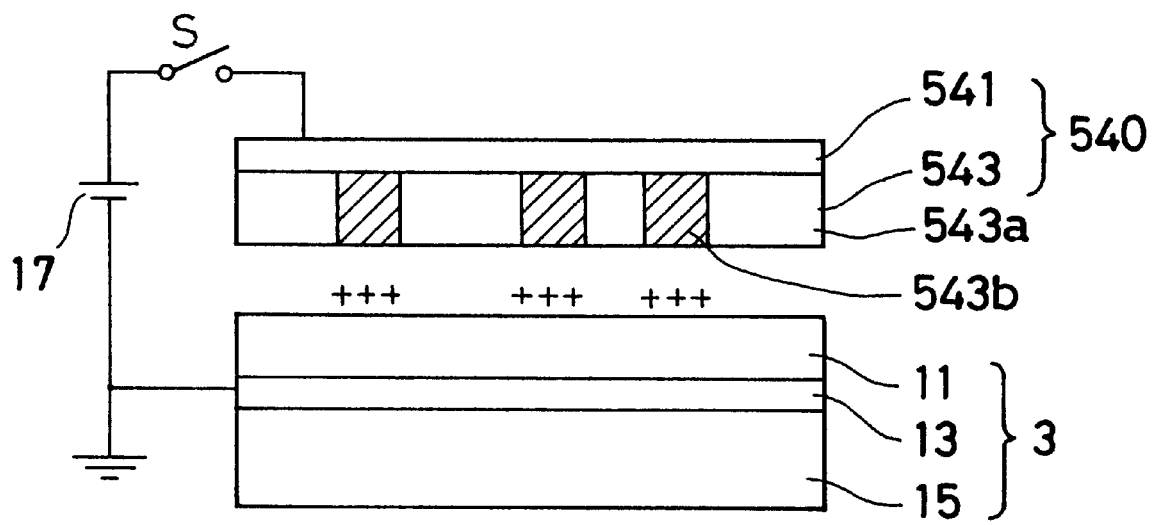
FIG. 78 is a view showing how to record and reproduce information according to the present invention for reproducing an original.

FIG. 78 illustrates one embodiment of an information recording and reproducing method for the purpose of reproducing an original plate. In FIG. 78, reference numeral 540 designates an original plate, 541 an electrode, 543 a pattern layer, 543a an insulation member, 543b a conductive member, 3 an information carrying medium, 11 an insulation layer, 13 an electrode, 15 a backing member, 17 a D.C. power source, and S a switch. On the original plate 540 there is formed a pattern layer 543 comprising the insulation member 543a and the conductive member 543b, and the original plate is placed facing and contacting or not contacting the information carrying medium 3 which is formed with the electrode 13 and the insulation layer 11 on the backing member 15, thereby applying D.C. voltage from the power source 17 between the electrodes 13 and 541. Owing to the applied voltage a discharge takes place between the conductive member 543b and the insulation layer 11, and an electrostatic latent image is formed on the insulation layer 11 corresponding to a pattern of the conductive member 543b to reproduce a pattern of the original plate 540 on the information carrying medium 3. The reproduced pattern may be read electrically and displayed on a CRT or the like, or may be developed with toner.

The materials and fabrication methods of an information carrying medium as described above with respect to FIG. 1 apply equally to this embodiment.

With respect to FIGS. 79 to 83 a fabrication method of an original plate will be described.

Figure 79A:
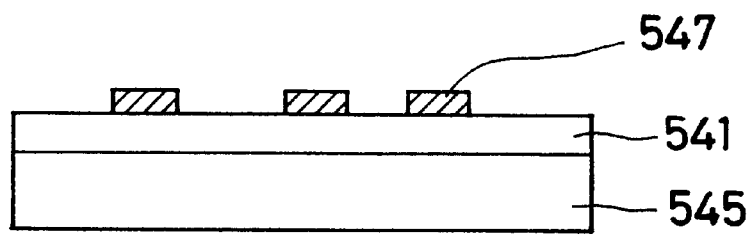
FIG. 79 is a view showing an original having an insulating pattern formed on an electrode substrate according to the present invention.

FIG. 79 illustrates a formation in which an insulation pattern is formed on an electrode substrate. An electrode 541 is formed on a backing member 545, and an insulation pattern 547 is formed on the electrode 541. In use of this original plate, an electric discharge occurs between portions of the electrode 541 on which no insulation pattern is formed and an information carrying medium, thereby reproducing an original plate.

Figure 79B:
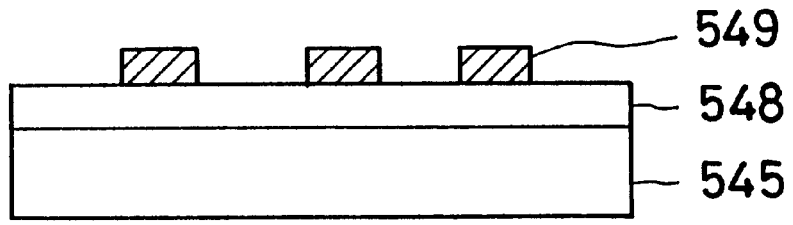

FIG. 79(b) illustrates an example in which a patterned electrode is provided on the surface of a backing member, wherein at least the surface is insulated. In the case the backing member is made of glass which is insulated as is, for example, the electrode may be directly provided on the glass.

Figure 79C:
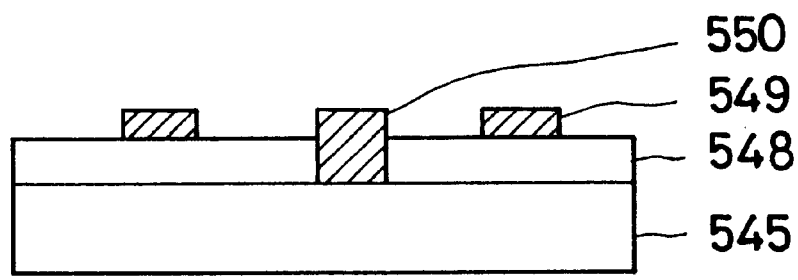

FIG. 79(c) illustrates an example in which an electrical connection is made on an isolated electrode 550 with the pattern unchanged. In this example, the electrical connection to the isolated electrode is achieved by way of the conductive backing member, while a defect portion is formed on the insulation member 545 in the surface insulation layer of the conductive backing member where the isolated electrode is located.

Figure 80:
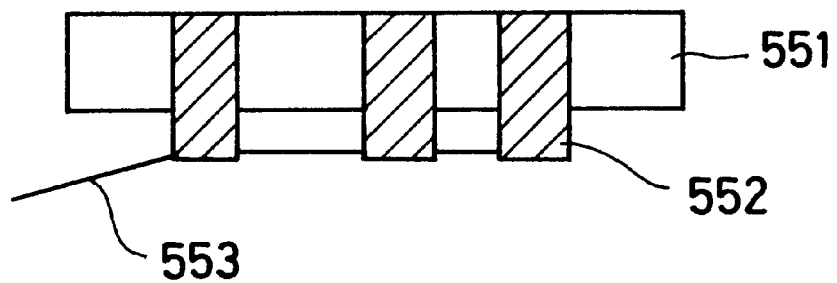
FIG. 80 is a view therefor for showing an original in which a conductive pattern is formed by passing conductive members through an insulating member.

FIG. 80 illustrates a formation in which a conductive pattern is formed by piercing a conductive member through an insulation member. A conductive member 552 is filled piercing an insulation member 551, and planes of the insulation member and conductive member are flush with each other on the side they face an information carrying medium, and arranged so as to connect a wire 553 to a portion of the conductive member which is projected from the other side of the insulation member and to apply voltage thereto. As for a method of filling the conductive member 552 into the insulation member 551, for example, a thin insulation film is used as the insulation member 551, and this is placed on a metal plate so that a thin, pin-shaped conductive member may be filled therein to form a pattern. An image can be made light or shaded by changing resistance of each pin according to its location.

Figure 81:
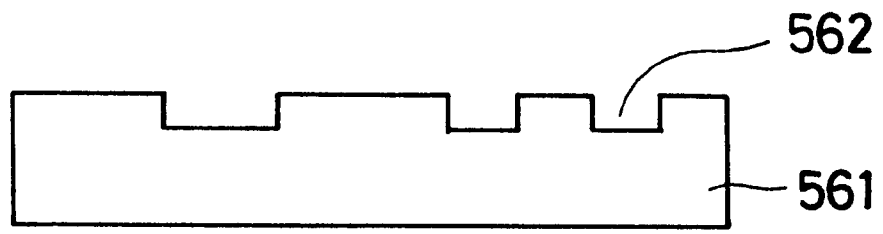
FIGS. 81 and 82 are views showing how to fabricate an original, used in the present invention, with grooves formed in the conductive member.
Figure 82:
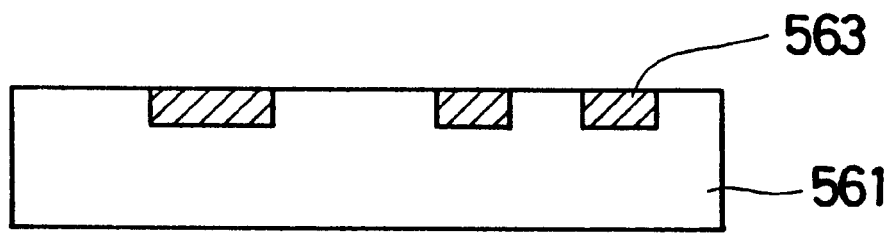

FIGS. 81 and 82 illustrate formations in which grooves are formed on conductive members thereof.

By forming grooves 562 in conductive members 561 the grooves are free from electric discharges, and thereby patterns can be reproduced.

Furthermore, the groove 562 may be filled with a conductive member 563 by pressure as shown in FIG. 82.

Figure 83:
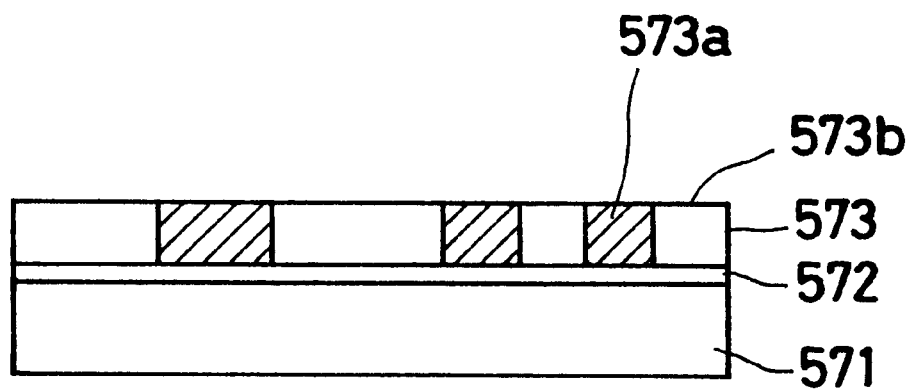
FIG. 83 is a view showing an original of the present invention, in which a memory photosensitive member is formed on an electrode substrate, and in which a pattern is then formed by exposure.

FIG. 83 illustrates an embodiment of forming a pattern by an exposing light in using the photosensitive member (hereinafter, memory photosensitive member) which mainly exhibits a durable conductivity by an exposing light in the medium formed a photoconductive insulation layer on an electrode substrate.

On a glass substrate 571 there is formed an electrode 572, and on the electrode there is formed an insulation member 573. The insulation member 573 which is made of, e.g. polyvinyl carbazole (PVK) is irradiated with ultraviolet light to generate radicals and to lower resistance thereof, thus showing and maintaining conductivity for several hours. This insulation member also has a characteristic such that it returns to be an insulator with heat, and for example, heat of 150° C. for a second returns it to being almost an insulator. Accordingly, an original plate can be made by forming a conductive pattern with an exposure, and heating erases and permits the pattern to be used repeatedly.

When PVK is added with, e.g. triphenyl dyes, exposures can be made even by visible light or a He-Ne laser beam. A pattern may be formed by fixing the brightness of an exposing light source, so as to detect whether or not there is an exposure or to obtain a light or shaded image by spatially modulating the brightness of the light source.

Figure 84:
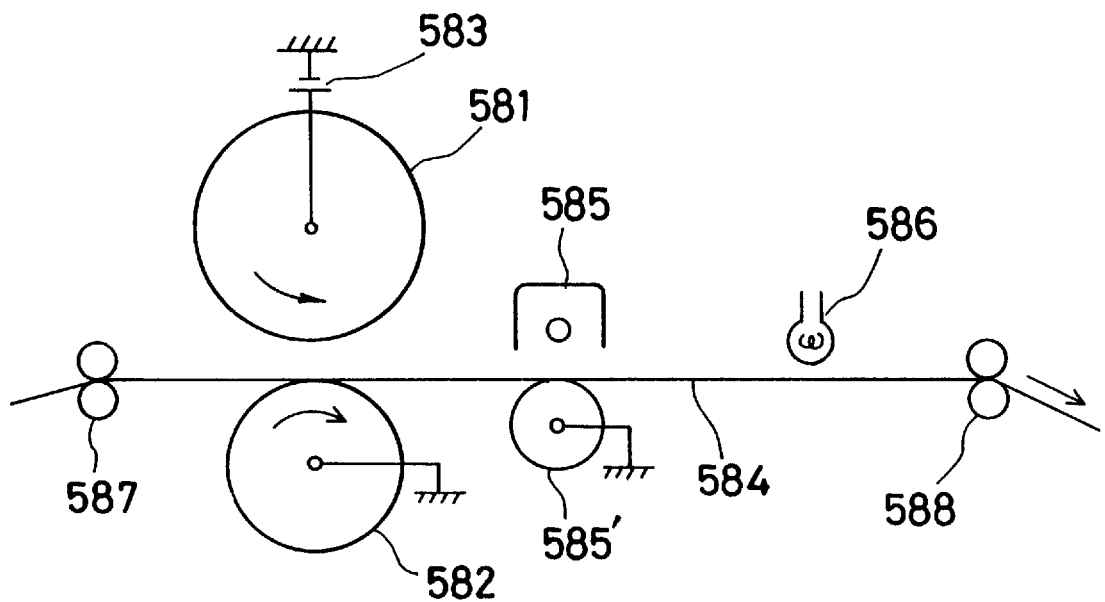
FIG. 84 is a view illustrating another embodiment of the present invention, in which reproduction is continuously performed by using an insulating film as the information carrying medium.

FIG. 84 illustrates a consecutive reproduction using an insulation film as an information carrying medium. In FIG. 84, reference numeral 581 denotes a cylindrical original plate, 582 a cylindrical electrode, 583 a D.C. power source, 584 an insulation film, 585 a developing unit, 586 a fixing unit, 587 a feed roll, and 588 a take-up roll.

The cylindrical original plate is fabricated by the method which is shown in FIGS. 79 to 83. The plate is faced to and kept contacting the cylindrical electrode 582 in order to consecutively feed the insulation film 584.

An electrostatic latent image is formed on the insulation film by rotating the cylindrical original plate 581 and cylindrical electrode 582 at a high speed, and then the formed electrostatic latent image is developed with toner by means of the developing unit 585 and a facing electrode 585' to be fixed with the fixing unit 586, thereby reproducing an original plate at an ultra high speed. However in the illustrative example the cylindrical plate and the cylindrical electrode are not contacting each other, they may contact as well.

Figure 85:
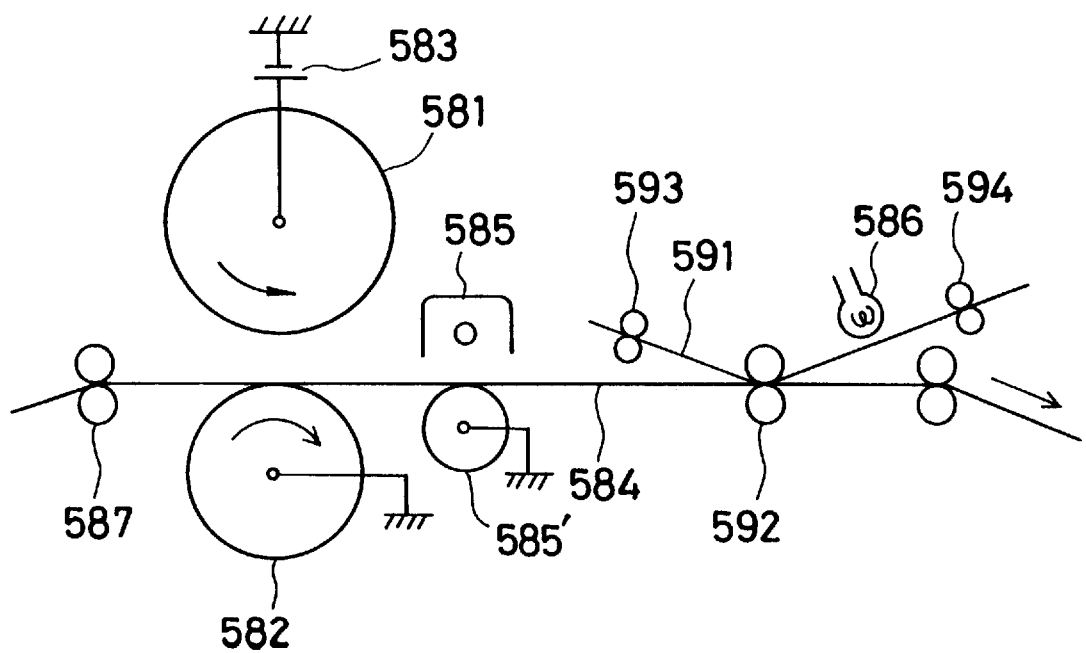
FIG. 85 is a view illustrating another embodiment of the present invention in which a toner image formed on the insulating film in FIG. 84 is transferred.

FIG. 85 illustrates an example in which a toner image formed on the insulation film in FIG. 84 is transferred on a transfer paper 591. As is described previously, the toner image formed on the insulation film 584 is transferred with a transfer unit 592 and fixed on the transfer paper 591. In this example, there may also be a usage in which remaining toner and electrostatic latent image are erased after a transfer with the insulation film 584 which is made endless.

Thus, reproduction of an original plate can easily be made many times at a high speed by making an original plate which forms a pattern, comprising a conductive member and an insulation member thereon facing an information carrying medium whose electrode substrate has an insulation layer to apply D.C. voltage between the conductive member of the original plate and, the electrode substrate to form on the information carrying medium an electrostatic latent image which corresponds to the pattern of the original plate.

The reproduction can be made at an ultra high speed by making an original plate into a cylindrical shape. The reproduced pattern can be made into a developed image by changing into electric signals or by toner development.

Figure 86:
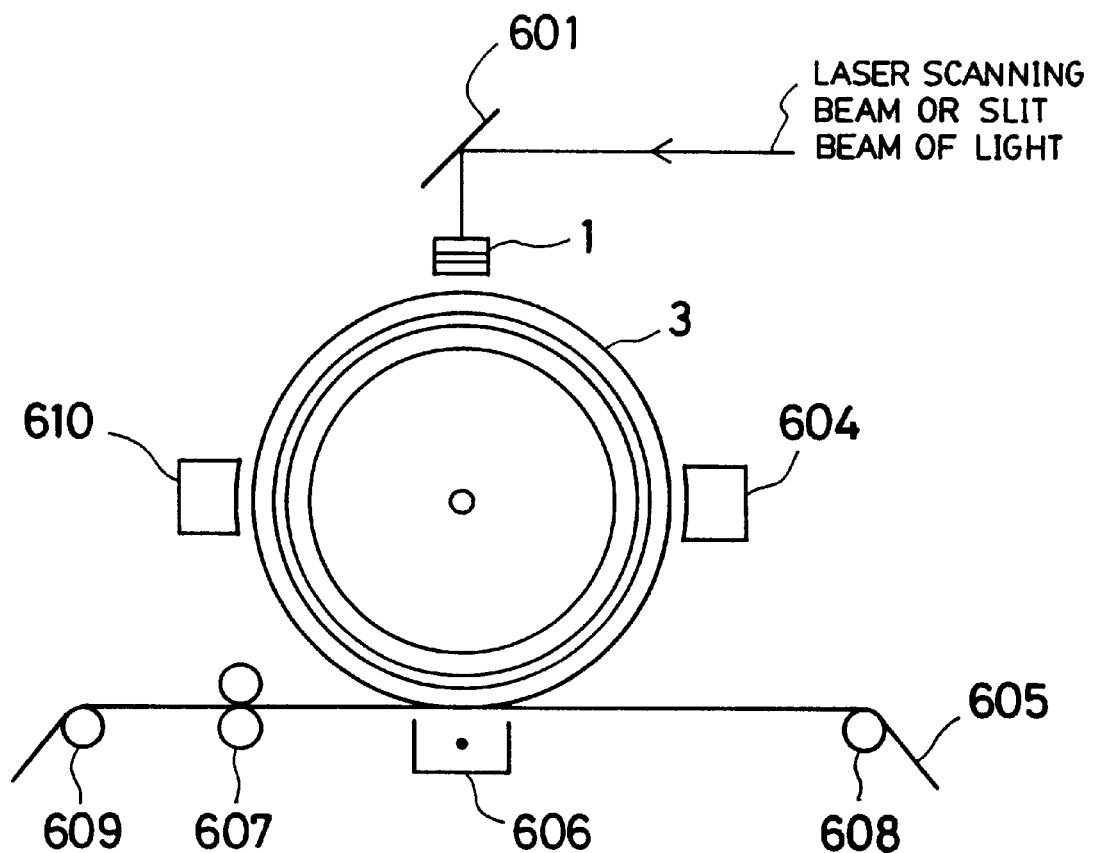
FIG. 86 is an illustration of how to impose light on the information carrying medium of the present invention.

FIG. 86 illustrates an information recording and reproducing process for the purpose of an exposure method of an information carrying medium, wherein reference numeral 601 designates a mirror, 604 a developing unit, 605 a paper or a film, 606 a transfer unit, 607 a fixing roll, 608 a feed roll, 609 a take-up roll, and 610 an eraser. A scanning light or a slit light such as a laser beam which has irradiated on the surface of an original, not shown herein, is irradiated by way of the mirror 601 on photosensitive member 1. The photosensitive member 1 is long and slender vertically to the paper surface, and a predetermined voltage is applied between this and an information carrying medium 3 on a rotating drum. As a result, an electrostatic latent image is recorded on the drum-shaped information carrying medium 3, according to the image density of the original.

The formed electrostatic latent image is developed with toner by means of the developing unit 604 and, further, it is transferred onto the paper or film 605 by means of the transfer unit 606 comprising a corotron so as to be fixed with the fixing roll 607 in which a heater is incorporated. After the transfer, remaining potential over the information carrying medium is erased by the eraser 610 for the preparation of oncoming exposures. The eraser 610 is provided for the purpose of leaking potential over the information carrying medium, which may be a conductive type of material in a free form such as liquid or solid that can leak potential by contacting the information carrying medium. Remaining potential may be canceled by an A.C. corona discharge.

Since an image information is recorded as an electrostatic latent image on the information carrying medium 3 in the exposure method for an information carrying medium of this embodiment, the latent image is maintained stably for a long time, thereby eliminating a need for strict potential. control as is needed in the case of a conventional copier, and low voltage and low power consumption by the exposure unit is realized owing to its response to a very small quantity of light.

Figure 87A:
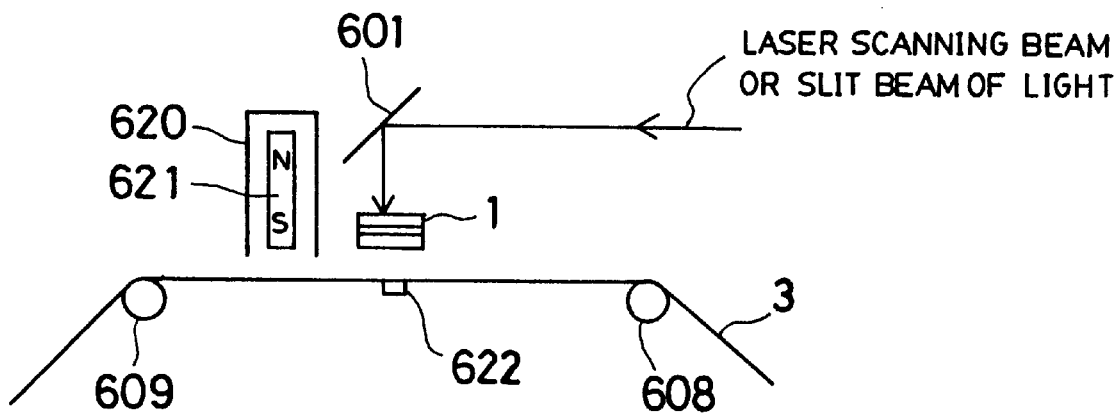
FIG. 87 is a view of another embodiment of the present invention, using an information carrying medium in the shape of paper.

FIG. 87(a) illustrates another embodiment of the present: invention, and identical reference numerals designate identical parts in as designated in FIG. 1(a). Reference numeral 620 indicates a magnetic brush developing unit, 621 a rotating magnet, and 622 an electrode.

In this embodiment, an information carrying medium 3 is either a paper-like or film-like insulation member, wherein recording of an image is made on the paper-like or film-like insulation member by placing the elongated electrode 622 facing and in a similar manner to a photosensitive member 1 which is long and slender in the vertical direction relative to the paper surface, and by applying a predetermined voltage between the photosensitive member 1 and the electrode 622.

Figure 87B:
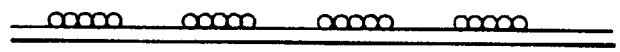

In operation, the elongated photosensitive member 1 is irradiated with a laser scan beam or a slit beam from an original which is not shown herein. On the other hand, the paper-like information carrying medium 3 is continuously fed by means of the feed roll 608 and the take-up roll 609 contacting the electrode 622, and by applying voltage between the photosensitive member 1 and the electrode 622 electrostatic latent images are consecutively formed on the information carrying medium 3 according to the image information. The electrostatic latent images formed on the paper-like information carrying medium are developed with toner by means of the magnet brush developing unit 620, and thus, toner images are formed as shown in FIG. 87(b). The magnetic brush developing unit 620 comprising the rotating magnet 621 rotates by means of a rotation of a magnet to make magnetic toner grains into a brush-like form, thereby contacting a recording medium for developing. Thereafter, a fixing unit not shown herein fixes the images.

The transfer process can be omitted, since an information carrying medium itself functions as a copying medium in this embodiment. Needless to say, a further transfer may be made on another paper or the like from the paper-like information carrying medium. If the information carrying medium is capable of maintaining a latent image potential stably for a long time, development can be made at a freely designated time, and for constructing the apparatus a latent image potential forming unit, a developing unit, or the like can be separately constructed.

Figure 88:
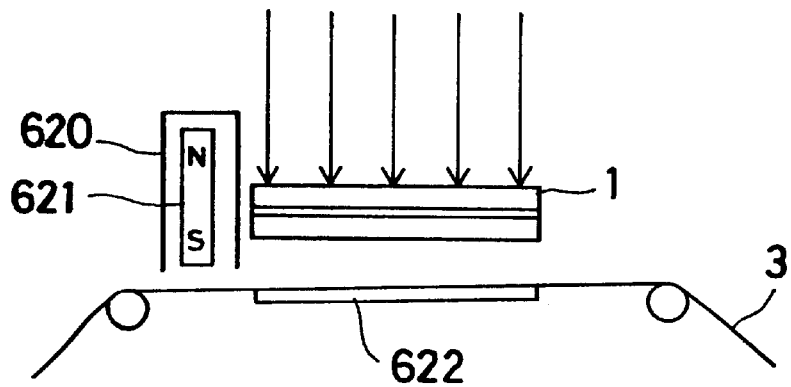
FIG. 88 is a view of another embodiment of the present invention, in which planar exposure is carried out.

FIG. 88 illustrates another embodiment according to the present invention, in which a plane exposure is employed.

In this embodiment, a photosensitive member 1 is formed like a plane, and an electrode 622 is formed like a similar plane to that of the photosensitive member, where the electrode faces the photosensitive member 1 and is positioned behind a paper-like or film-like information carrying medium 3. Then, exposures are made consecutively by intermittently feeding the information carrying medium 3 and by stopping the medium at a designated position at a time of exposure.

Owing to the plane exposure as above, time required for an exposure can be notably decreased.

Figure 89A:
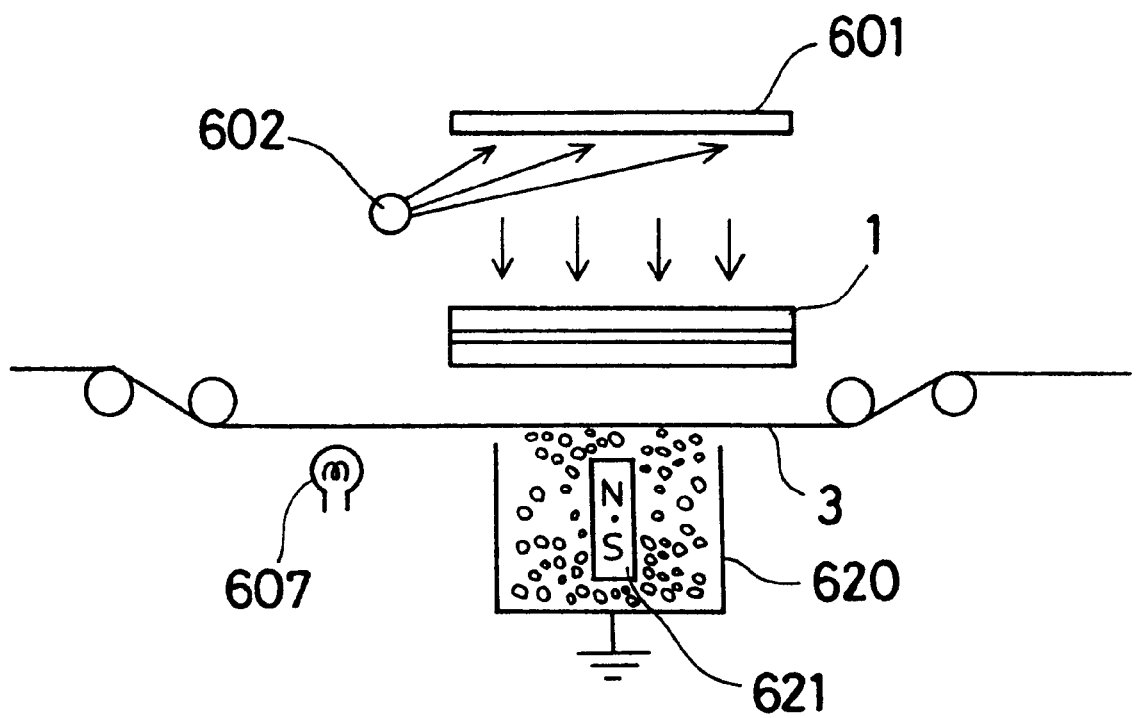
FIGS. 89(a) and 89(b) are views of another embodiment of the present invention, in which a magnetic brush developer is arranged in opposition to the photosensitive member.
Figure 89B:
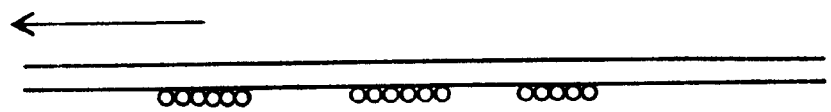

FIG. 89(a) illustrates a configuration in which the magnetic brush developing unit 620 is placed facing a photosensitive member with respect to an information carrying medium, wherein the information carrying medium 3 is simply an insulation film with no polarity, as shown in FIG. 89(b), to ground the magnetic brush developing unit and apply designated voltage to the electrode of the photosensitive member 1. When a light source 602 irradiates on the surface of an original and its reflected light makes a plane exposure of the photosensitive member 1, an electrostatic latent image is formed on the information carrying medium 3 and, simultaneously, the image is developed with toner by means of the developing unit 620. Exposure and developing are simultaneously made to form a toner image on the other side of the exposure unit, by making magnetic toner grains into a brush shape of the toner grains by means of the developing unit 620 comprising a rotating magnet 621 to contact the information carrying medium 3. In this case, because the developing unit also functions as an electrode and grounds charges of the information carrying medium by way of the magnetic toner grains, the entire exposure plane should face the information carrying medium, and therefore a plurality of developing units should be arranged depending on the condition. After the development as above, the image is thermally fixed with a heater 607.

In the case of this embodiment, preferably, the exposure is not the plane exposure method but an exposure method using a slit beam or a scanning beam should be used and, the shape of a developing unit should be long, slender, and small, since there may be a case where a large developing unit or a plurality of developing units are required because the developing unit of the embodiment also functions as an electrode due to the information carrying medium being simply a film-like insulation member having no electrode.

Figure 90A:
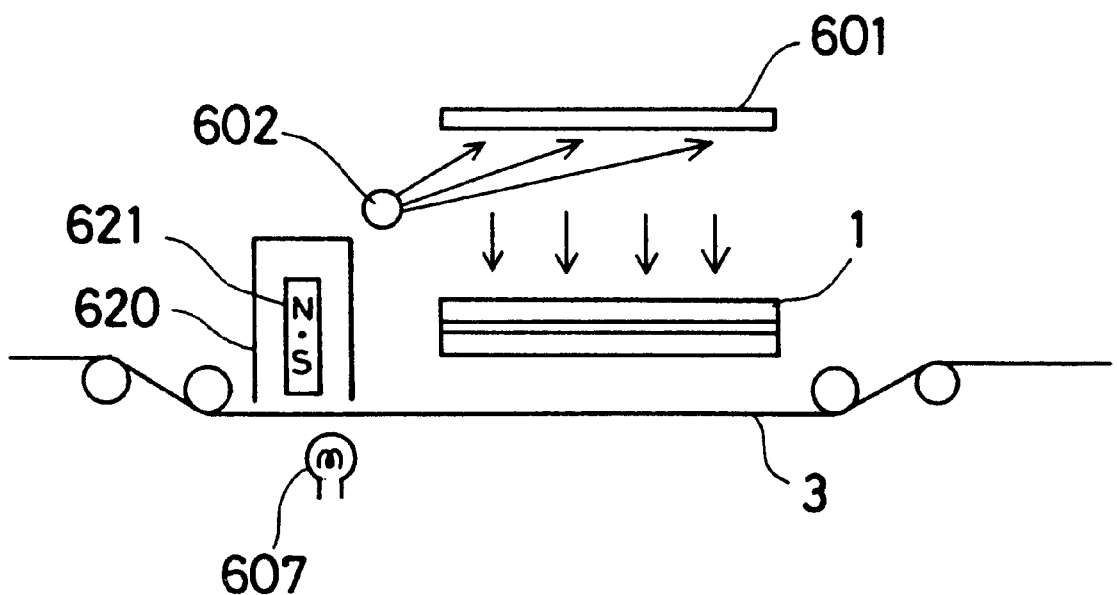
FIGS. 90(a) and 90(b) are views of another embodiment of the present invention, in which the magnetic brush developer is arranged in the same side as the photosensitive member in relation to the information carrying medium.

FIG. 90(a) illustrates an example in which the magnetic brush developing unit is placed with respect to an information carrying medium on the same side as that of a photosensitive member.

Figure 90B:
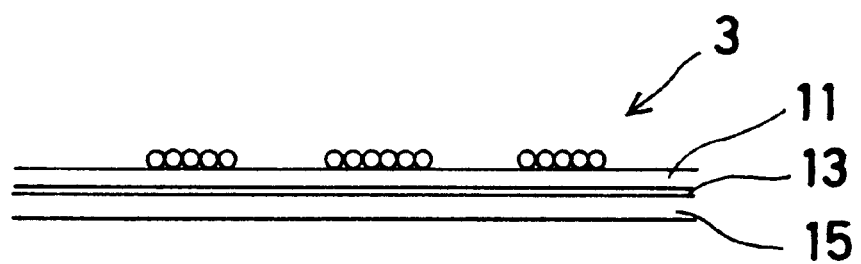

As shown in FIG. 90(b), the information carrying medium is configured into a conventional structure, in which an electrode 13 is formed on an insulation layer backing member 15 and a further insulation layer 11 is formed on the electrode, so that an electrostatic latent image is formed by applying a designated voltage between the electrode of the photosensitive member and the electrode 13 of the information carrying medium 3, developing may be made at a freely designated time after the exposure, and a toner image is formed on the exposure side.

Figure 91:
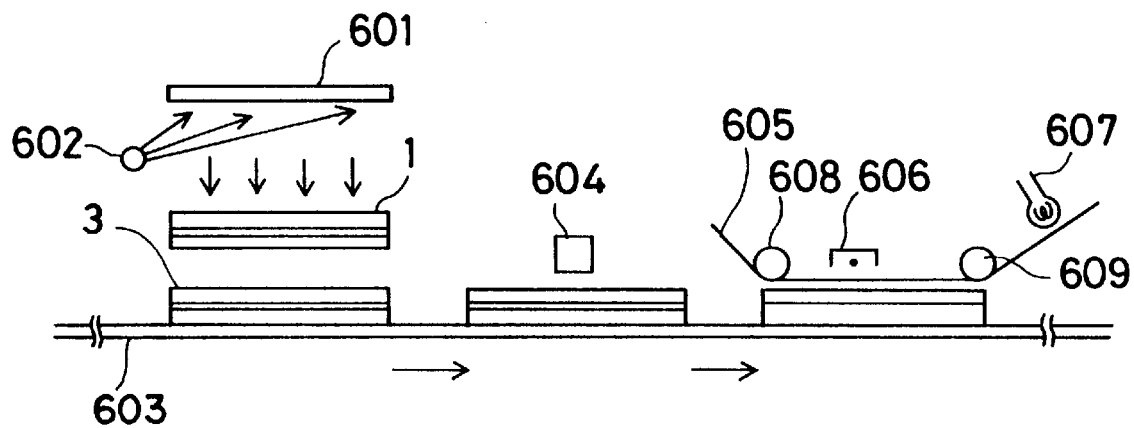
FIGS. 91 and 92 are views of another embodiment of the present invention, in which the information recording and reproducing apparatus is used for electrostatic copying.

FIG. 91 illustrates one embodiment of an information recording and reproducing apparatus for the purpose of static copying.

The surface of an original 601 is irradiated with a light source 602, and reflected light therefrom is irradiated on a photosensitive member 1. A predetermined voltage is applied between the photosensitive member 1 and an information carrying medium, 3 the plane exposure is made on the photosensitive member 1 with light having image information from the surface of the original, and conductivity is given on the photosensitive member according to the image density, thereby forming an electrostatic latent image of the original 601 on the information carrying medium 3 according to the picture image. The information carrying medium, on the other hand, is carried by a conveyer belt 603 and developed with toner by means of a developing unit 604. The toner-developed information carrying medium 3 is transferred on a transfer film 605 comprising a copy paper or film having a normal toner on the information carrying medium 3, and a toner image on the transfer film is fixed with a heater 607. Since the information carrying medium 3 responds to very weak light, the light source 602 does not need to be a kind that is large and powerful and used for a normal copier. Also, since an electrostatic latent image on the information carrying medium can be maintained for a long time, it is not necessary to develop the image immediately after formation of the electrostatic latent image. Instead, it is possible to preserve the image as in the condition of the medium on which the electrostatic latent image is formed, so as to transfer the image by developing at a freely designated time and location thereafter. Accordingly, it is possible to construct units having a electrostatic latent image forming member, a developing member, and a transfer member as separate units.

Figure 92:
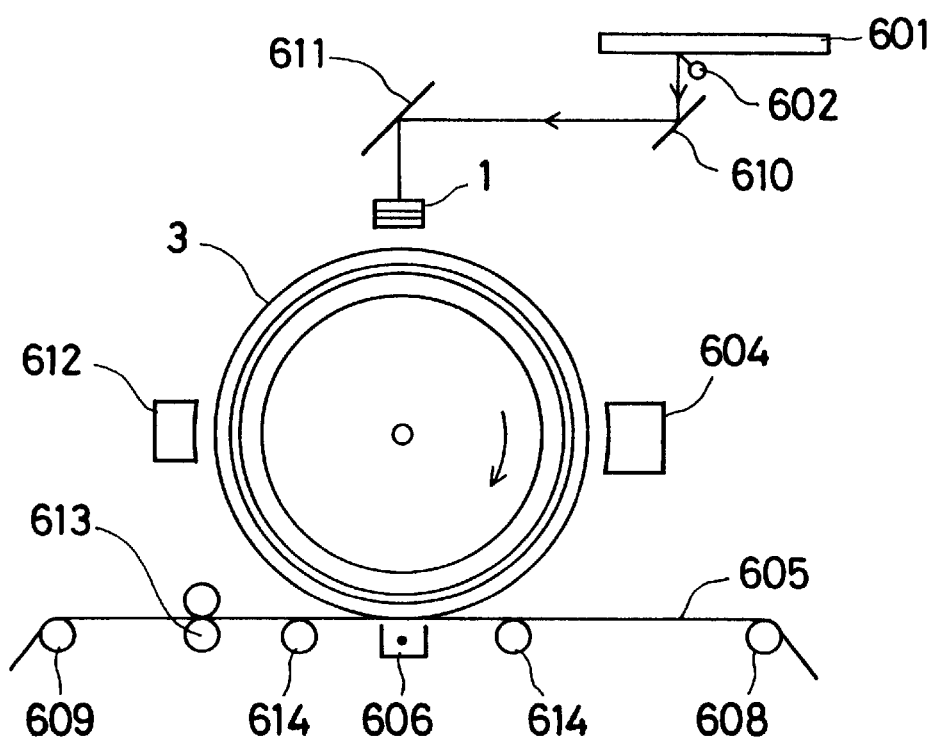

FIG. 92 illustrates another embodiment of an information recording and carrying apparatus for the purpose of static copying.

In this embodiment, the surface of an original is scanned by means of a slit light source, a photosensitive member 1 is of a long, slender shape corresponding to the slit light source, and an electrostatic latent image is formed sequentially on an information carrying medium 3 according to the picture image density of the surface of the original. The operation of the apparatus is the same as that of the one shown in FIG. 86 and the description of the operation thereof is omitted.

Although a transfer film illustrated in FIG. 92 is shown as a continuous one, a single piece of paper may also be used as in the case of a normal copier.

Figure 93:
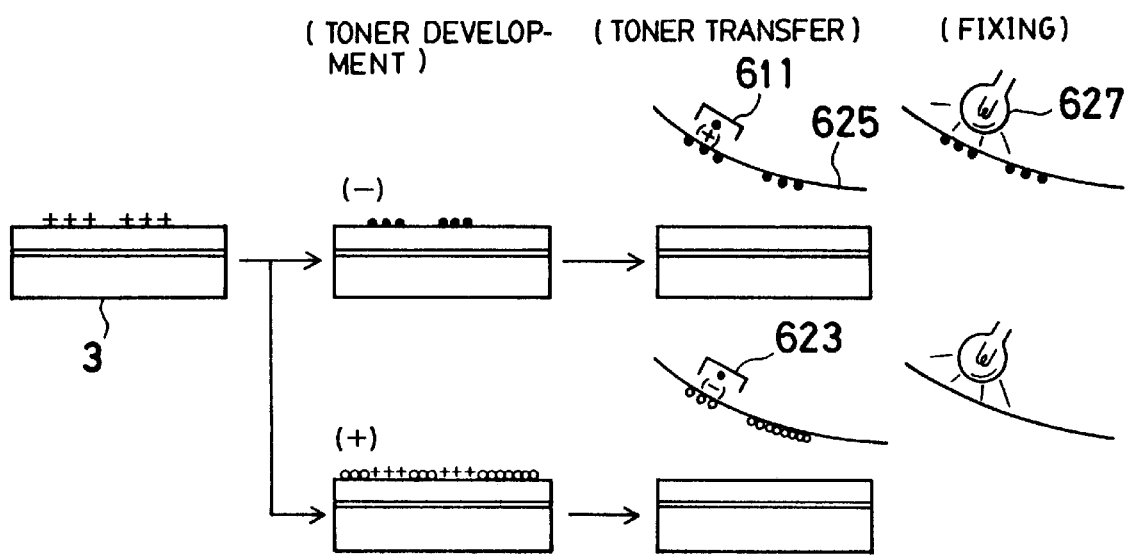
FIG. 93 is a view illustrating how to form toner images according to the present invention.

FIG. 93 illustrates one embodiment of an information carrying medium for the purpose of forming a toner picture image. In FIG. 93, reference numerals 611 and 623 denote chargers, 625 a transfer film, and 627 an infrared lamp.

Toners available are dry type and wet type, which are made of fine powder colorings made of dye, pigment, and resin. The former toner is charged by friction with an iron powder, glass bead, or itself, and the latter toner is charged by absorption of ions and then dispersed into an insulating solvent.

Developing is made by bringing a toner into contact with an information carrying medium 3 formed with an electrostatic latent image thereon. When a toner having a charge of polarity opposite to the charge of the electrostatic latent image, is used a toner image corresponding to the image is obtained and, when a toner having a charge of the same polarity, is used a reverse image of the electrostatic latent image is obtained. In FIG. 93, open circles indicate toner particles positively charged and solid circles toner particles negatively charged.

After the toner image is formed, toner transfer is carried out. This is performed by corona discharge with a polarity opposite to the polarity of the toner by a charger 611 or by applying bias voltage to attract toner particles while the transfer film 625 is pressed to the information carrying medium 3.

After the transfer, thermal fixing is carried out by infrared lamp 627 or a hot roll (not shown). And the image transfer is completed.

The information carrying medium of the present invention can store charges for a long period of time and hence it is not necessary to toner develop an electrostatic latent image as soon as it is formed as in electrophotography used in a copying machine. According to the present invention, the toner development may be carried out at a desired time.

Figure 94:
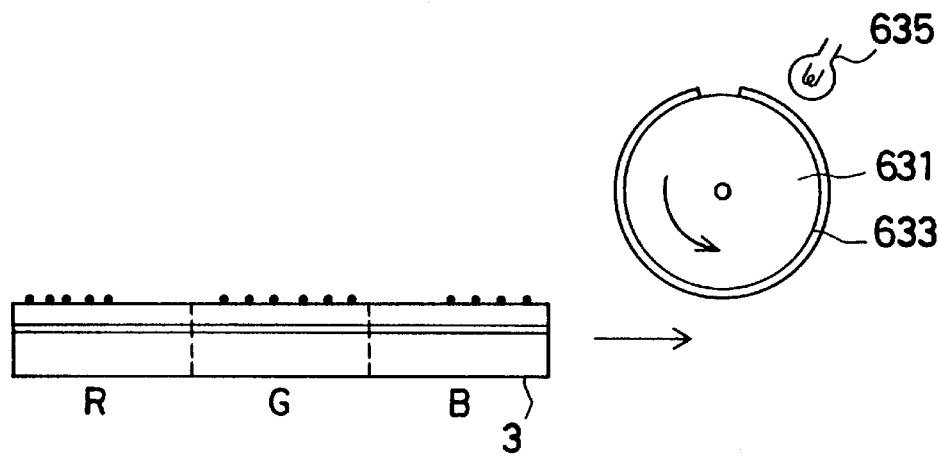
FIG. 94 is a view showing another embodiment of the present invention, in which color composition is carried out on an information carrying medium of which electrostatic latent images, separated in RGB three face sections, has been toner developed.

FIG. 94 illustrates how to perform color composition from an information carrying medium of which an electrostatic latent image has been subjected to toner development, the electrostatic latent image having been separated into R, G and B three face sections. The information carrying medium 3 is urged against the transfer roll 631 having a transfer film 633 placed around it. When the length of the circumference of the transfer roll 631 is equal to the length of the face section of each color, three revolutions of the roll forms a multicolor picture. Alternatively, the transfer film may be moved for each color to perform color composition. Color composition may be carried out when the information carrying medium for each of R, G and B is separate and independent from the other.

In the foregoing statement, the electrostatic latent image is toner developed, transferred and then fixed to form a final image, but the final image is not necessarily formed. For example, when the information carrying medium 3 is transparent, rays of light may be imposed on it after it is toner developed to obtain an enlarged image by projection of the toner developed image. When the information carrying medium is not transparent, an enlarged image is obtained as a reflected light image of the developed image by utilizing reduction in light reflection due to the toner. In this case, mere projection is carried out for each monocolor, and images by penetrating light or by reflection light of three color separated images may be composed at a projection plane. When the toner has a penetratability, it has a filtering effect to images by penetrating light. When it has no penetratability, then a color filter may be placed in front of the projection plane.

Figure 95:
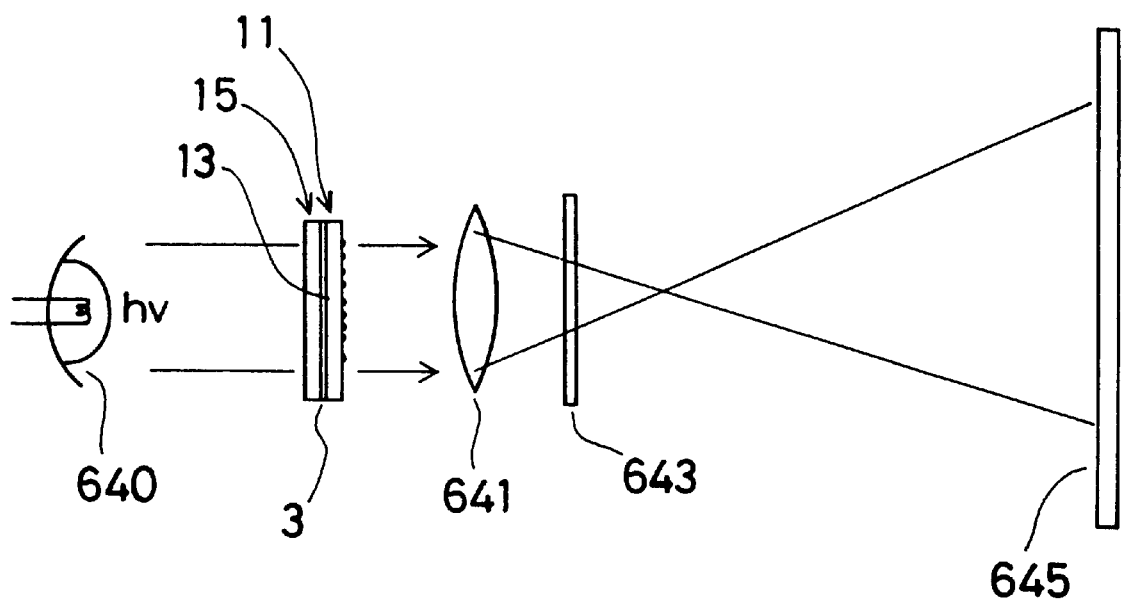
FIG. 95 is a view showing another embodiment of the present invention, in which a transparent image of a toner image is obtained.

FIG. 95 illustrates how to obtain an image by penetrating light of a toner image formed by the information carrying medium 3. In FIG. 95, the reference numeral 640 designates a light source, 641 a lens, 643 a filter, and 645 a screen. The information carrying medium includes a transparent insulation layer 11, transparent electrode 13 and transparent backing member 15. Rays of light are imposed from light source 640 on the side of the transparent backing member 15 to thereby project an image of a toner image by the penetrating rays of light through lens 641 and filter 643. In this case, a white and black toner provides a projection of a black and white image. When color toners and filters are used in combination and images are composed on a screen 645, a multicolor projected image is formed.

Figure 96:
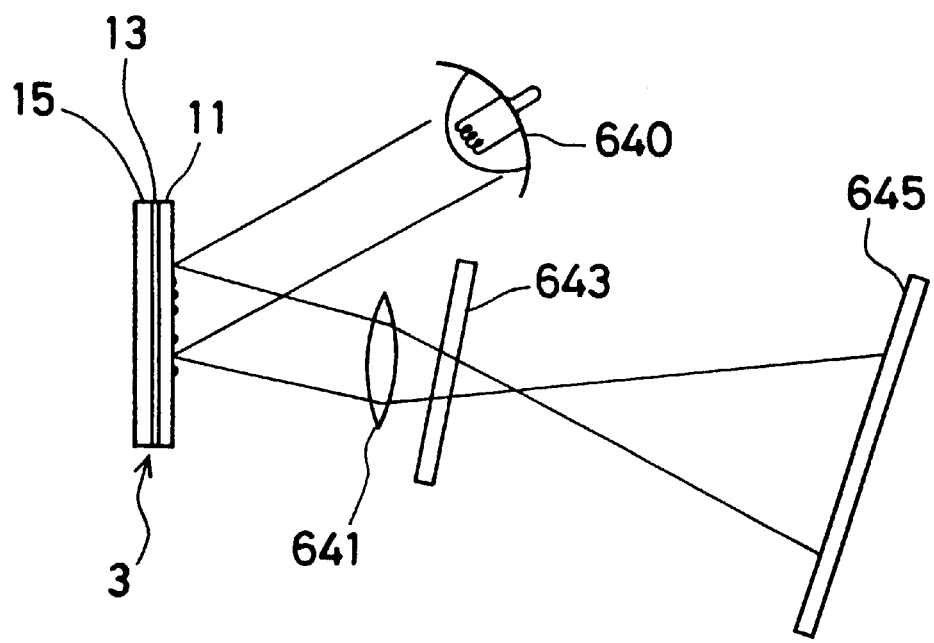
FIG. 96 is a view illustrating how to obtain a reflected image of a toner image according to the present invention.

FIG. 96 is an illustration of how to obtain a reflected image of a toner image formed on information carrying medium 3. In this case, the electrode 13 serves as a light reflecting layer, which reflects light from the light source 640 for forming a projected image of the toner image on the screen 645. Also in this case, a black and white image or a multicolor image may be formed. According to this embodiment, an electrostatic latent image is formed as an analog amount in a plane on the information carrying medium and the image is then developed by charged particles for converting the latent image to a visible image. Thus, this embodiment provides a high quality, high resolution image, ease in processing the image, storage for a long term as compared to the prior art and provides a toner image from stored image information as desired.

Figure 97A:
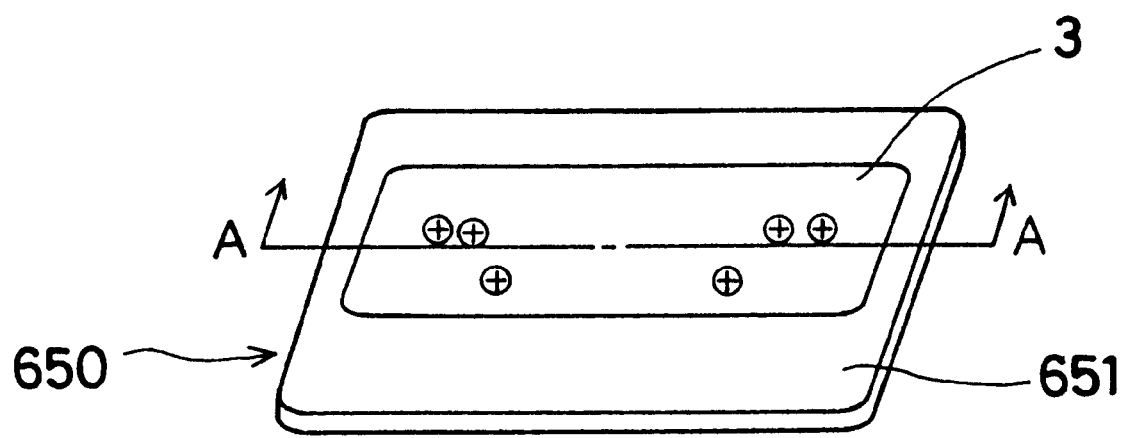
FIGS. 97(a), 97(b), 98, 99(a) and 99(b) are views showing card like recording mediums of the present invention.
Figure 97B:
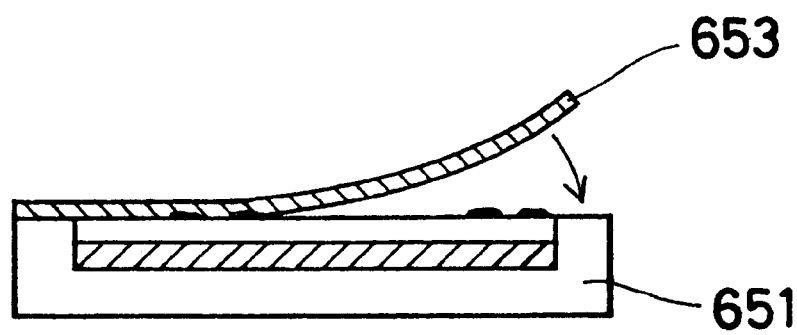
Figure 98:
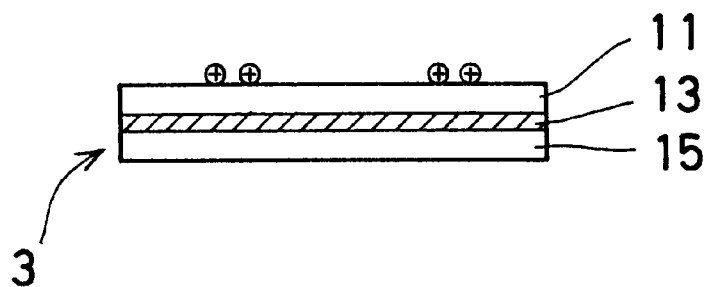
Figure 99A:
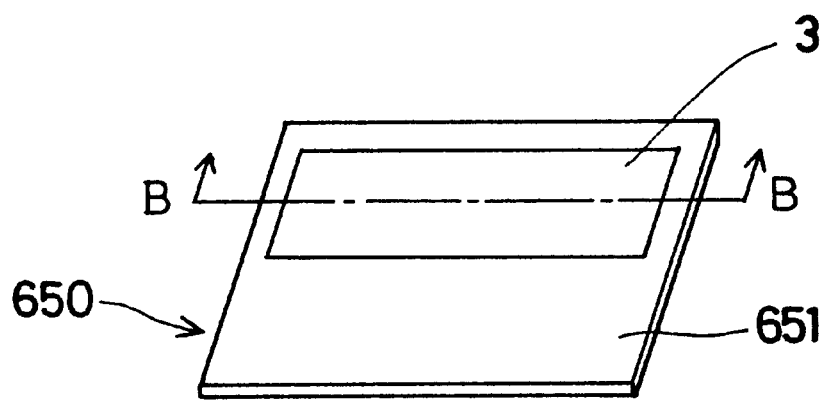
Figure 99B:
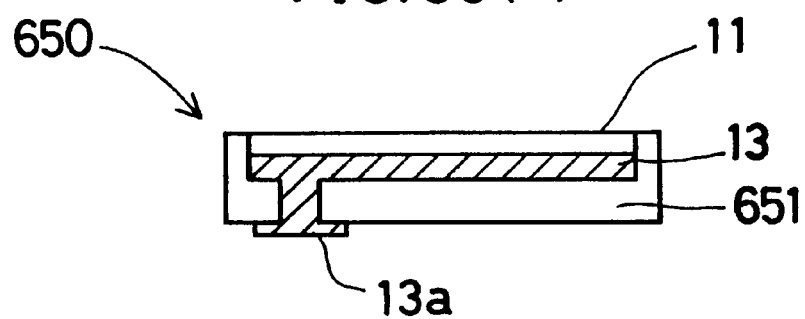

FIGS. 97 to 99 show one embodiment of a card recording medium.

FIG. 97(*a*) is a perspective view of a ROM type electrostatic charge card type recording medium of the present invention, FIG. 97(*b*) is a sectional view taken along the line A—A in FIG. 97(*a*) and illustrates a state in which a protection film is covered, FIG. 98 is a sectional view, FIG. 99(*a*) is a perspective view of a DRAW-type electrostatic charge recording medium, and FIG. 99(*b*) is a sectional view taken along the line B—B in FIG. 99(*a*), in which reference number 651 designates a card base material and 653 a protection film.

The electrostatic charge recording medium 3 shown in FIG. 98 corresponds to the information carrying medium described in connection with FIG. 1.

The information recording card 650 may be a card in which information is already recorded in the electrostatic charge recording medium as shown in FIG. 97 (hereinafter referred to ROM type card) or a card, in which information is not yet recorded or which has a portion capable of recording information, as shown in FIG. 99 (hereinafter referred to as a DRAW type card). In the DRAW type card, the protection film may be an adhesive plastic film, previously described, which can be separated from the surface of the insulation layer so that in recording the protection film is separated from the insulating film for recording information on an unrecorded portion of the card while after recording the insulating film is covered with the film again. An electrode terminal 13a is provided to the rear face of the card base member 651 for applying voltage to the electrode in recording information.

It is to be noted that the information recording card may be of erasable DRAW type or E-DRAW type since an electrostatic latent image can be easily erased as described previously.

Thus, the information carrying medium may be formed in a card shape and constitutes a so called electrostatic charge card by storing data as an electrostatic latent image.

Figure 100:
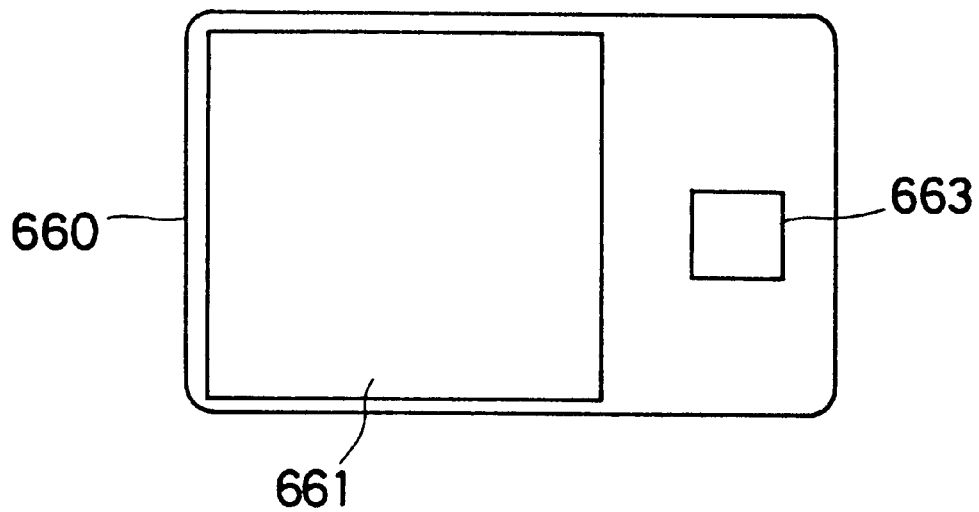
FIG. 100 is a view of another embodiment of the card like recording medium of the present invention, in which a high density charge accumulation is performed in a region.

FIG. 100 is a view showing another embodiment of the information recording card or the card like recording medium of the present invention.

In this embodiment, the card like recording medium 660 is provided with a high charge density region 661 and an electrostatic charge recording region 663. As already stated, in the electrostatic recording, 100 MByte of information may be stored in 1 cm×1 cm area. Thus, it is possible to make mass storage in not so large an area as the storage region. In an ordinary card, there is a large unused area in addition to the storage area, and so the unused are a may be used for a power source, not for storage of information, by accumulating charges there at a high density. The energy stored in the that area may be used as an energy source for recording and reproducing information of the card or for other purposes.

Figure 101:
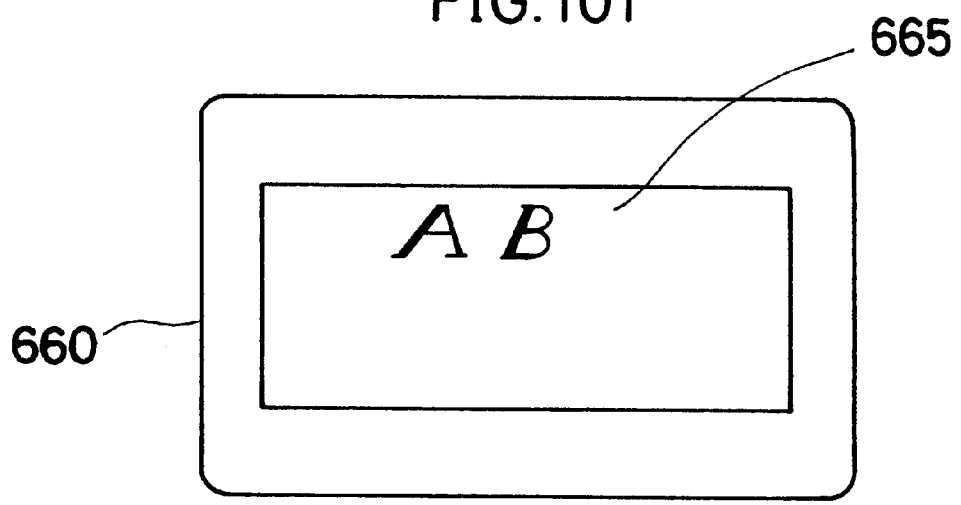
FIGS. 101 and 102 are views other embodiments of the card like recording medium according to the present invention.

FIG. 101 is a view illustrating another embodiment of the present invention, in which a specific electrostatic pattern is formed in the card recording medium.

In this embodiment, a specific pattern, for example, "AB" is electrostatically recorded. This pattern is not visible and cannot be recognized unless investigation is made as to whether or not a pattern is recorded, and it is hence useful for preventing forging of the card.

Figure 102:
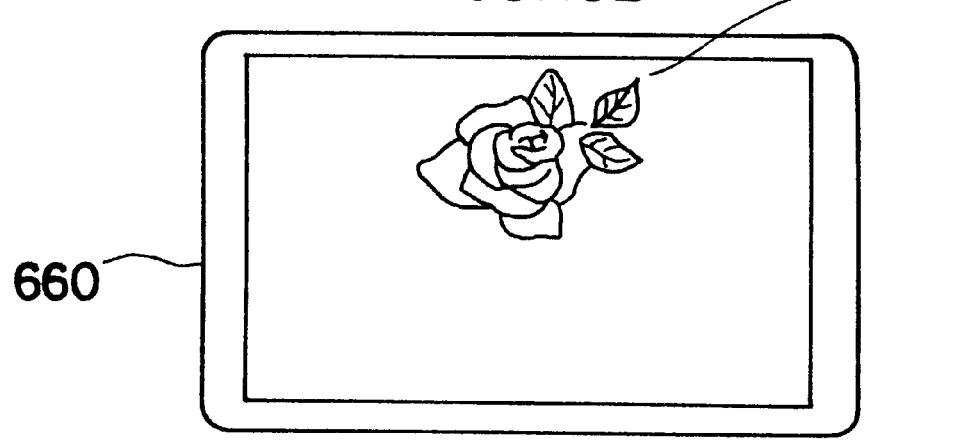

FIG. 102 is a view showing another embodiment of the card recording medium which forms a hologram image in a region thereof.

In this embodiment, exposure is made by a laser interference beam to form a hologram image 667 on a portion of the card recording medium 660. The formation of the hologram image in such a manner provides an ornamental effect to the card and prevents forging.

Both a specific electrostatic latent pattern and a hologram image may be recorded in the card recording medium.

A hologram image and a specific electrostatic latent image pattern may be recorded on a flexible film, not the card itself, to form an electrostatic label and such a label may be attached to the card recording medium.

Figure 103:
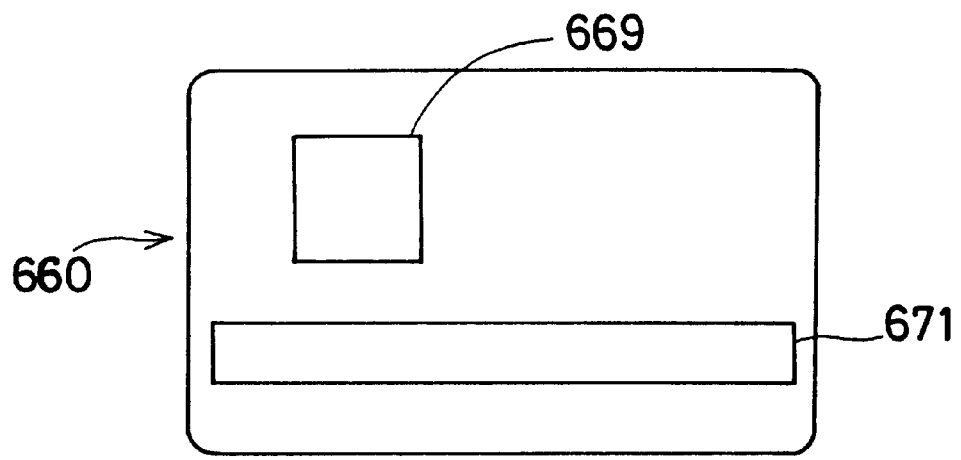
FIGS. 103, 104, 105, 106(a) and 106(b) are views other embodiments of the card like recording medium of the present invention, in which electrostatic storing and other storing of information are combined.

FIG. 103 shows a view of another embodiment in which an integrated circuit is incorporated. This embodiment has an electrostatic charge recording storing region 671 and further incorporates into it the integrated circuit 669, which may serve merely as a memory storage or may have a processing function. In the latter case, the integrated circuit may perform electrical processing in recording and reading of charges.

Figure 104:
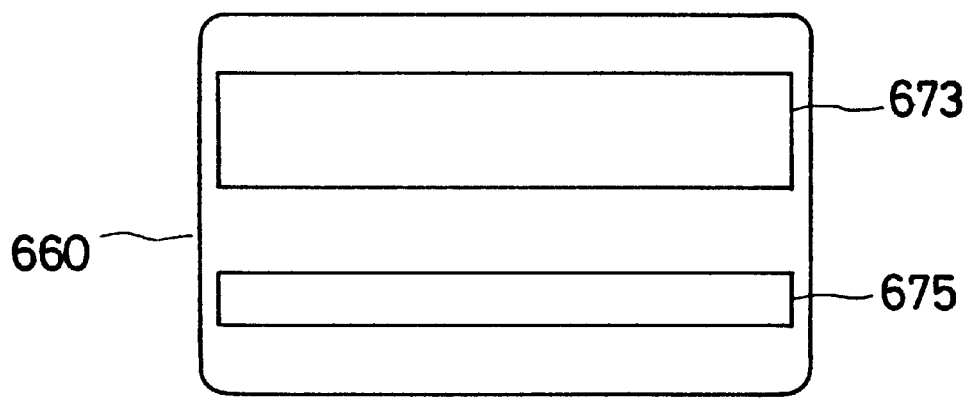

FIG. 104 is an illustration of a card recording medium of the present invention with a magnetic storage region. The magnetic card is widely used as a convenient recording card but it has drawbacks in having a relatively small storage capacity and of easy forging. The combination of the magnetic card with the card recording medium eliminates their faults and uses their merits. The card of this embodiment is provided with a magnetic storage region 675 in addition to an electrostatic charge storage region 673.

Figure 105:
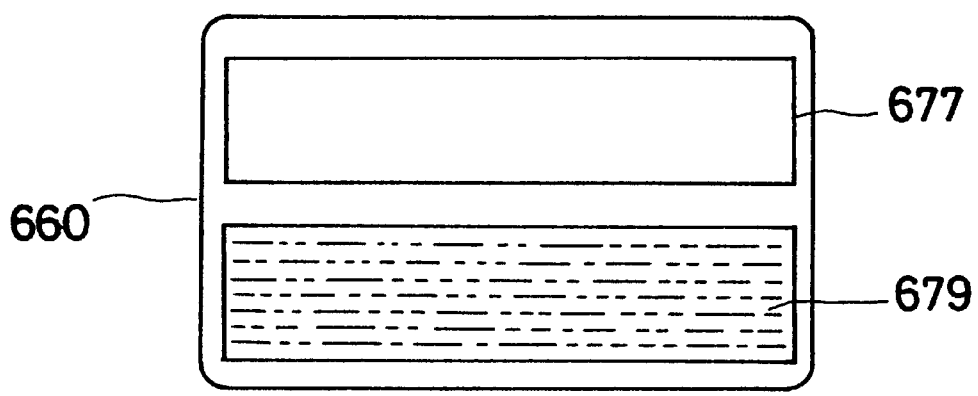

FIG. 105 is a view showing another embodiment of the present invention in which an optical card is combined with an electrostatic card. This embodiment is provided with an electrostatic storage region 677 and an optical card storage region 679. The optical card storage region 679 may be either of a ROM type, in which data is previously written by laser, or a writable DRAW type or writable and erasable EDRAW type. In this embodiment, the electrostatic storage region may be of the ROM type, DRAW type or EDRAW type and may be provided together with the magnetic recording region.

Figure 106A:
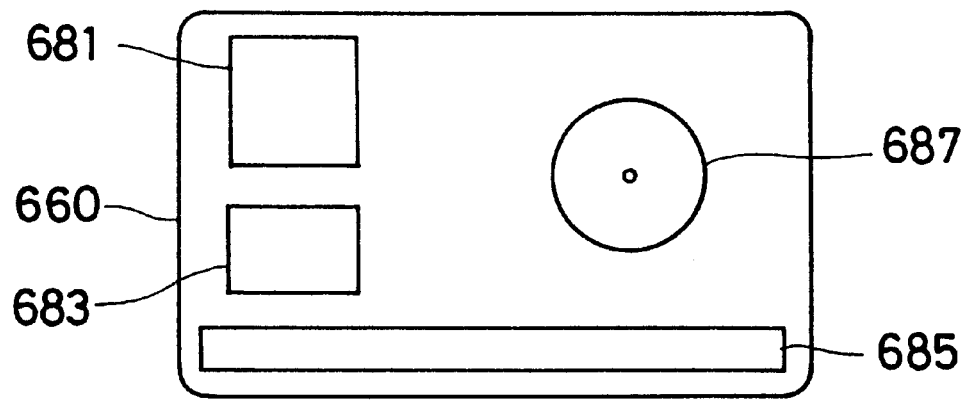
Figure 106B:
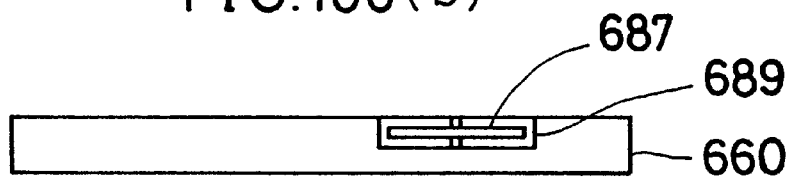

FIGS. 106(a) and 106(b) are views of another embodiment of the present invention in which the card recording medium is provided with a floppy disk. In this embodiment, the card recording medium is provided with an integrated circuit IC 681, an electrostatic storage region 683, and the floppy disc 687 in addition to a magnetic storage region 685. The floppy disc 687 is accommodated in a hollow portion 689 provided in the card recording medium 660, and when set in a reading unit, not shown, it is adapted to rotate in the hollow portion.

Although not shown, the card recording medium of the present invention may be combined with an ID card, a credit card, a marking card, such as a telephone charge card and a train fee card.

As described above, the card recording medium of the present invention may be provided with a plurality of recording regions of various recording system and in this way the present invention may be applied to various uses, such as identification, prepaid card, credit card, electronic calculator, electronic pocket book, camera, karte, time table, map, charge lock, miniature book, name card, sensor, cell, bar code, message exchange, libretto book, game and foreign language learning.

Figure 107:
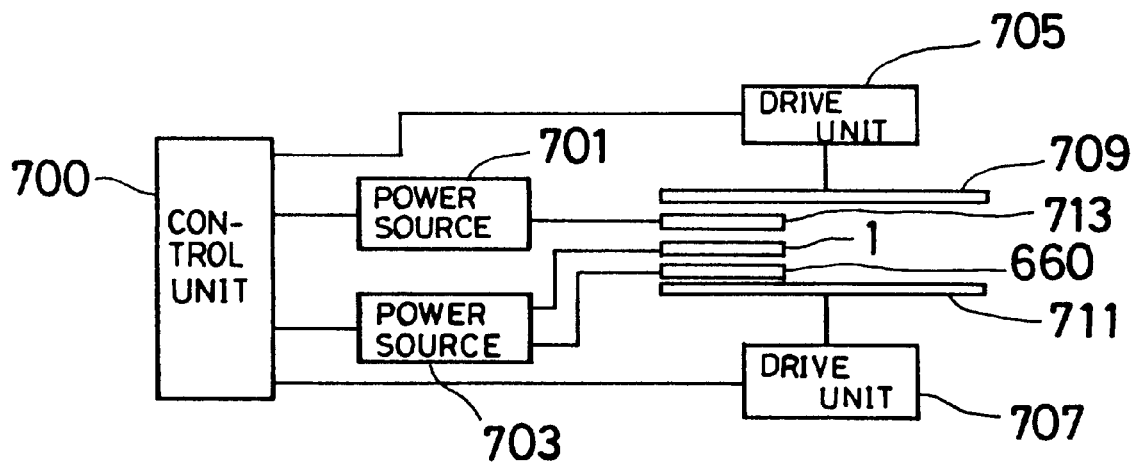
FIG. 107 is a view showing a system issuing card like recording mediums.

FIG. 107 illustrates one embodiment of a system issuing a card record medium. In FIG. 107, the reference numeral 700 designates a control unit, 701 and 703 power sources, 705 and 707 drive units, 709 mask and 711 rotating table.

In this system, the control unit 700 controls the power source 701 and the illumination light source, which consists of, for example, many light emitting diodes, which emit light in a predetermined pattern according to data inputted to the control unit 700 to thereby write desired data in the card recording medium 3 which includes an information carrying medium. The power source 703 applies a predetermined voltage to across the photosensitive member and the information carrying medium. On the other hand, the card recording medium 660 is placed on a rotation table and set to a predetermined position. Mask 709 is interposed between an illumination light source and the photosensitive member of the card by drive unit 705, the mask determining which region should be a storing region or preventing rays of light from breaking through to the neighboring region. The setting of the card recording medium to the exposure position may be made by a linear movement thereof by a belt or the like member rather than a rotary movement.

Figure 108:
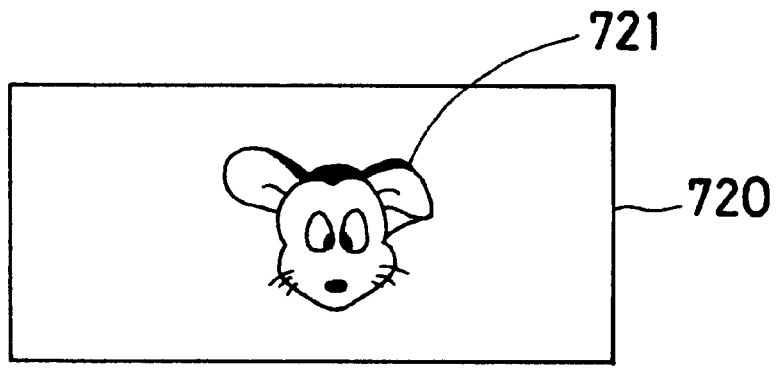
FIG. 108 is a view showing a label for preventing forging.
Figure 109:
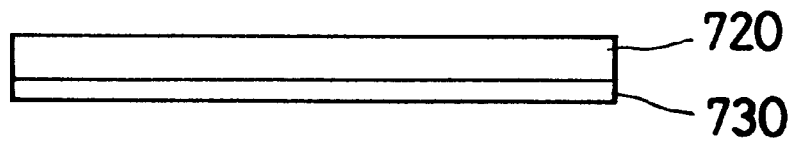
FIG. 109 is a view illustrating a modified label in FIG. 108 for preventing forging with a adhesive layer provided the rear face thereof.
Figure 110:
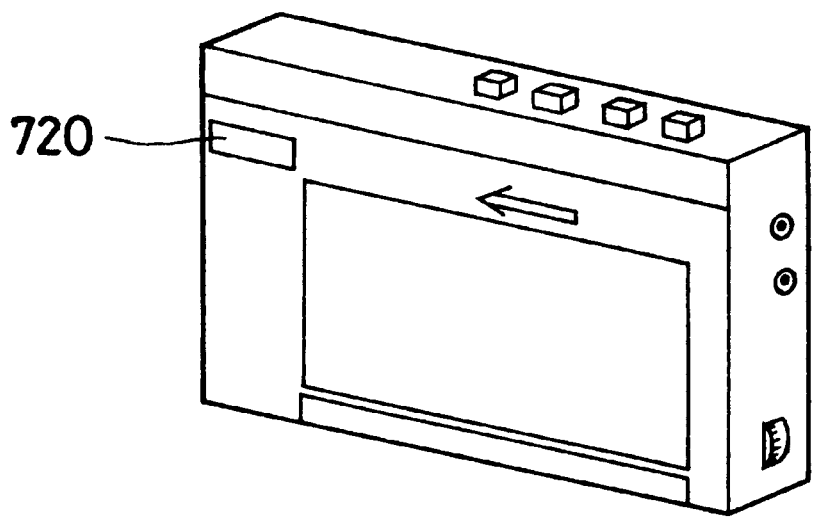
FIG. 110 is a view showing how the label for preventing forging is attached.

FIG. 108 is a view showing one embodiment of a label recording medium of the present invention, in which the information carrying medium is formed in a label shape and a hologram image 721 is recorded on it. A specific electrostatic pattern may be formed instead of the hologram 721, or they may be formed in combination. As shown in FIG. 109, an adhesive layer 730 may be laminated on the rear face of the label in FIG. 108, and this label may be attached to a cassette tape recorder as shown in FIG. 110 for preventing forging.

The following are specific examples of fabrication of elements of the information recording and reproducing apparatus of the present invention.

EXAMPLE 1

Fabrication of an information carrying medium

A hardening agent (a metallic catalyst), sold by Toshiba Silicone with a product name "CR-5", was added in an amount of 1 weight % (0.2 g) to a liquid mixture including 10 g of methyl phenyl silicon resin and 10 g of xylene-butanol 1:1 solvent and then sufficiently stirred to produce a coating liquid, which was coated by means of doctor blade 4 mil over a glass substrate, having 1000 Å aluminum vapor deposited. The coated substrated was then dried at 150° C. for one hour to form an information carrying medium (a) with a 10 μm thick coating.

A 100 μm thick polyester film having 1000 Å aluminum film vapor deposited was similarly coated with the liquid mixture above described and then dried to form an information carrying medium film (b).

The liquid mixture was also coated over a 4 inch diameter disc-shaped acrylic substrate of a thickness 1 mm, having 1000 Å aluminum layer coated over it. The coating was made by means of a spinner at 2000 rpm. The coated substrate was dried at 50° C. for 3 hours to produce a disc-shaped information carrying medium (c) with a 7 μm thick coating.

Similar coating and drying were made with the above liquid mixture further added with 0.1 g zinc stearate to produce an information carrying medium (d) having a 10 μm coating.

EXAMPLE 2

A liquid mixture, including 10 g of a polyimide resin and 10 g of N-methylpyrrolidone, was spinner coated over a glass substrate, having 1000 Å thick aluminum layer coated, at 1000 rpm for 20 seconds. For drying the solvent, predrying was carried out at 150° C. for 30 minutes and then, the substrate was heated at 350° C. for 2 hours for hardening to form a 8 μm thick uniform coating.

EXAMPLE 3

Fabrication of monolayer organic photosensitive member (PVK-TNF)

A liquid mixture including 10 g of poly-N-vinylcarbazole, (produced by Anan Koryou K. K.)., 10 g of 2,4,7-trinitrofluorenone, 2 g of a polyester resin (having a binder, produced by Toyobo K.K. under product name Vylon 200), and 90 g of tetrahydrofuran (THF) was prepared in the dark. This liquid mixture was applied over a 1 mm thick glass substrate, having about a 1000 Å thick $In_2O_3$—$SnO_2$ film sputtered over it, by means of a doctor blade and then the coated substrate was dried under ventilation at 60° C. for about a one hour to form a photosensitive layer having about 10 μm thick photoconductive layer. For completely drying, air drying at room temperature was made for another day.

EXAMPLE 4

Production of an amorphous silicon aSi:H inorganic photosensitive member (1) Cleaning of substrate A 23 mm long, 16 mm wide and 0.9 mm thick, optically polished glass substrate, sold by Corning under product designation 7059 glass, and having a thin transparent $SnO_2$ electrode layer formed on its one face, was subjected to ultrasonic cleaning in each of trichloroethane, acetone and ethanol in the described order. The glass was cleaned in each cleaning liquid for 10 minutes.

(2) Preparation of equipment

A reaction receptacle and gas pipes were placed within a reaction chamber 804, which was evacuated by a diffusion pump to $10^{-5}$ Torr for carrying out heating at 150–350° C. for one hour, and after heating the chamber was cooled.

(3) Deposition of aSi:H(n⁺)

Figure 111:
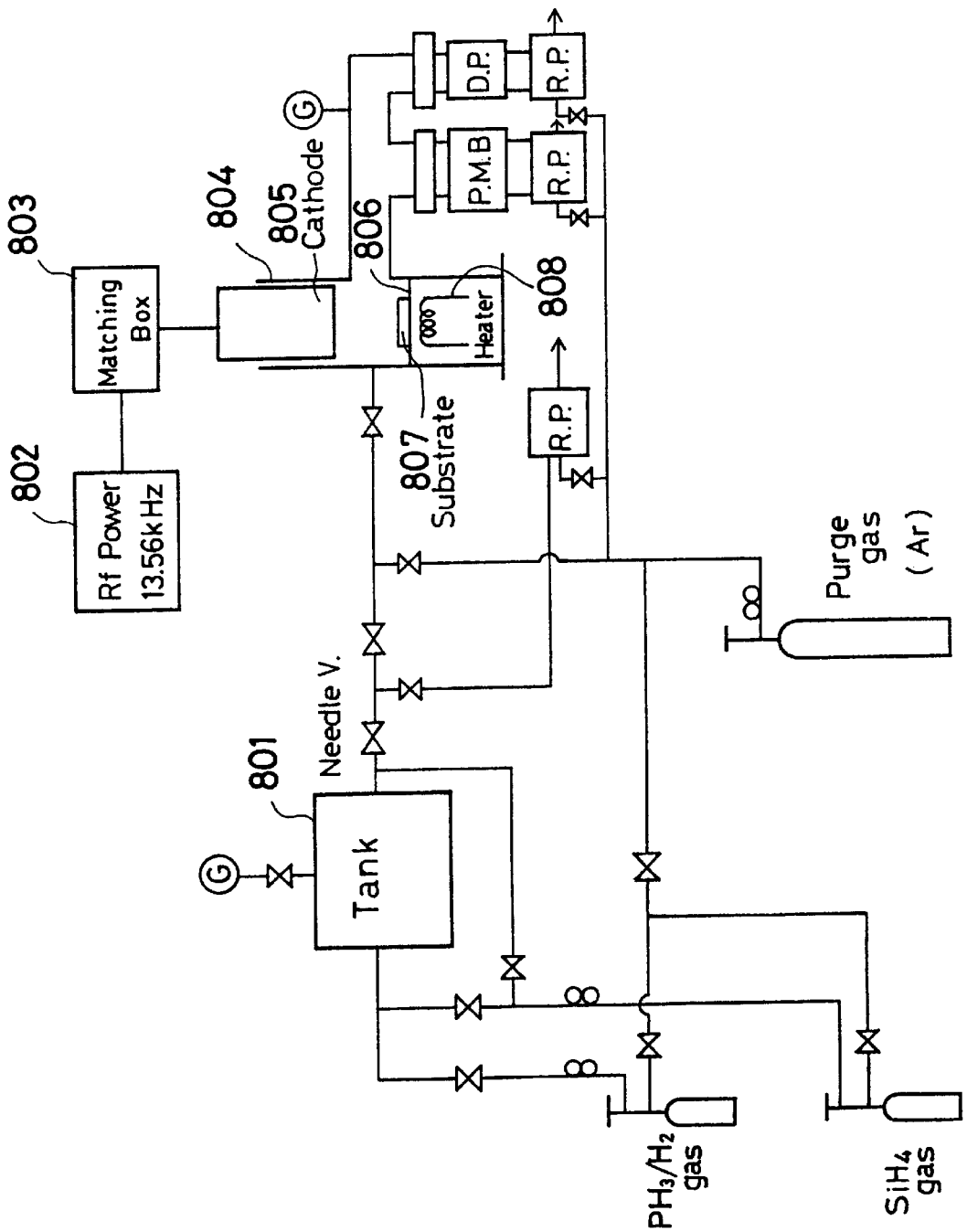
FIG. 111 is a view illustrating how to fabricate a-Si:H photosensitive member of the present invention.

The substrate cleaned was set on the anode 806 in the reaction chamber 804 shown in FIG. 111 with good thermal conduction, and the reaction chamber was evacuated to $10^{-5}$ Torr by the diffusion pump, in which condition the heater 808 was adjusted so that the glass substrate was increased to 250° C. At this temperature, a gas of $B_2H_6/SiH_4$ (1000 ppm) was allowed to flow into the reaction chamber 804 by controlling the needle valve and the rotation of the PMB so that pressure in the chamber was 200 mTorr. After the inner pressure of the reaction chamber became constant, 40 W of Rf power 802 (13.56 MHz) was put to work through the Matching box 803 to form plasma between the cathode and the anode. The deposition was performed for 4 minutes, then Rf power was disconnected, and the needle valve was closed. This resulted in about a 0.2 μm thick aSi:H(n⁺) layer which constituted a blocking layer being deposited on the substrate.

(4) Deposition of aSi:H

A silane gas of 100% $SiH_4$ was entered into the reaction chamber in the same manner as in (3) Deposition of aSi:H.

When the inner pressure in the chamber became constant, 40 W Rf power 202 (13.56 MHz) was similarly connected through the matching box 803 to form a plasma which was maintained for 70 minutes. After the deposition was completed, the Rf power was disconnected and the needle valve was closed. After the substrate was cooled by turning off the heater 808, it was taken out. As a result, about a 18.8 μm thick film was deposited on the aSi:H(n+) film. Thus, a photosensitive member including a $SnO_2$/aSi:H(n⁺) blocking layer/aSi:H (non doped) of 20 μm was produced.

EXAMPLE 5

Fabrication of amorphous selenium-tellurium inorganic photosensitive member

A mixture of metallic particles obtained by mixing selenium (Se) with tellurium (Te) in a proportion of 13% by weight was used. A Se-Te thin film was formed on an ITO glass substrate by vapor depositing the metallic mixture at a vacuum degree of $10^{-5}$ Torr under resistance heating. The film has a thickness 1 μm. Subsequently at the same vacuum level, Se vapor deposition was similarly carried out under resistance heating to form a 10 μm a-Se layer on the a-Se-Te layer.

EXAMPLE 6

Production of function separated photosensitive member (forming of charge generation layer)

A liquid mixture consisting of 0.4 of chlorodianeblue and 40 g of dichloroethane was placed in a stainless receptacle having a volume of 250 ml, and then 180 ml of glass beads No3 was added. This material was pulverized by a vibrating mill (sold by Yasukawa Denki Seisakusho under product designation ED9-4) for about 4 hours to produce chlorodianeblue with particle size 5 μm or smaller, to which after, the glass beads being filtered, 0.4 g of polycarbonate, sold by Mitsubishi Gas Kagaku under tradename Upiron E-2000 was stirred for about 4 hours to form a solution, which was applied by a doctor blade on a 1 mm thick glass substrate, having about a 1000 Å thick $In_2O_3$—$SnO_2$ film sputtered on it, to form an about a 1 μm thick charge generation layer which was dried at room temperature for one day.

Formation of a charge transport layer

A liquid mixture, containing 0.1 of of 4-dibenzylamino-2-methylbenzaldehyde-1,1'-diphenylhydrazone, 0.1 g of polycarbonate (Upiron E-2000), and 2.0 g of dichloroethane, was coated by a doctor blade over the charge generation layer, above mentioned, to form an about 10 μm thick charge transport layer, which was dried at 60° C. for 2 hours.

EXAMPLE 7

Formation of a charge generation layer 10 g of butyl acetate, 0.25 g of butylal resin, (sold by Sekisui Kagaku, Japan under trade name SLEC), 0.5 g of a $ClO_4$ salt of azulenium having the following equation:

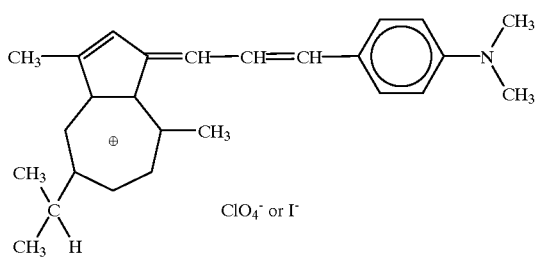

and 33 g of glass beads were mixed and stirred by a touch mixer for one day to prepare sufficiently dispersed material, which was applied by a doctor blade or applicator on ITO deposited on a glass plate and then dried at 60° C. for more than 2 hours to form a dried film having a thickness 1 μm or less.

Formation of a charge transport layer 9.5 g of tetrahydrofuran, 0.5 g of polycarbonate, sold by Mitsubishi Gas Kagaku, Japan, under trade name of Upiron E 2000), 0.5 g of a hydrazone derivative (sold by Anan Koryou, Japan, under product designation CTC191) having the following equation:

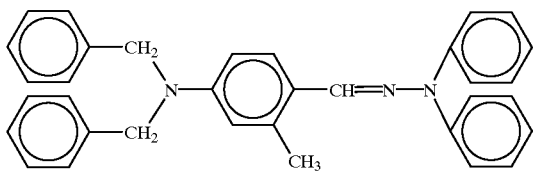

were mixed and then applied by a doctor blade over the charge generation layer above described to form a coating, which was dried at 60° C. for 2 hours with a film thickness 10 μm or less.

EXAMPLE 8

Formation of an electron generation layer 20 g of tetrahydrofuran, 0.5 g of a butylal resin, (sold by Sekisui Kagaku, Japan, under tradename of SLEC) 0.25 g of titanylphthalocyanine, 0.25 g of 4.10-dibromoanthanthrone, and 33 g of glass beads No. 1 were stirred by a touch mixer for one day to obtain a sufficiently dispersed material, which was applied by a doctor blade or applicator over ITO laminated over a glass plate and then dried at 60° C. for 2 or more hours to produce a dried coating with a thickness 1 μm or less.

Fabrication of a charge transport layer 0.5 g of polycarbonate (produced by Mitsubishi Gas Kagaku, Japan, under the trade name of Upiron E2000), and 0.5 g of the above-described hydrazone derivative (sold by Anan Koryou, Japan, under product designation CTC191) were dissolved into 9.5 g of dichloroethane to prepare a coating material, which was applied by a doctor blade over the charge generation layer, above described, and then dried for 2 hours at 60° C. for 2 hours or more to form a film having a thickness 10 μm or larger.

EXAMPLE 9

Forming of a barrier layer of charge injection layer

A soluble polyamide (sold by Toa Gosei Kagaku, Japan, under product designation FS-175SV10) was coated by a spin coater with a thickness 0.5–1 μm on ITO laminated on a glass plate and then dried at 60° C. for 2 hours or more.

Forming of a charge generation layer 10 g of butyl acetate, 0.25 g of a butylal resin (sold, by Sekisui Kagaku, Japan, under the tradename SLEC), 0.5 g of the above-described $ClO_4$ salt of azulenium and 33 g of glass beads No. 1 were mixed and stirred by a touch mixer for one day to produce a sufficiently dispersed material, which was applied by a doctor plate or an applicator over the barrier layer of charge injection above mentioned and then dried at 60° C. for 2 hours or more to form a dried coating having a thickness 1 μm or less.

Formation of a charge transport layer 0.5 g of polycabonate (sold by Mitsubishi Gas Kagaku, Japan under tradename Upiron E2000) and 0.5 g of the above-described hydrazone derivative (sold by Anan Koryou under product designation CTC191 were dissolved into tetrahydrofuran to prepare a coating material, which was coated by a doctor blade on the charge generation layer and then dried at 60° C. for 2 hours or more to form a coating with a thickness 10 μm or less.

EXAMPLE 10

Formation of a barrier layer of charge injection layer

A soluble polyamide (sold by Toa Gosei Kagaku under product designation FS-175SV10) was applied with a thickness of 0.5–1 μm over ITO, laminated on a glass plate, and then dried at 60° C. for 2 hours or more.

Formation of a charge generation layer 20 g of tetrahydrofuran, 0.5 g of a butylal resin (sold by Sekisui Kagaku under the tradename SLEC), 0.25 of titanylphalocyanine, 4.10-dibromoansuansuron and 33 g of glass beads No. 1 were stirred by a touch mixer for one day to form a sufficiently dispersed material, which was applied by a doctor blade or an applicator on the above-mentioned barrier layer of charge injection and was then dried at 60° C. for 2 hours or more to form a dried coating having a thickness 1 μm or less.

Formation of a charge transport layer 0.5 g of polycarbonate (sold by Mitsubishi Gas Kagakuk under the tradename Upiron E2000) and 0.5 g of the above-mentioned hydrazone derivative (sold by Anan Koryo under product designation CTC191) were dissolved into 9.5 g of dichloroethane as a solvent to prepare a coating material, which was applied by a doctor blade over the above-mentioned charge generating layer and then dried at 60° C. for 2 hours to form a dried coating having a thickness 10 μm or larger.

EXAMPLE 11

Formation of an electrode layer for a photosensitive member

An indium tin oxide (ITO) having specific resistance 100Ω·$cm^2$ was coated by sputtered over a blue glass plate in condition of 100° C. by the substrate temperature and $10^{-3}$ Torr under oxy-atomosphere. This material may be deposited by EB method.

Formation of a barrier layer of charge injection

Silicon dioxide was sputtered over the above-described electrode layer. The thickness of the silicon dioxide may be 100–3000 Å and aluminum oxide may be used in place of silicon dioxide. EB method maybe adopted instead of sputtering for depositing the layer.

Formation of charge generation layer

A selenium-tellurium layer containing 13% by weight of tellurium was deposited on the above barrier layer of charge injection by resistance heating with a thickness 10 μm or less.

EXAMPLE 12

Production of thermoelectret

A 1000 Å thick aluminum film was vacuum deposited on a 20 μm thick polyvinylidene fluoride film at $10^{-6}$ Torr under resistance heating to form an information carrying medium.

This medium and the photosensitive member of the example 9 were used to form an electrostatic latent image. First, the information carrying medium was heated to 180° C. by bringing a hot plate (3×3 cm) into contact with the aluminum substrate thereof. Immediately after the heating, the photosensitive member was arranged to face the charge carrying medium with a 10 μm air gap to apply a voltage of −700 V across the electrodes with positive polarity at the electrode of photosensitive member and was exposed on this condition. The exposure was performed by a halogen light source from the rear face of the photosensitive member through an original, carrying a character pattern, at 10 lux.

Then, the film was allowed to cool, with the result that a potential of −150 V was determined at the exposed portion or the character pattern portion while no potential was measured at the unexposed portion. Water drops were dripped on the film having the charged pattern and then recovered, after which the potential determination was made. This revealed the same result that the potential of exposed portion was −150 V. On the other hand, charges of −150 V were generated on the surface of a similar information carrying medium by corona discharging in a forced manner. Then, water drops were dripped on the surface and then recovered, after which it was determined that the potential of the exposed portion which had been −150 V was decreased to 0 V with no charge. It was noted that the generation of charges under heating was due to the fact that polarization occurs within the polyvinylidence fluoride to form an electret.

EXAMPLE 13

Production of an phtoelectret

A thick substrate was prepared by depositing a 1000 Å aluminum layer on a 1 mm thick glass backing member by sputtering, and then an about a 1.5 μm thick zinc sulfide film was vapor deposited on the aluminum layer at $10^{-5}$ Torr under resistance heating. An outerface of ITO deposited on a glass was arranged to face this zinc sulfide layer with an air gap 10 μm and +700 V was applied across the electrodes with the aluminum electrode negatively. In this condition, exposure was performed from the side of the ITO substrate in the same manner as in Example 11. This resulted in that +80 V of potential was determined at the exposed portion while no potential was measured at the unexposed portion. Also in this example, a water dripping test was made in the same manner as in Example 11 and revealed that no change in potential was noted and an electret within which charges were stored was formed.

EXAMPLE 14

Figure 112:
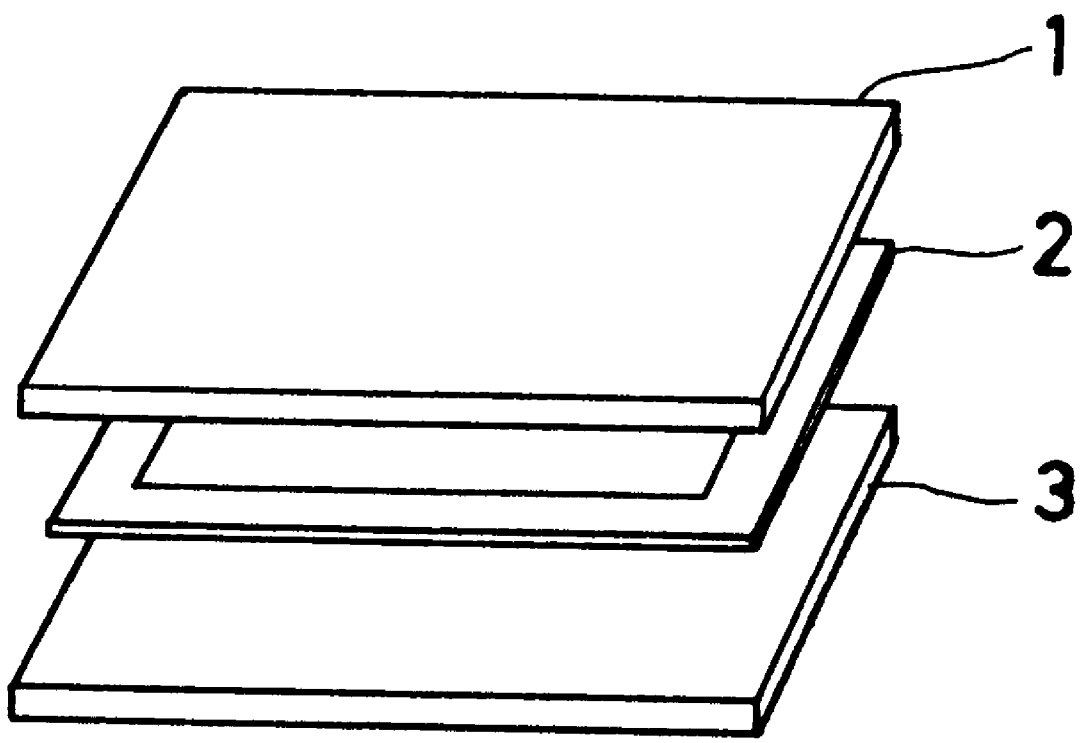
FIG. 112 is a view illustrating how to take a picture by an information accumulating unit according to the present invention.

The monolayer organic photosensitive member (PVK-TNF) of Example 3, the information carrying medium (a) of Example 1 and a glass substrate were stacked with the electrodes placed outside and set to a camera, in this event a 10 μm thick polyester film was arranged as a spacer at the peripheral portions of the photosensitive member and the information carrying medium except exposed faces as shown in FIG. 112 for forming a gap between them.

Pictures of an object were taken outside in the daytime by releasing an optical shutter with a shutter speed 1/60 second and f=1.4 or by applying voltage for 1/60 second with the shutter fully released, under voltage of 700 V applied to the electrodes with the photosensitive member negatively and the charge carrying medium positive. After both the exposure and the application of voltage were stopped or after the application of voltage was stopped, the charge carrying medium was taken out in a bright or dark place and then (1) a CRT picture was formed according to microarea potential reading method, and (2) a picture was formed by toner developing.

In the microarea potential reading method, X-Y axes scanning was carried out by a 100×100 μm microarea surface potential determining probe to process potential data in the unit of 100 μm for displaying a picture image on a CRT by potential-brightness conversion. An analog potential latent, image having 200 V of the largest exposure portion potential and 0 V of unexposed portion potential, was formed on the charge carrying medium, and it was picturized or developed on the CRT with a 100 μm resolution.

In the toner developing (2), a positive image was formed by dipping the charge carrying medium taken out from a camera in a wet black toner charged positive. The toner image had a high resolution of 1 μm.

Fullcolor pictures were taken by the following manners:

(1) Prism-type three faces separation method

Red, green and blue filters were arranged over three faces of the prism as shown in FIG. 20, and the above-described medium was set over each face of the prism. Then, a picture of an object was taken with f=1.4, shutter speed of 1/30 second.

(2) Display on color CRT

Each of red, green and blue latent images was similarly read by scanning and fluoresent coloring was made on the CRT to correspond the latent image, thereby forming a multicolor picture by composing the three color separated pictures on the CRT.

(3) Toner developing method

Charge carrying mediums, which were exposed to color separation exposure were respectively developed with cyan, magenta and yellow toners which were charged negatively to form toner picture images. Before toner images were dried, a plain paper was place over the medium, having the cyan toner image formed, and then positive corona discharge was performed on the paper. Then, the toner image was transferred to the paper by separating the latter from the medium. Subsequently, the magenta and yellow toner images were similarly transferred to the cyan picture image on the paper by registering them to form a fullcolor picture image on the paper.

What we claim:

1. A color imaging system comprising:
   a lens for introducing an optical image of a subject;
   color separating means for separating said optical image into a plurality of different color images;
   an optical shutter selectively openable for transmitting the optical image of the subject to said color separating means;
   photoelectric converting means for converting said different color images into respective electric charge images;
   an information recording medium for recording images corresponding to electric charge images under an electric filed;
   a power supply for generating said electric filed between said photoelectric converting means and said information recording medium;

control means for controlling a timing with which said optical shutter is opened and a timing with which said electric field is generated by said power supply;

input means manually operable for supplying imaging condition to said control means;

an optical viewfinder for visual observation of the optical image of the subject introduced by said lens;

reproducing means for reproducing the images recorded in said information recording medium; and output means for displaying the images recorded in said information recording medium and reproduced by said reproducing means.

* * * * *